(12) United States Patent
Kataoka et al.

(10) Patent No.: US 9,793,793 B2
(45) Date of Patent: Oct. 17, 2017

(54) POWER FACTOR CORRECTION CIRCUIT AND POWER SUPPLY DEVICE

(71) Applicant: Sharp Kabushiki Kaisha, Osaka-shi, Osaka (JP)

(72) Inventors: Kohtaroh Kataoka, Osaka (JP); Masaru Nomura, Osaka (JP); Shuji Wakaiki, Osaka (JP); Hiroki Igarashi, Osaka (JP); Akihide Shibata, Osaka (JP); Hiroshi Iwata, Osaka (JP); Takeshi Shiomi, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/177,543

(22) Filed: Jun. 9, 2016

(65) Prior Publication Data
US 2016/0380531 A1    Dec. 29, 2016

(30) Foreign Application Priority Data

Jun. 26, 2015  (JP) ................................. 2015-129107
Sep. 9, 2015   (JP) ................................. 2015-177355

(51) Int. Cl.
*H02M 3/18*   (2006.01)
*H02M 7/00*   (2006.01)
(Continued)

(52) U.S. Cl.
CPC ........ *H02M 1/4225* (2013.01); *H02M 1/4233* (2013.01); *H02M 7/487* (2013.01)

(58) Field of Classification Search
CPC ........... H02M 3/07; H02M 7/10; H02M 7/103
(Continued)

(56) References Cited

U.S. PATENT DOCUMENTS 4,186,436 A * 1/1980 Ishiwatari ................ G09G 3/18
                                                  363/60
6,212,083 B1 * 4/2001 Sakakibara ............. H02M 7/06
                                                 363/126
(Continued)

FOREIGN PATENT DOCUMENTS

JP    2001-025240 A    1/2001
JP    2006-325353 A    11/2006
(Continued)

*Primary Examiner* — Adolf Berhane
*Assistant Examiner* — Gary Nash
(74) *Attorney, Agent, or Firm* — Steven Reiss

(57) ABSTRACT

A power factor correction circuit includes: a coil and MOSFETs that boost an input voltage to generate a boosted voltage; a first capacitor having one end connected to a first output terminal, and the other end connected to an intermediate node; and a second capacitor having one end connected to the intermediate node, and the other end connected to a second output terminal. In a first operation mode, the boosted voltage is applied to the two ends of the first capacitor when a positive voltage is input, and applied to the two ends of the second capacitor when a negative voltage is input. In a second operation mode, the boosted voltage is applied to two ends of the first and second capacitors connected in series. Thus, there is provided a power factor correction circuit which has a high efficiency and is compatible with an input voltage in a broad range.

20 Claims, 21 Drawing Sheets

(51) Int. Cl.
*H02M 3/06* (2006.01)
*H02M 1/42* (2007.01)
*H02M 7/487* (2007.01)

(58) Field of Classification Search
USPC .................................................. 363/59–62
See application file for complete search history.

(56) References Cited

U.S. PATENT DOCUMENTS 6,483,731 B1 * 11/2002 Isurin ................ H02M 3/33592
363/125
7,944,188 B1 5/2011 Wittenbreder, Jr.
2003/0043607 A1 * 3/2003 Vinciarelli .......... H02M 1/4208
363/61
2012/0008351 A1 1/2012 Yonezawa et al.

FOREIGN PATENT DOCUMENTS

JP 2012019637 A 1/2012
JP 2015-035851 A 2/2015

* cited by examiner

Prior Art

POWER FACTOR CORRECTION CIRCUIT AND POWER SUPPLY DEVICE

BACKGROUND OF THE INVENTION

Field of the Invention

The present invention relates to a power factor correction circuit, and a power supply device using the same.

Description of Background Art

There has conventionally been known a voltage-doubler-type bridgeless power factor correction circuit which includes two capacitors connected in series and no diode bridge. One of the two capacitors stores power when a positive voltage is input, and the other stores power when a negative voltage is input. The voltage-doubler-type bridgeless power factor correction circuit can make a boosting ratio small by using the two capacitors connected in series. Further, since the voltage-doubler-type bridgeless power factor correction circuit does not include a diode bridge, a power loss can be reduced.

FIG. 18 is a circuit diagram of a voltage-doubler-type bridgeless power factor correction circuit described in Japanese Laid-Open Patent Publication No. 2012-19637. A power-factor correction circuit 9 shown in FIG. 18 includes a coil L1, FETs (Field Effect Transistors) T1, T2, diodes D1 to D4, and capacitors C1, C2. An AC power supply 7 is connected to the input side of the power factor correction circuit 9, and a load 8 is connected to the output side thereof.

When a positive voltage is input (when a potential at a first terminal of the AC power supply 7 (the upper-side terminal in the figure) is higher than a potential at the second terminal), the FET T1 is switched. When the FET T1 is in an on-state, energy is stored in the coil L1 When the FET T1 is in an off-state, the energy is released from the coil L1, and the capacitor C1 is charged with a boosted power. When a negative voltage is input (when the potential at the first terminal of the AC power supply 7 is lower than the potential at the second terminal), the FET T2 is switched. When the FET T2 is in the on-state, energy is stored in the coil L1. When the FET T2 is in the off-state, the energy is released from the coil L1, and the capacitor C2 is charged with the boosted power. The load 8 is supplied with the power from the capacitors C1, C2 connected in series. Hence the voltage applied to the load 8 is twice as large as the voltage generated by a boosting circuit including the coil L1 and the FET T1.

The power factor correction circuit 9 controls a duty ratio (a ratio of time when the FET is in the on-state in one period) of each of the FETs T1, T2 such that an input current is proportional to the input voltage, to correct a power factor. The power factor correction circuit 9 does not include a diode bridge made up of four diodes on the input side. Hence the power loss can be reduced when a current flows through the diodes. Further, the efficiency can be enhanced since the boosting ratio is one-naif as large as that of the typical boosting-type power factor correction circuit.

However, the power factor correction circuit 9 shown in FIG. 18 has a problem that when the range of the compatible input voltage (the output voltage of the AC power supply 7) is broadened, the output voltage (a DC voltage after boosting of the voltage) increases. This problem occurs, for example, when the power factor correction circuit 9 is made compatible with both a region with a commercial power supply voltage of 100 V and a region with that of 200 V.

In a boosting-type power factor correction circuit, which is not a double-boosting type and is usable in every country around the world (i.e., compatible with an input voltage of 100 V to 240 V), the output voltage is often around 400 V. It is assumed that the power factor correction circuit 9 is designed in line with the above, so that the output voltage is 400 V when the input voltage is 100 V (peak voltage is 141 V). In the power factor correction circuit 9 as thus designed, even with no boosting operation performed, the output voltage is 564 V when the input voltage is 200 V (peak voltage is 282 V), and the output voltage is 677 V when the input voltage is 240 V (peak voltage is 338 V).

As the output voltage is higher, components with higher withstand voltages are required, thus leading to increases in scale and cost of the power factor correction circuit. Further, the loss at the time of switching of a power element increases, thus leading to deterioration in efficiency of the power factor correction circuit.

The power factor correction circuit 9 shown in FIG. 18 requires the four diodes D1 to D4 of the diodes D1 to D4, the diodes D3, D4 mainly have the function of preventing a current from flowing backward. When a positive voltage is input, the diode D4 prevents a current from continuously flowing from the first terminal of the AC power supply 7 to the second terminal of the AC power supply 7 via a parasitic diode in the FET T2 and the coil L1. When a negative voltage is input, the diode D3 prevents a current from continuously flowing from the second terminal of the AC power supply 7 to the first terminal of the AC power supply 7 via the coil L1 and a parasitic diode in the FET T1.

The number of rectifier elements (diodes) included in the power factor correction circuit is preferably small. As the number of rectifier elements is smaller, the circuit can be further reduced in size and cost. Further, as the number of rectifier elements is smaller, the power loss can be further reduced when a current flows through the rectifier elements. From this point of view, the power factor correction circuit 9 shown in FIG. 18 has points to be improved.

SUMMARY OF THE INVENTION

It is therefore an object of the present invention to provide a power factor correction circuit which has a high efficiency and is compatible with an input voltage in a broad range, a power factor correction circuit which has a high efficiency and includes a small number of components, and a power supply device using these circuits.

In order to achieve the above object, the present invention has the following features.

According to a first aspect, there is provided a power factor correction circuit capable of switching an operation mode, the circuit including: first and second input terminals for inputting an input voltage; first and second output terminals; a coil; a switch circuit that boosts the input voltage to generate a boosted voltage in cooperation with the coil; a first capacitor having one end connected to the first output terminal, and the other end connected to an intermediate node; and a second capacitor having one end connected to the intermediate node, and the other end connected to the second output terminal, wherein when a potential at the first input terminal is higher than a potential at the second input terminal in a first operation mode, the boosted voltage is applied to the two ends of the first capacitor such that a potential at the one end is higher than a potential at the other end, when the potential at the first input terminal is lower than the potential at the second input terminal in the first operation mode, the boosted voltage is applied to the two ends of the second capacitor such that a potential at the one end is higher than a potential at the other end, and in a second operation mode, the boosted voltage is applied to two ends of the first and second capacitors connected in series such that the potential at the one end of the first capacitor is higher than the potential at the other end of the second capacitor.

According to a second aspect, in the first aspect, the switch circuit is a bidirectional switch including a first transistor connected between a first node and a connection node, and a second transistor connected between the connection node and a second node, the power factor correction circuit further includes: a mode switching circuit having one end connected to the second node, and the other end connected to the intermediate node, the circuit being brought into an on-state in the first operation mode and into an off-state in the second operation mode; a first rectifier element connected between the first node and the one end of the first capacitor so as to allow a current to flow from a first node side; a second rectifier element connected between the first node and the other end of the second capacitor so as to allow a current to flow to the first node side; a third rectifier element connected between the second node and the one end of the first capacitor so as to allow a current to flow from a second node side; and a fourth rectifier element connected between the second node and the other end of the second capacitor so as to allow a current to flow to the second node side, and the coil is connected at least one of between the first input terminal and the first node, and between the second input terminal and the second node.

According to a third aspect, in the second aspect, the first transistor is a MOSFET or a HEMT having a first conduction terminal connected to the first node, and a second conduction terminal connected to the connection node, the second transistor is a MOSFET or a HEMT having a second conduction terminal connected to the connection node, and a first conduction terminal connected to the second node, the first conduction terminal is one of a source terminal and a drain terminal, and the second conduction terminal is the other of the source terminal and the drain terminal.

According to a fourth aspect, in the second aspect, the first transistor is an TGBT or a bipolar transistor having a first conduction terminal connected to the first node, and a second conduction terminal connected to the connection node, the second transistor is an IGBT or a bipolar transistor having a second conduction terminal connected to the connection node, and a first conduction terminal connected to the second node, the first conduction terminal is one of an emitter terminal and a collector terminal, and the second conduction terminal is the other of the emitter terminal and the collector terminal.

According to a fifth aspect, in the second aspect, the third rectifier element is a MOSFET having a drain terminal connected to the one end of the first capacitor, and a source terminal connected to the second node, and the fourth rectifier element is a MOSFET having a drain terminal connected to the second node, and a source terminal connected to the other end of the second capacitor.

According to a sixth aspect, in the second aspect, the power factor correction circuit further includes: a third capacitor connected in parallel with the third rectifier element between the second node and the one end of the first capacitor; and a fourth capacitor connected in parallel with the fourth rectifier element between the second node and the other end of the second capacitor, wherein a wiring route from the first node to the second node via the third capacitor is shorter than a wiring route from the first node to the second node via the third rectifier element, and a wiring route from the second node to the first node via the fourth capacitor is shorter than a wiring route from the second node to the first node via the fourth rectifier element.

According to a seventh aspect, in the second aspect, the mode switching circuit is a bidirectional switch that includes first and second MOSFETs having first conduction terminals connected to each other, a second conduction terminal of the first MOSFET is connected to the second node, a second conduction terminal of the second MOSFET is connected to the intermediate node, the first conduction terminal is one of a source terminal and a drain terminal, and the second conduction terminal is the other of the source terminal and the drain terminal.

According to an eighth aspect, in the first aspect, the switch circuit includes a first transistor connected between a first node and a second node, and a second transistor connected between the second node and a third node, the power factor correction circuit further includes: a mode switching circuit having one end connected to the second node, and the other end connected to the intermediate node, the circuit being brought into an on-state in the first operation mode and into an off-state in the second operation mode; a first rectifier element connected between the first node and the one end of the first capacitor so as to allow a current to flow from a first node side; a second rectifier element connected between the third node and the other end of the second capacitor so as to allow a current to flow to a third node side; a third rectifier element connected between the first node and a fourth node so as to allow a current to flow to the first node side; and a fourth rectifier element connected between the third node and the fourth node so as to allow a current to flow from the third node side, and the coil is connected at least one of between the second input terminal and the second node, and between the first input terminal and the fourth node.

According to an ninth aspect, in the eighth aspect, the first transistor is a MOSFET or a HEMT having a drain terminal connected to the first node, and a source terminal connected to the second node, and the second transistor is a MOSFET or a HEMT having a drain terminal connected to the second node, and a source terminal connected to the third node.

According to a tenth aspect, in the eighth aspect, the first transistor is an IGBT or a bipolar transistor having a collector terminal connected to the first node, and an emitter terminal connected to the second node, and the second transistor is an IGBT or a bipolar transistor having a collector terminal connected to the second node, and an emitter terminal connected to the third node.

According to an eleventh aspect, in the first aspect, the power factor correction circuit further includes a control circuit that switches the operation mode to the first operation mode when the input voltage is lower than a first threshold, and switches the operation mode to the second operation mode when the input voltage is higher than a second threshold.

According to a twelfth aspect, there is provided a power supply device including: the power factor correction circuit according to the first aspect; and a DC-DC converter, According to a thirteenth aspect, there is provided a power factor correction circuit including: first and second input terminals; first and second output terminals; a coil; a bidirectional switch that includes first and second transistors connected in anti-series, the bidirectional switch having one end connected to a first node, and the other end connected to a second node; a first capacitor having one end connected to the first output terminal,, and the other end connected to the second node; a second capacitor having one end connected to the second node, and the other end connected to the second output terminal; a first rectifier element connected between the first node and the one end of the first capacitor so as to allow a current to flow from a first node side; and a second rectifier element connected between the first node and the other end of the second capacitor so as to allow a current to flow to the first node side, wherein the power factor correction circuit has a current path between the first and second input terminals via the coil and the bidirectional switch, and the coil is connected at least one of between the first input terminal and the first node, and between the second node and the second input terminal.

According to a fourteenth aspect, in the thirteenth aspect, the first transistor is a MOSFET or a HEMT having a first conduction terminal, and a second conduction terminal connected to the second node, the second transistor is a MOSFET or a HEMT having a first conduction terminal connected to the first conduction terminal of the first transistor, and a second conduction terminal connected to the first node, the first conduction terminal is one of a drain terminal and a source terminal, and the second conduction terminal is the other of the drain terminal and the source terminal.

According to a fifteenth aspect, in the thirteenth aspect, the first transistor is an IGBT or a bipolar transistor having a first conduction terminal, and a second conduction terminal connected to the second node, the second transistor is an IGBT or a bipolar transistor having a first conduction terminal connected to the first conduction terminal of the first transistor, and a second conduction terminal connected to the first node, the first conduction terminal is one of a collector terminal and an emitter terminal, and the second conduction terminal is the other of the collector terminal and the emitter terminal, According to a sixteenth aspect, in the thirteenth aspect, the first transistor is switched when a potential at the first input terminal is higher than a potential at the second input terminal, and the second transistor is switched when the potential at the first input terminal is lower than the potential at the second input terminal.

According to a seventeenth aspect, in the sixteenth aspect, the second transistor is controlled to an on-state when the potential at the first input terminal is higher than the potential at the second input terminal, and the first transistor is controlled to an on-state when the potential at the first input terminal is lower than the potential at the second input terminal, According to an eighteenth aspect, in the thirteenth aspect, the bidirectional switch further includes rectifier elements connected in anti-parallel with the first and second transistors.

According to a nineteenth aspect, there is provided a power supply device including: the power factor correction circuit according to the thirteenth aspect; and a DC-DC converter.

According to a twentieth aspect, there is provided a power factor correction circuit including: first and second input terminals; first and second output terminals; a coil; a first bidirectional switch that includes first and second transistors connected in anti-series, the first bidirectional switch having one end connected to a first node, and the other end connected to a second node; a first capacitor having one end connected to the first output terminal, and the other end connected to a third node; a second capacitor having one end connected to the third node, and the other end connected to the second output terminal; a second bidirectional switch connected between the second node and the third node; a first rectifier element connected between the first node and the one end of the first capacitor so as to allow a current to flow from a first node side; a second rectifier element connected between the first node and the other end of the second capacitor so as to allow a current to flow to the first node side; a third rectifier element connected between the second node and the one end of the first capacitor so as to allow a current to flow from a second node side; and a fourth rectifier element connected between the second node and the other end of the second capacitor so as to allow a current to flow to the second node side, wherein the power factor correction circuit has a current path between the first and second input terminals via the coil and the first bidirectional switch, and the coil is connected at least one of between the first input terminal and the first node, and between the second node and the second input terminal.

According to the first aspect, the boosted voltage is alternately applied to two ends of each of two capacitors in the first operation mode, and applied to two ends of the two capacitors connected in series in the second operation mode. Hence the boosting ratio in the first operation mode is larger than the boosting ratio in the second operation mode. When the boosting condition (the boosted voltage generated by the switch circuit) is made the same in each operation mode, the boosting ratio in the first operation mode is about twice as large as the boosting ratio in the second operation mode. Accordingly, when the input voltage is high, the operation mode is switched to the second operation mode with the small boosting ratio and a high efficiency, thus enabling suppression of the output voltage. Hence it is possible to provide a power factor correction circuit which has a high efficiency and is compatible with the input voltage in a broad range. Further, since a component having a small withstand voltage can be employed, the power factor correction circuit can be reduced in size and cost.

According to the second or eighth aspect, the coil, the two transistors, the mode switching circuit, the four rectifier elements, and the two capacitors are connected as described above. It is thereby possible to provide, with a simple circuit configuration, a power factor correction circuit which has a high efficiency and is compatible with the input voltage in a broad range, the power factor correction circuit alternately applying the boosted voltage to two ends of each of the two capacitors in the first operation mode and applying the boosted voltage to two ends of the two capacitors connected in series in the second operation mode. According to the second aspect, the number of elements on the current path is reduced to make the resistance of the current path small, thus further enhancing the efficiency.

According to the third aspect, the bidirectional switch for generating the boosted voltage in cooperation with the coil can be configured by using the two MOSFETs (or two HEMTs) having the drain terminals (or the source terminals) connected to each other. By using this bidirectional switch, it is possible to provide a power factor correction circuit which has a high efficiency and is compatible with the input voltage in a broad range. When the drain terminals are connected to each other, one heat sink can be shared by the two MOSFETs to make the distance between the two MOSFETs small and the parasitic inductance of the current path small, thus reducing the noise. Further, it is possible to prevent the control circuit for the bidirectional switch from being influenced by noise or surge, thus preventing the control circuit from generating radiation noise. Moreover, it is possible to stabilize the potentials at the source terminals of the first and second transistors and reduce the noise, thus enabling stable operation of the power factor correction circuit. When the source terminals are connected to each other, the power supply of the control circuit for the bidirectional switch can be simplified.

According to the fourth aspect, the bidirectional switch for generating the boosted voltage in cooperation with the coil can be configured by using the two IGBTs (or the two bipolar transistors) having the collector terminals (or the emitter terminals) connected to each other. By using this bidirectional switch, it is possible to provide a power factor correction circuit which has a high efficiency and is compatible with the input voltage in a broad range. When the collector terminals are connected to each other, it is possible to prevent the control circuit for the bidirectional switch from being influenced by noise or surge, thus preventing the control circuit from generating radiation noise. Further, it is possible to stabilize the potentials at the emitter terminals of the first and second transistors and reduce the noise, thus enabling stable operation of the power factor correction circuit. When the emitter terminals are connected to each other, the power supply of the control circuit for the bidirectional switch can be simplified, According to the fifth aspect, it is possible to provide a power factor correction circuit which has a high efficiency and is compatible with the input voltage in a broad range by using the MOSFETs as the third and fourth rectifier elements.

According to the sixth aspect, by storing the power supplied from the coil in the capacitors which are disposed near the switch circuit, the wiring route in which the current amount greatly changes by switching can be made short, whereby the noise at the time of switching can be reduced.

According to the seventh aspect, the mode switching circuit that allows a current to flow bidirectionally can be configured by using the two MOSFETs having the drain terminals (or the source terminals) connected to each other. By using this mode switching circuit, it is possible to provide a power factor correction circuit which has a high efficiency and is compatible with the input voltage in a broad range.

According to the ninth or tenth aspect, the switch circuit for generating the boosted voltage in cooperation with the coil can be configured by using any of the two MOSFETs, the two HEMTs, the two IGBTs, and the two bipolar transistors. By using this switch circuit, it is possible to provide a power factor correction circuit which has a high efficiency and is compatible with the input voltage in a broad range.

According to the eleventh aspect, by switching the operation mode in accordance with the input voltage, it is possible to provide a power factor correction circuit that is automatically compatible with the input voltage even when the input voltage greatly fluctuates.

According to the twelfth aspect, it is possible to provide a power supply device which has a high efficiency and is compatible with the input voltage in a broad range by using the power factor correction circuit according to the first aspect.

According to the thirteenth aspect, the voltage generated by the boosting circuit including the coil and the bidirectional switch is alternately applied to each of the two capacitors, thereby enabling output of the voltage that is twice as large as the voltage generated by the boosting circuit. Hence it, is possible to constitute a power factor correction circuit by using a small-sized element with a small withstand voltage and reduce the circuit in size and cost. Further, since the boosting ratio in the boosting circuit is small, the switching loss can be reduced to enhance the efficiency of the power factor correction circuit. Moreover, the number of rectifier elements may be two. Hence it is possible to provide a power factor correction circuit which has a high efficiency and includes a small number of components. When the coil is connected between the second node and the second input terminal, the connection point of the two capacitors is connected to the second input terminal not via a coil, whereby the common-mode noise can be reduced. When the coil is connected both between the first input terminal and the first node and between the second node and the second input terminal, the inductance of each coil can be made small by using two coils.

According to the fourteenth aspect, the bidirectional switch including the two transistors connected in anti-series can be configured by connecting the drain terminals (or the source terminals) of the two MOSFETs (or the two HEMTs) to each other. By using this bidirectional switch, it is possible to provide a power factor correction circuit which has a high efficiency and includes a small number of components. When the drain terminals are connected to each other, the two transistors can be connected to one heat sink, to thereby make the distance between the two transistors small and the parasitic inductance of the current path small, thus reducing the noise of the power factor correction circuit. Further, by connecting the source terminals of the two transistors to the first and second input terminals, the control circuit for the bidirectional switch can be prevented from being influenced by noise or the like, and the potentials at the source terminals of the two transistors can be stabilized, thus leading to stable operation of the power factor correction circuit.

According to the fifteenth aspect, the bidirectional switch including the two transistors connected in anti-series can be configured by connecting the collector terminals (or the emitter terminals) of the two IGBTs (or the bipolar transistors) to each other. By using this bidirectional switch, it is possible to provide a power factor correction circuit which has a high efficiency and includes a small number of components. When the collector terminals are connected to each other, the two transistors can be connected to one neat sink, to thereby make the distance between the two transistors small and a parasitic inductance of the current path small, thus reducing the noise of the power factor correction circuit. Further, by connecting the emitter terminals of the two transistors to the first and second input terminals, the control circuit for the bidirectional switch can be prevented from being influenced by noise or the like, and the potentials at the emitter terminals of the two transistors can be stabilized, thus leading to stable operation of the power factor correction circuit.

According to the sixteenth aspect, the first and second transistors are switched in accordance with the polarity of the input voltage, to alternately apply, to each of the two capacitors, the voltage generated by the boosting circuit including the coil and the bidirectional switch, thus enabling output of the voltage that is twice as large as the voltage generated by the boosting circuit.

According to the seventeenth aspect, the transistor not to be switched, of the first and second transistors, is controlled to the on-state. Accordingly, the loss due to the voltage drop in the parasitic diode built in the transistor can be reduced.

According to the eighteenth aspect, even when the parasitic diodes are not built in the first and second transistors, the bidirectional switch can be configured by connecting the rectifier elements in anti-parallel with the first and second transistors. By using this bidirectional switch, it is possible to provide a power factor correction circuit which has a high efficiency and includes a small number of components.

According to the nineteenth aspect, it is possible to provide a power supply device which has a high efficiency and includes a small number of components by using the power factor correction circuit according to the thirteenth aspect.

According to the twentieth aspect, by controlling the conduction state of the second bidirectional switch in accordance with the input voltage, selection can be made between the operation mode in which the boosting ratio is held small and double voltage boosting is performed with a high efficiency, and the operation mode in which the double voltage boosting is not performed. Hence it is possible to provide a power factor correction circuit which outputs a fixed voltage with respect to the broad range of the input voltage, and which has a high efficiency even when the input voltage is low.

These and other objects, features, aspects and effects of the present invention will be more apparent from the following detailed description with reference to the attached drawings.

DESCRIPTION OF PREFERRED EMBODIMENTS

First Embodiment

Figure 1:
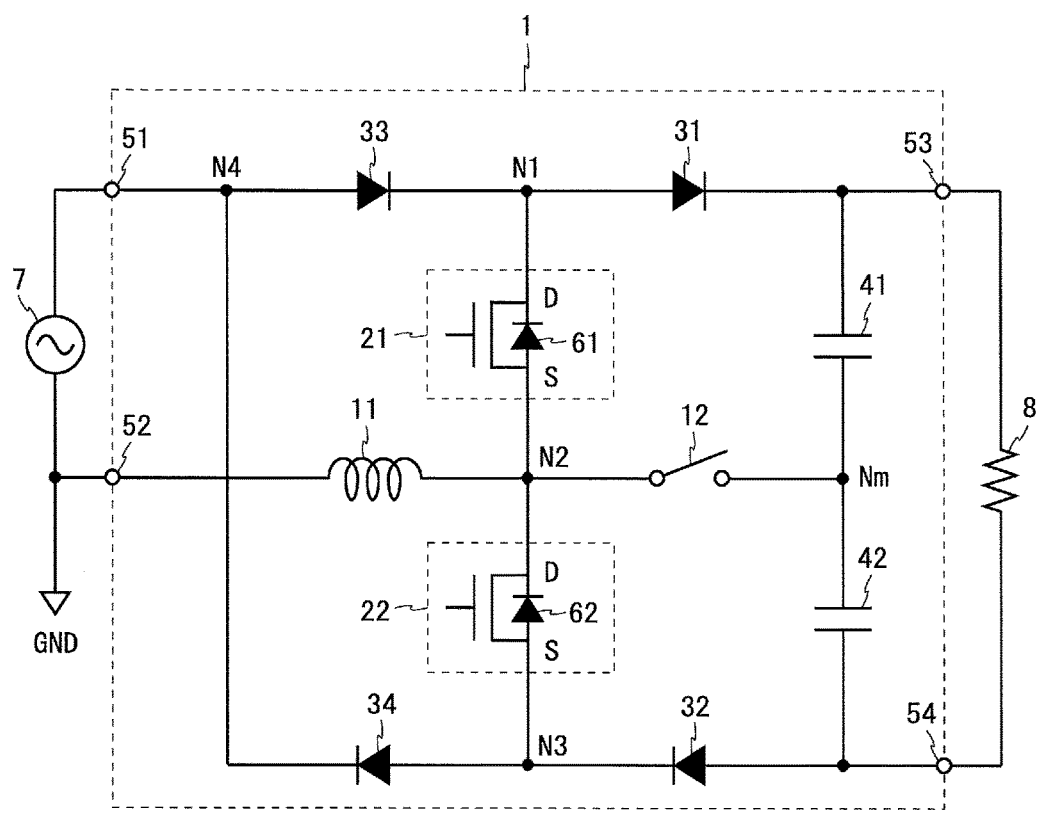
FIG. 1 is a circuit diagram of a power factor correction circuit according to a third embodiment of the present invention.

FIG. 1 is a circuit diagram of a power factor correction circuit according to a first embodiment of the present invention. A power factor correction circuit 1 shown in FIG. 1 includes a coil 11, a switch 12, N-channel MOSFETs (Metal Oxide Semiconductor Field Effect Transistors) 21, 22, diodes 31 to 34, capacitors 41, 42, input terminals 51, 52, and output terminals 53, 54. The MOSFETs 21, 22 respectively have parasitic diodes 61, 62 built therein. The power factor-correction circuit 1 has a function of switching an operation mode. The switch 12 functions as a mode switching circuit, and the diodes 31 to 34 respectively function as first to fourth rectifier elements.

In the power factor correction circuit 1, one end of the coil 11 (the left end in the figure) is connected to the input terminal 52. The other end of the coil 11 is connected to a source terminal of the MOSFET 21, a drain terminal of the MOSFET 22, and one end of the switch 12 (the left end in the figure). A drain terminal of the MOSFET 21 is connected to an anode terminal of the diode 31, and a cathode terminal of the diode 33. A source terminal of the MOSFET 22 is connected to a cathode terminal of the diode 32 and an anode terminal of the diode 34. An anode terminal of the diode 33 and a cathode terminal of the diode 34 are connected to the input terminal 51. A cathode terminal of the diode 31 is connected to one end of the capacitor 41 (the upper end in the figure) and the output terminal 53. The other end of the capacitor 41 is connected to one end of the capacitor 42 (the upper end in the figure) and the other end of the switch 12. An anode terminal of the diode 32 and the other end of the capacitor 42 are connected to the output terminal 54. An anode terminal of the parasitic diode 61 is connected to the source terminal of the MOSFET 21, and a cathode terminal of the parasitic diode 61 is connected to the drain terminal of the MOSFET 21. This also applies to the parasitic diode 62.

An AC power supply 7 is connected to the input side of the power factor correction circuit 1, and a load 8 is connected to the output side thereof. A first terminal of the AC power supply 7 (the upper-side terminal in the figure) is connected to the input terminal 51, and a second terminal of the AC power supply 7 is connected to the input terminal 52. One terminal of the load 8 is connected to the output terminal 53, and the other terminal of the load S is connected to the output terminal 54.

The source terminal of the MOSFET 21 and the drain terminal of the MOSFET 22 are connected to the input terminal 52 via the coil 11, and supplied with power from the second terminal of the AC power supply 7. The drain terminal of the MOSFET 21 is connected to the input terminal 51 via the diode 33, and supplied with power from the first terminal of the AC power supply 7. The source terminal of the MOSFET 22 is connected to the input terminal 51 via the diode 34, and supplied with the power from the first terminal of the AC power supply 7.

The capacitors 41, 42 are connected in series. Hereinafter, a node to which the other end of the capacitor 41 and the one end of the capacitor 42 are connected is referred to as an intermediate node Nm. The one end of the capacitor 41 is connected to the drain terminal of the MOSFET 21 via the diode 31. The other end of the capacitor 42 is connected to the source terminal of the MOSFET 22 via the diode 32. The intermediate node Nm is connected to the other end of the coil 11, the source terminal of the MOSFET 21, and the drain terminal of the MOSFET 22 via the switch 12.

Hereinafter, a node to which the drain terminal of the MOSFET 21 is connected is referred to as N1, a node to which the source terminal of the MOSFET 21 is connected is referred to as N2, a node to which the source terminal of the MOSFET 22 is connected is referred to as N3, and a node to which the anode terminal of the diode 33 is connected is referred to as N4. The diode 31 is connected between the node N1 and the one end of the capacitor 41 so as to allow a current to flow from a node N1 side. The diode 32 is connected between the node N3 and the other end of the capacitor 42 so as to allow a current to flow to a node N3 side. The diode 33 is connected between the node N1 and the node N4 so as to allow a current to flow to the node N1 side. The diode 34 is connected between the node N3 and the node N4 so as to allow a current to flow from the node N3 side.

The coil 11 charges and discharges the power when performing boosting operation (detailed later). An inductance of the coil 11 is 100 fill to 1 mH, for example. The inductance of the coil 11 may be a value outside this range. For the switch 12, for example, a bidirectional switch made up of a relay, a semiconductor power element, and the like, is used.

For each of the diodes 31, 32, for example, an FRD (Fast Recovery Diode), a SiC (Silicon Carbide) diode, or the like, is used. For each of the diodes 33, 34, a diode having a desired withstand voltage is used. A diode with the possibly smallest forward drop voltage (Vf) is preferably used for each of the diodes 33, 34 under the condition that the diode has a desired withstand voltage. The capacitors 41, 42 store the power to smooth the output voltage. For each of the capacitors 41, 42, for example, an electrolytic capacitor is used. Capacitances of the capacitors 41, 42 are the same, being from 100 µF to 10 mF, for example. Note that, the capacitances of the capacitors 41, 42 may be different, and may be values outside the above range.

The power factor correction circuit 1 is configured so as to be usable in every country around the world and compatible with the commercial power supply in each country. The power factor correction circuit 1 has a feature that it operates -with a high efficiency irrespective of the input voltage (the output voltage of the AC power supply 7). The commercial power supply voltage in each country is within the range of approximately 100 V to 240 V, and classified into one within the range of 100 V to 130 V, and one within the range of 200 V to 240 V. A typical boosting-type power factor correction circuit usable in every country around the world boosts the input voltage to about 400 V irrespective of the level of the input voltage so that the circuit stably operates even when the input voltage slightly exceeds 240 V (peak voltage is 338 V). However, in such a boosting-type power factor correction circuit, the boosting ratio is large when the input voltage is low, causing large loss of the boosting circuit and deterioration in conversion efficiency. In contrast, the power factor correction circuit 9 shown in FIG. 18 has a feature that a conversion efficiency is high even when the input voltage is low. However, the power factor correction circuit 9 has a problem that the output voltage is excessively high when the input voltage is high.

In the power factor correction circuit 1, a first threshold and a second threshold that is greater than or equal to the first threshold are set concerning the input voltage. When the input voltage is lower than the first threshold, the switch 12 enters an on-state, and the power factor correction circuit 1 operates in a first operation mode. When the input voltage is higher than the second threshold, the switch 12 enters an off-state, and the power factor correction circuit 1 operates in a second operation mode. When the power factor correction circuit 1 is made compatible with the commercial power supply in each country, the first and second thresholds are both set to 140 V, for example. In this case, the power factor correction circuit 1 operates in the first operation mode when the input voltage is lower than 140 V, and operates in the second operation mode when the input voltage is higher than 140 V.

The power factor correction circuit 1 performs different operations in the first operation mode and the second operation mode. Further, the power factor correction circuit 1 performs different operations when a potential at the input terminal 51 is higher than a potential at the input terminal 52 (hereinafter referred to as "when a positive voltage is input") and when the potential at the input terminal 51 is lower than the potential at the input terminal 52 (hereinafter referred to as "when a negative voltage is input"). Moreover, the power factor correction circuit 1 performs different operations in accordance with the state of the MOSFET 21 when a positive voltage is input, and performs different operations in accordance with the state of the MOSFET 22 when a negative voltage is input.

FIGS. 2A to 2D are diagrams each showing a current path in the first operation mode in the power factor correction circuit 1. Herein, the input voltage is assumed to be an AC voltage of 100 V. When a positive voltage is input and the MOSFET 21 is in the on-state, a current flows through a path P11 shown in FIG. 2A. The current flows from the first terminal of the AC power supply 7 to the second terminal of the AC power supply 7 via the input terminal 51, the diode 33, the MOSFET 21, the coil 11, and the input terminal 52. While the current is flowing through the path P11, a voltage is applied from, the AC power supply 7 to two ends of the coil 11, and energy is stored in the coil 11.

Figure 2A:
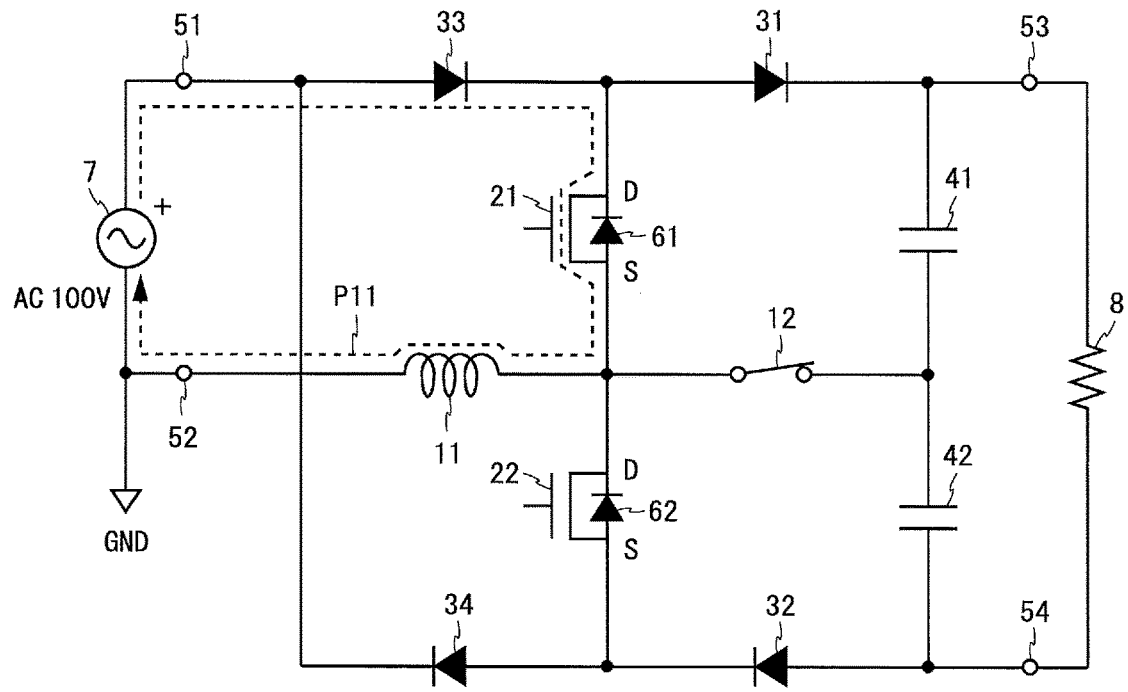
FIG. 2A is a diagram showing a current path in a first operation mode in the power factor correction circuit shown in FIG. 1.
Figure 2B:
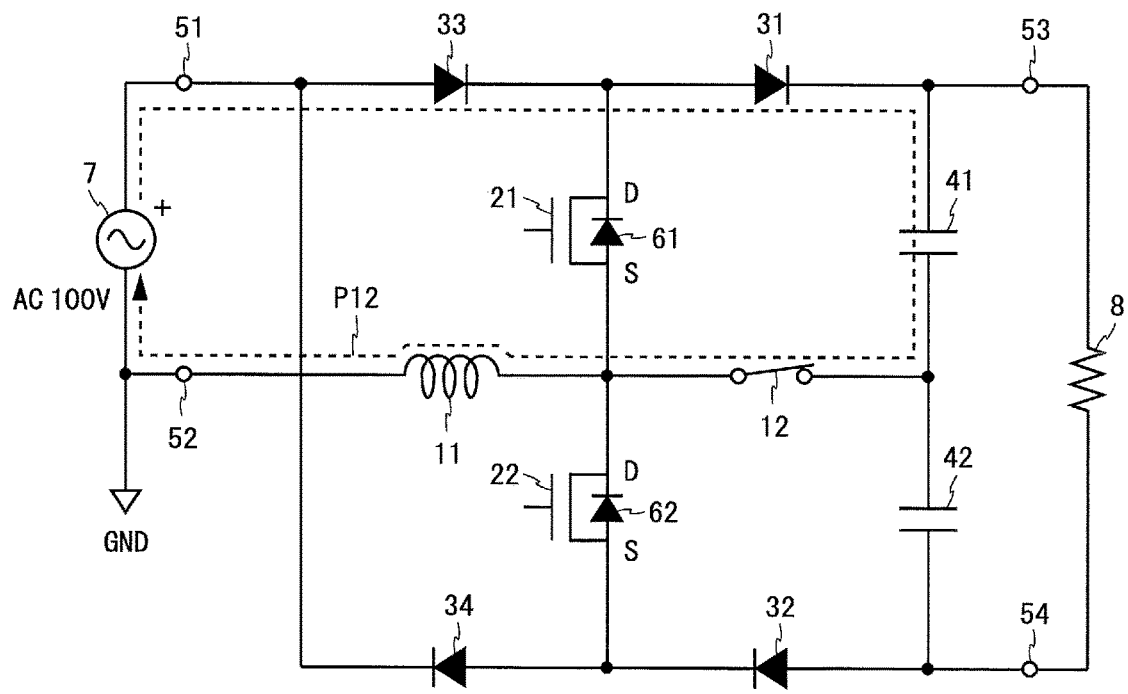
FIG. 2B is a diagram showing a current path in the first operation mode in the power factor correction circuit shown in FIG. 1.

When the positive voltage is input and the MOSFET 21 is in the off-state, a current flows through a path P12 shown in. FIG. 2B. The current flows from the first terminal of the AC power supply 7 to the second terminal of the AC power supply 7 via the input terminal 51, the diode 33, the diode 31, the capacitor 41, the switch 12, the coil 11, and the input terminal 52. While the current is flowing through the path P12, the coil 11 is connected in series with the AC power supply 7, and the energy is released from the coil 11. At this time, a voltage obtained by boosting the input voltage is applied to the capacitor 41, and the capacitor 41 is charged with the boosted voltage.

Figure 2C:
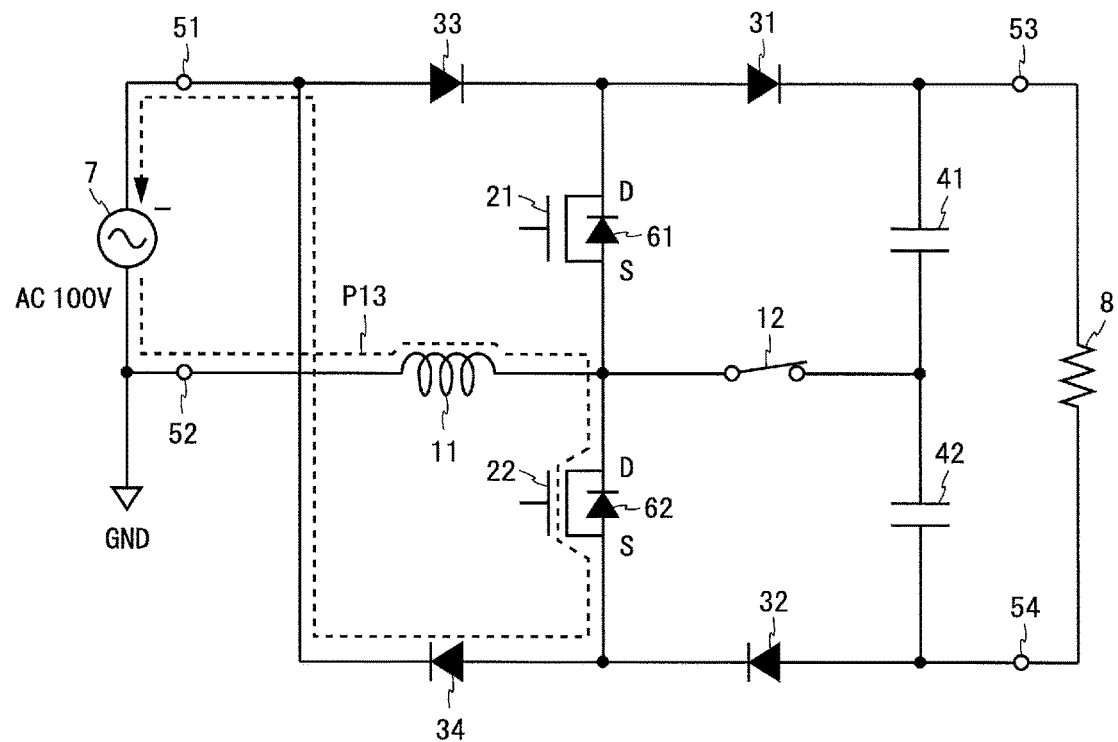
FIG. 2C is a diagram showing a current path in the first operation mode in the power factor correction circuit shown in FIG. 1.

When a negative voltage is input and the MOSFET 22 is in the on-state, a current flows through a path P13 shown in FIG. 2C. The current flows from the second terminal of the AC power supply 7 to the first, terminal of the AC power supply 7 via the input terminal 52, the coil 11, the MOSFET 22, the diode 34, and the input terminal 51. While the current is flowing through the path P13, the voltage is applied from the AC power supply 7 to the two ends of the coil 11, and energy is stored in the coil 11.

Figure 2D:
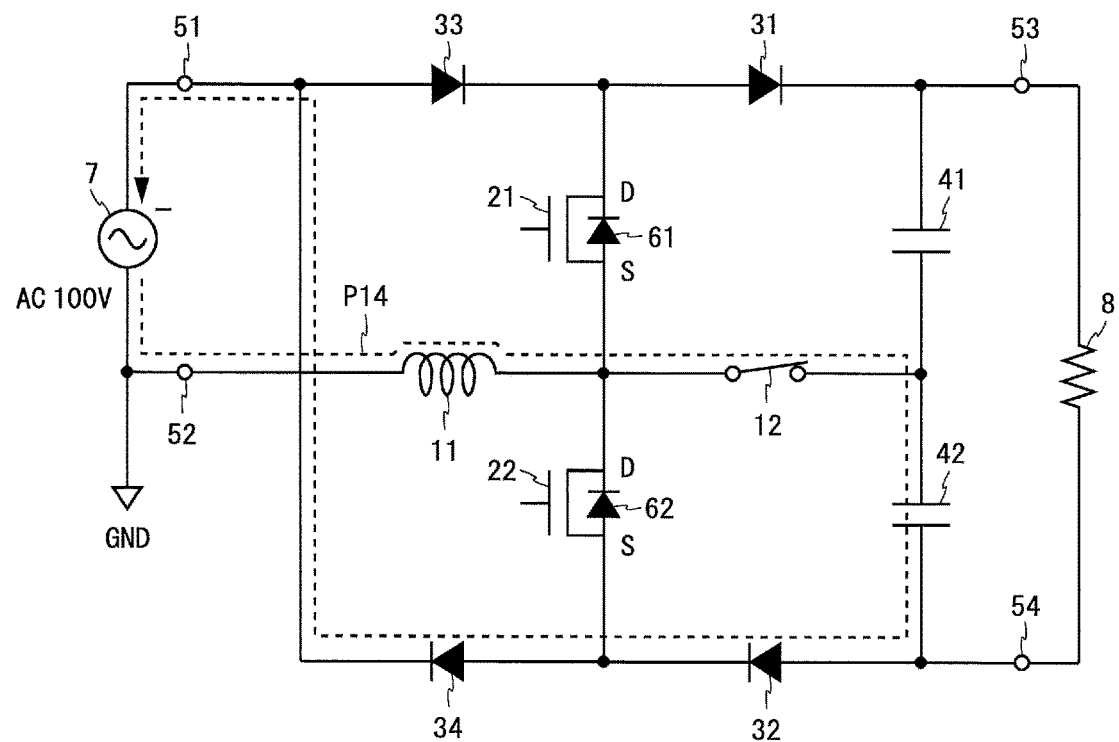
FIG. 2D is a diagram showing a current path in the first operation mode in the power factor correction circuit shown in FIG. 1.

When, the negative voltage is input and the MOSFET 22 is in the off-state, a current flows through a path P14 shown in FIG. 2D. The current flows from the second terminal of the AC power supply 7 to the first terminal of the AC power supply 7 via the input terminal 52, the coil 11, the switch 12, the capacitor 42, the diode 32, the diode 34, and the input terminal 51. While the current is flowing through the path P14, the coil 11 is connected in series with the AC power supply 7, and the energy is released from the coil 11. At this time, a voltage obtained by boosting the input voltage is applied to the capacitor 42, and the capacitor 42 is charged with the boosted voltage.

FIGS. 3A to 3D are diagrams each showing a current path in the second operation mode in the power factor correction circuit 1. Herein, the input voltage is assumed to be an AC voltage of 200 V. When a positive voltage is input and the MOSFET 21 is in the on-state, a current flows through a path P15 shown in FIG. 3A. The path P15 is the same as the path P11 shown in FIG. 2A. While the current is flowing through the path P15, the voltage is applied from the AC power supply 7 to the two ends of the coil 11, and energy is stored in the coil 11.

Figure 3A:
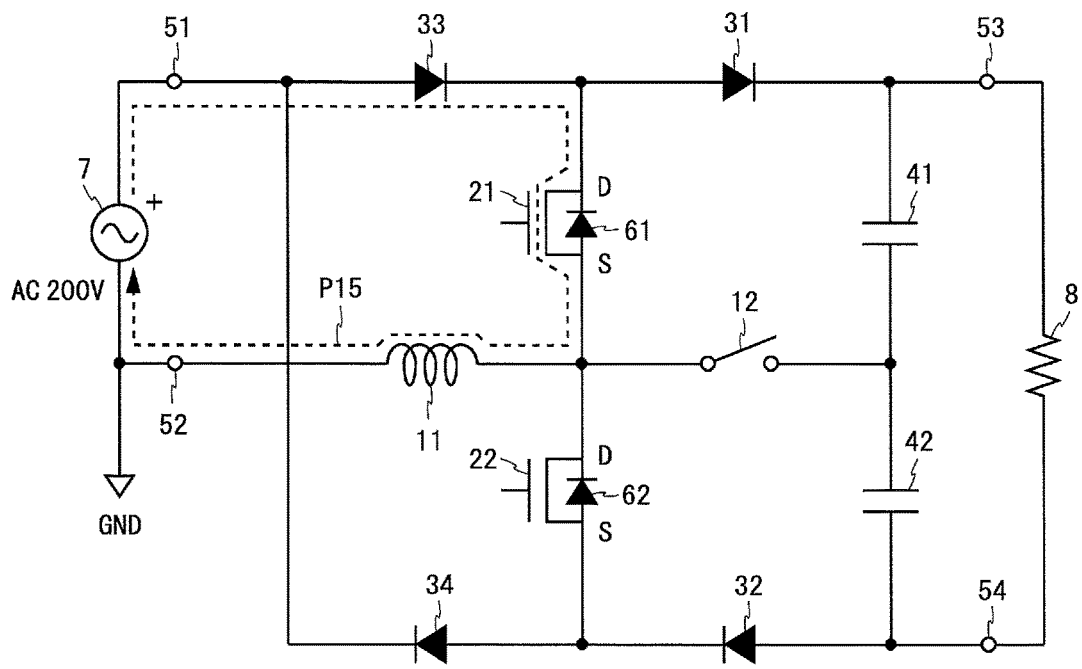
FIG. 3A is a diagram showing a current path in a second operation mode in the power factor correction circuit shown in FIG. 1.
Figure 3B:
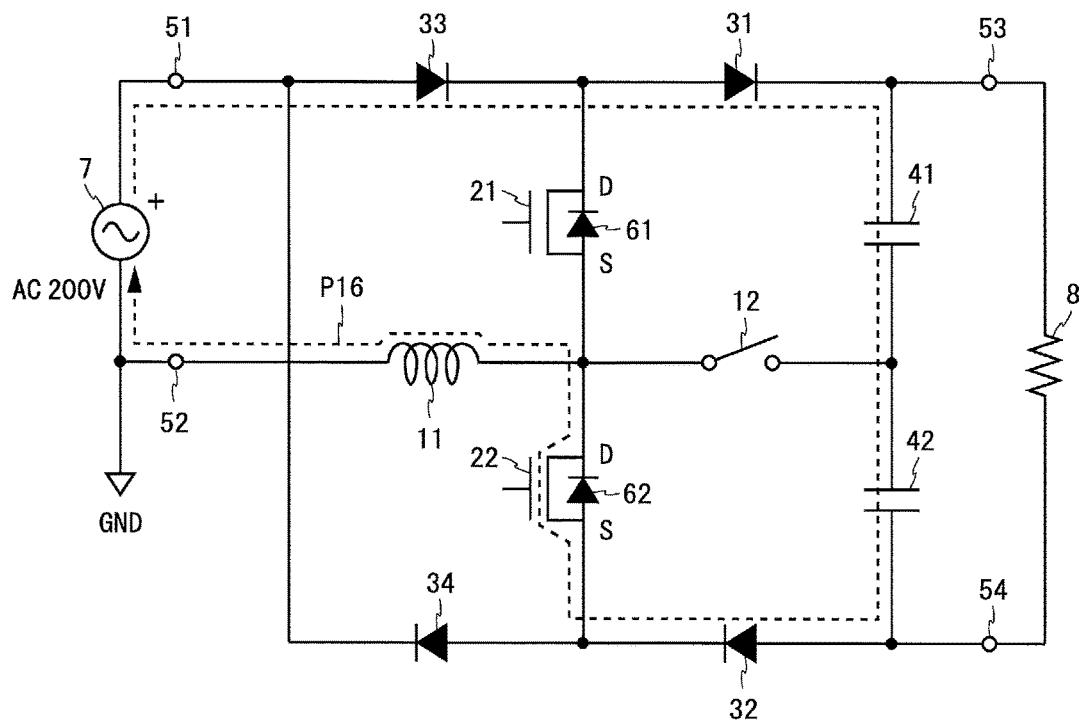
FIG. 3B is a diagram showing a current path in the second operation mode in the power factor correction circuit shown in FIG. 1.

When the positive voltage is input and the MOSFET 21 is in the off-state, a current flows through a path P16 shown in FIG. 3B. The current flows from the first terminal of the AC power supply 7 to the second terminal of the AC power supply 7 via the input terminal 51, the diode 33, the diode 31, the capacitor 41, the capacitor 42, the diode 32, the MOSFET 22, the coil 11, and the input terminal 52. While the current is flowing through the path P16, the coil 11 is connected in series with the AC power supply 7, and the energy is released from, the coil 11. At this time, a voltage obtained by boosting the input voltage is applied to the capacitors 41, 42 connected in series, and the capacitors 41, 42 are charged with the boosted voltage. Note that, when the positive voltage is input and the MOSFET 21 is in the off-state, even when the MOSFET 22 is in the off-state, the current flows via the parasitic diode 62 in the MOSFET 22. However, in order to reduce the conduction resistance, it is preferable to turn the MOSFET 22 to the on-state at this time.

Figure 3C:
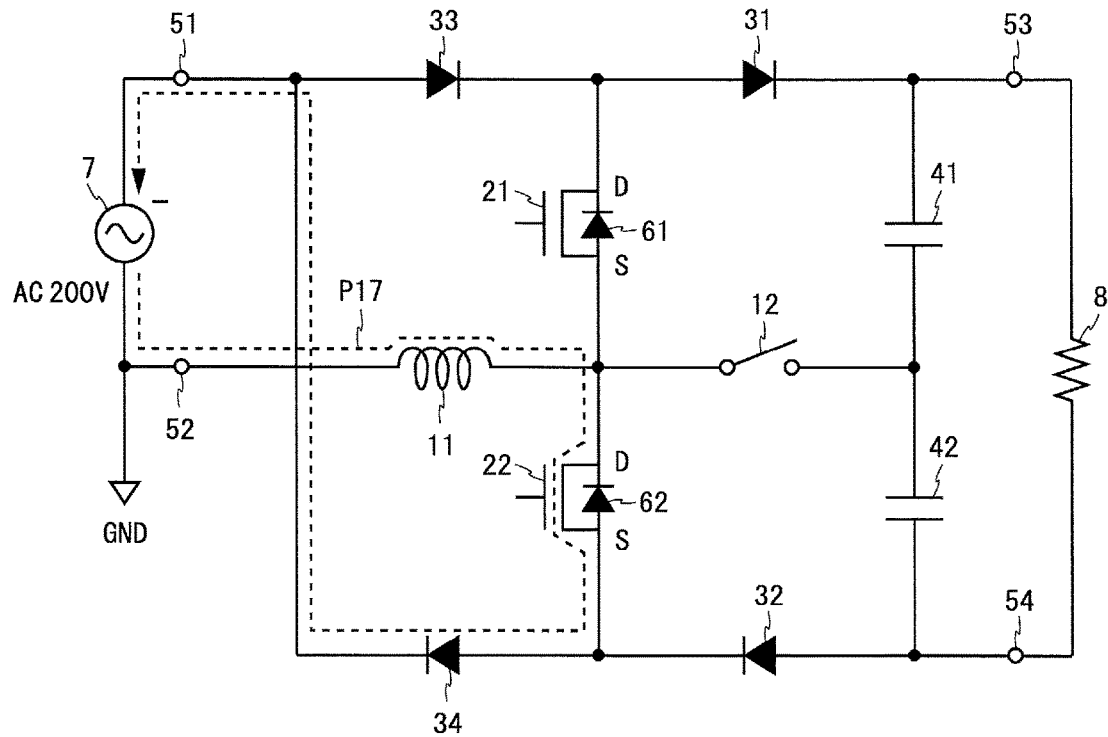
FIG. 3C is a diagram showing a current path in the second operation mode in the power factor correction circuit shown in FIG. 1.

When a negative voltage is input and the MOSFET 22 is in the on-state, a current flows through a path P17 shown in FIG. 3C. The path P17 is the same as the path P13 shown in FIG. 2C. While the current is flowing through the path P17, the voltage is applied from the AC power supply 7 to the two ends of the coil 11, and energy is stored in the coil 11.

Figure 3D:
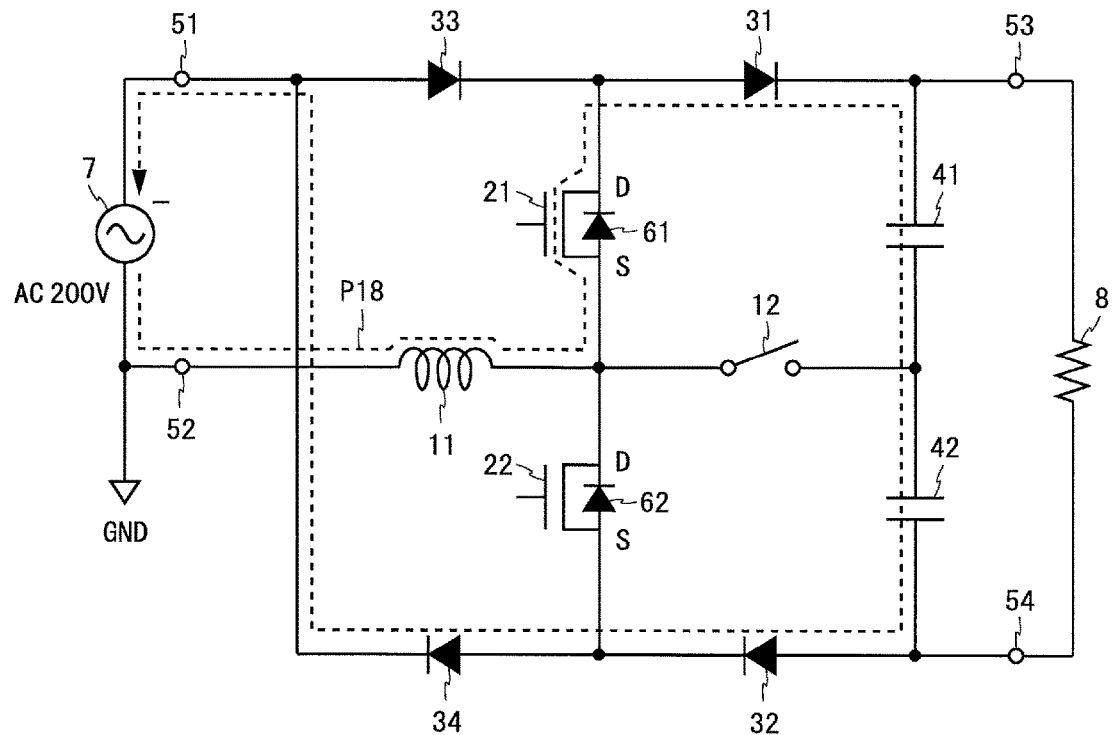
FIG. 3D is a diagram showing a current path in the second operation mode in the power factor correction circuit shown in FIG. 1.

When the negative voltage is input and the MOSFET 22 is in the off-state, a current flows through a path P18 shown in FIG. 3D. The current flows from the second terminal of the AC power supply 7 to the first terminal of the AC power supply 7 via the input terminal 52, the coil 11, the MOSFET 21, the diode 31, the capacitor 41, the capacitor 42, the diode 32, the diode 34, and the input terminal 51. While the current is flowing through the path P18, the coil 11 is connected in series with the AC power supply 7, and the energy is released from the coil 11. At this time, the voltage obtained by boosting the input voltage is applied to the capacitors 41, 42 connected in series, and the capacitors 41, 42 are charged with the boosted voltage. Note that, when the negative voltage is input and the MOSFET 22 is in the off-state, even when the MOSFET 21 is in the off-state, the current flows via the parasitic diode 61 in the MOSFET 21. However, in order to reduce the conduction resistance, it is preferable to turn the MOSFET 21 to the on-state at this time.

As thus described, in the first operation mode, the switch 12 enters the on-state, and the boosted voltage is applied to the two ends of the capacitor 41 such that the potential at the one end is higher than the potential at the other end when a positive voltage is input, and the boosted voltage is applied to the two ends of the capacitor 42 such that the potential at the one end is higher than the potential at the other end when a negative voltage is input. In the second operation mode, the switch 12 enters the off-state, and the boosted voltage is applied to two ends of the capacitors 41, 42 connected in series such that the potential at the one end of the capacitor 41 is higher than the potential at the other end of the capacitor 42 both when the positive voltage is input and when the negative voltage is input. The voltage at the two ends of the capacitors 41, 42 connected in series is output from the output terminals 53, 54. Accordingly, when the boosting condition (the boosted voltage generated by a switch circuit) is made the same in each operation mode, the boosting ratio in the first operation mode is about twice as large as the boosting ratio in the second operation mode.

In the power factor correction circuit 1, a measurement circuit and a control circuit (neither is shown) are provided. The measurement circuit measures the voltage and the current supplied from the AC power supply 7 to the power factor correction circuit 1, as necessary. Based on the measurement results of the voltage and the current, the control circuit controls a duty ratio of each of the MOSFETs 21, 22 such that the current is proportional to the voltage. Further, the control circuit compares the measured voltage (input voltage) -with the first and second thresholds, and switches the operation mode to the first operation mode when the input voltage is lower than the first threshold, and switches the operation mode to the second operation mode when the input voltage is higher than the second threshold. By switching the operation mode in accordance with the input voltage in this manner, the power factor correction circuit 1 can be made automatically compatible with the input voltage even when the input, voltage greatly fluctuates.

When the first and second thresholds are both set to 140 V, the control circuit switches the operation mode to the first operation mode when the input voltage is lower than 140 V, and switches the operation, mode to the second operation mode when the input voltage is higher than 140 V. In both operation modes, the output voltage of the power factor correction circuit 1 can be set to the same level (e.g., 400 V).

When the first threshold is set to 130 V and the second threshold is set to 140 V, the control circuit switches the operation mode to the first operation mode when, the input voltage is lower than 130 V, and switches the operation mode to the second operation mode when the input voltage is higher than 140 V. Note that, when different values are set to the first and second thresholds, an initial value for the operation mode needs to be previously determined concerning a case where the input voltage at the start of the operation is between the first threshold and the second threshold.

As shown above, the power factor correction circuit 1 according to the present embodiment includes: the first and second input terminals 51, 52 for inputting an input voltage; the first and second output terminals 53, 54; the coil 11; a switch circuit (MOSFETs 21, 22) that boosts the input voltage to generate a boosted voltage in cooperation with the coil 11; the first capacitor 41 having one end connected to the first output terminal, and the other end connected to the intermediate node Nm; the second capacitor 42 having one end connected to the intermediate node Nm, and the other end connected to the second output terminal. The boosted voltage is applied to the two ends of the first capacitor such that the potential at the one end is higher than the potential at the other end when the potential at the first input terminal is higher than the potential at the second input terminal (when a positive voltage is input) in the first operation mode, the boosted voltage is applied to the two ends of the second capacitor such that a potential at the one end is higher than a potential at the other end when the potential at the first input terminal is lower than the potential at the second input terminal (when a negative voltage is input) in the first operation mode, and in the second operation mode the boosted voltage is applied to two ends of the first and second capacitors connected in series such that the potential at the one end of the first capacitor is higher than the potential at the other end of the second capacitor.

The boosted voltage is alternately applied to two ends of each of two capacitors in the first operation mode, and applied to two ends of the two capacitors connected in series in the second operation mode. Thus, when the boosting condition (the boosted voltage generated by the switch circuit) is made the same in each operation mode, the boosting ratio in the first operation mode is about, twice as large as the boosting ratio in the second operation mode. Accordingly, when the input voltage is high, the operation mode is switched to the second operation mode with the small boosting ratio and a high efficiency, thus enabling suppression of the output voltage. Thus, the power factor correction circuit 1 according to the present embodiment has a high efficiency and is compatible with the input voltage in a broad range. Further, since a component having a small withstand voltage can be employed, the power factor correction circuit 1 can be reduced in size and cost.

Further, the switch circuit includes a first transistor (MOSFET 21) connected between the first node N1 and the second node N2, and a second transistor (MOSFET 22) connected between the second node and the third node N3. The power factor correction circuit 1 includes: a mode switching circuit (switch 12) having one end connected to the second node, and the other end connected to the intermediate node Nm, the circuit being brought into the on-state in the first operation mode and into the off-state in the second operation mode; a first rectifier element (diode 31) connected between the first node and the one end of the first capacitor so as to allow a current to flow from, a first node side; a second rectifier element (diode 32) connected between the third node and the other end of the second capacitor so as to allow a current to flow to a third node side; a third rectifier element (diode 33) connected between the first node and the fourth node N4 so as to allow a current to flow to the first node side; and a fourth rectifier element (diode 34) connected between the third node and the fourth node so as to allow a current to flow from the third node side. The coil 11 is connected between the second input terminal and the second node. By connecting the coil, the two transistors, the mode switching circuit, the four rectifier elements, and the two capacitors as described above, it is possible to alternately apply the boosted voltage to the two ends of each of the two capacitors in the first operation mode and to apply the boosted voltage to two ends of the two capacitors connected in series in the second operation mode, with a simple circuit configuration.

The first transistor is a MOSFET having a drain terminal connected to the first node, and a source terminal connected to the second node, and the second transistor is a MOSFET having a drain terminal connected to the second node, and a source terminal connected to the third node. It is possible to constitute the switch circuit for generating a boosted voltage in cooperation with the coil by using the two MOSFETs.

Further, the power factor correction circuit 1 includes a control circuit that switches the operation mode to the first operation mode when the input voltage is lower than the first threshold, and switches the operation mode to the second operation mode when the input voltage is higher than the second threshold. By switching the operation mode in accordance with the input voltage in this manner, the power factor correction circuit 1 can be made compatible with the input voltage even -when the input voltage greatly fluctuates.

As for the power factor correction circuit 1 according to the present embodiment, it is possible to constitute the following modifications. The power factor correction circuit 1 shown in FIG. 1 has been assumed to include the N-channel MOSFETs 21, 22, but a power factor correction circuit according to a modification may include P-channel MOSFETs. Further, in place of the MOSFETs 21, 22, a power factor correction circuit according to another modification may include IGBTs (Insulated Gate Bipolar Transistors), or bipolar transistors. In this case, an FRD is externally attached to each IGBT or bipolar transistor. An anode terminal of the FRD is connected to an emitter terminal of the IGBT or the bipolar transistor, and a cathode terminal of the FRD is connected to a collector terminal of the IGBT or the bipolar transistor.

In place of the MOSFETs 21, 22, a power factor correction circuit according to yet another modification may include GaN-HEMTs (GaN-High Electron Mobility Transistors). When the GaN-HEMT is a normally-of f type, an FRD or the like is externally attached to each GaN-HEMT. When the GaN-HEMT is a normally-on type, a silicon MOSFET is preferably connected in cascode to each GaN-HEMT.

Second Embodiment

Figure 4:
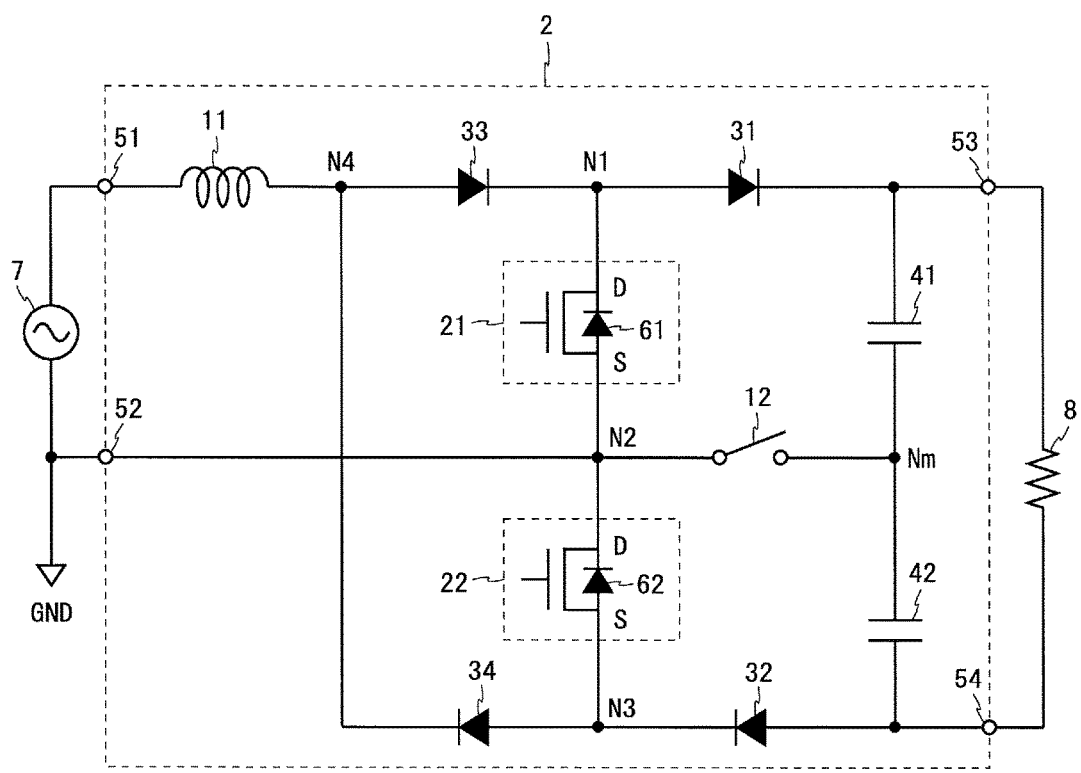
FIG. 4 is a circuit diagram of a power factor correction circuit according to a second embodiment of the present invention.

FIG. 4 is a circuit diagram of a power factor correction circuit according to a second embodiment of the present invention. A power factor correction circuit 2 shown in FIG. 4 is obtained by changing the connection position of the coil 11 in the power factor correction circuit 1 according to the first embodiment. In each embodiment shown below, a constituent which is the same as that in the above-described embodiment is provided with the same reference numeral and the description thereof is omitted. Hereinafter, a difference from the first embodiment is described.

In the power factor correction circuit 2, one end of the coil 11 (the left end in the figure) is connected to the input terminal 51. The other end of the coil 11 is connected to an anode terminal of the diode 33 and a cathode terminal of the diode 34. The input terminal 52 is connected to a source terminal of the MOSFET 21, a drain terminal of the MOSFET 22, and one end of the switch 12 (the left end in the figure), not via a coil.

In the power factor correction circuit 2, the coil 11 is connected between the first input terminal (input terminal 51) and the fourth node N4. The power factor correction circuit 2 operates similarly to the power factor correction circuit 1 according to the first embodiment. Similarly to the power factor correction circuit 1, the power factor correction circuit 2 has a high efficiency and is compatible with the input voltage in a broad range.

In the power factor correction circuit 2, since the one end of the switch 12 is directly connected to the input terminal 52, a potential at the intermediate node Nm becomes equal to a potential at the second terminal of the AC power supply 7 in the first operation mode in which the switch 12 is in the on-state. Hence potentials at the output terminals 53, 54 in the first operation mode are separated from the potential at the second terminal of the AC power supply 7 by the same amount in the opposite direction. Thus, according to the power factor correction circuit 2, even when the voltage at the two ends of the coil 11 fluctuates, the common-mode noise can be reduced.

As for the power factor correction circuit 2 according to the present embodiment, it is possible to constitute the following modifications. The power factor correction circuit 1 shown in FIG. 1 includes the coil connected between the second input terminal and the second node, and the power factor correction circuit 2 shown in FIG. 4 includes the coil connected between the first input terminal and the fourth node. The power factor correction circuit according to a modification may include a coil connected between the second input terminal and the second node, and a coil connected between the first input terminal and the fourth node. Also in this power factor correction circuit, effects similar to those in the first and second embodiments can be obtained. As thus described, the power factor correction circuit may include the coil at least one of between the second input terminal and the second node, and between the first input terminal and the fourth node. Also as for the power factor correction circuit 2, it is possible to constitute modifications including P-channel MOSFETs, IGBTs, bipolar transistors, or GaN-HEMTs, in place of the N-channel MOSFETs.

Third Embodiment

Figure 5:
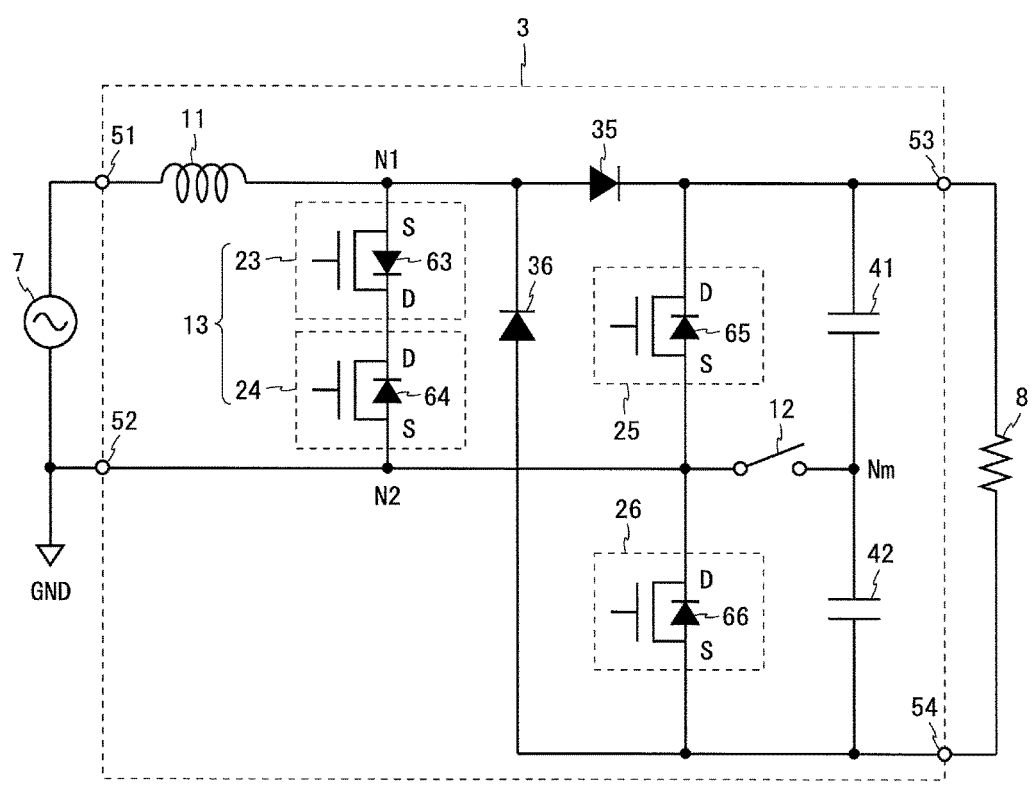
FIG. 5 is a circuit diagram of a power factor correction circuit according to a third embodiment of the present invention.

FIG. 5 is a circuit diagram of a power factor correction circuit according to a third embodiment of the present invention. A power factor correction circuit 3 shown in FIG. 5 includes a coil 11, a switch 12, N-channel MOSFETs 23 to 26, diodes 35, 36, capacitors 41, 42, input terminals 51, 52, and output terminals 53, 54. The MOSFETs 2 3 to 2 6 respectively have parasitic diodes 63 to 66 built therein. The MOSFETs 23, 24 constitute a bidirectional switch 13. The diodes 35, 36 respectively function as first and second rectifier elements, and the MOSFETs 25, 26 function as third and fourth rectifier elements.

In the power factor correction circuit 3, one end of the coil 11 (the left end in the figure) is connected to the input terminal 51. The other end of the coil 11 is connected to a source terminal of the MOSFET 23, an anode terminal of the diode 35, and a cathode terminal of the diode 36. A drain terminal of the MOSFET 23 is connected to a drain terminal of the MOSFET 24. A cathode terminal of the diode 35 is connected to a drain terminal of the MOSFET 25, one end of the capacitor 41, and the output terminal 53. A source terminal of the MOSFET 25 is connected to the input terminal 52, a source terminal of the MOSFET 24, a drain terminal of the MOSFET 2 6, and one end of the switch 12 (the left end in the figure). The other end of the capacitor 41 is connected to one end of the capacitor 42 (the left end in the figure) and the other end of the switch 12. The other end of the capacitor 42 and a source terminal of the MOSFET 26 are connected to the output terminal 54 and an anode terminal of the diode 36. An anode terminal of the parasitic diode 63 is connected to the source terminal of the MOSFET 23, and a cathode terminal of the parasitic diode 63 is connected to the drain terminal of the MOSFET 23. This also applies to the parasitic diodes 64 to 66.

The MOSFETs 23, 24 are connected in series to constitute the bidirectional switch 13. One end of the bidirectional switch 13 (the upper end in the figure) is connected to the input terminal 51 via the coal 11, and supplied with the power from the first terminal of the AC power supply 7. The other end of the bidirectional switch 13 is connected to the input terminal 52, and supplied with the power from the second terminal of the AC power supply 7.

The capacitors 41, 42 are connected in series. The one end of the capacitor 41 is connected to the one end of the bidirectional switch 13 via the diode 35. The other end of the capacitor 42 is connected to the one end of the bidirectional switch 13 via the diode 36. The intermediate node Nm is connected to the other end of the bidirectional switch 13 via the switch 12.

Hereinafter, a node to which the source terminal of the MOSFET 23 is connected is referred to as N1, a node to which the source terminal of the MOSFET 24 is connected is referred to as N2, and a node to which the drain terminal of the MOSFET 23 is connected is referred to as a connection node. The diode 35 is connected between the node N1 and the one end of the capacitor 41 so as to allow a current to flow from a node N1 side. The diode 36 is connected between the node N1 and the other end of the capacitor 42 so as to allow a current to flow to the node N1 side. The MOSFET 25 is connected between the node N2 and the one end of the capacitor 41 so as to allow a current to flow from a node N2 side. The MOSFET 26 is connected between the node N2 and the other end of the capacitor 42 so as to allow a current to flow to the node N2 side.

Similarly to the first embodiment, an AC power supply 7 is connected to the input side of the power factor correction circuit 3, and a load 8 is connected to the output side thereof. Also in the power factor correction circuit 3, a first threshold and a second threshold that is greater than or equal to the first threshold are set concerning the input voltage. When the input voltage is lower than the first threshold, the switch 12 enters the on-state, and the power factor correction circuit 3 operates in the first operation mode. When the input voltage is higher than the second threshold, the switch 12 enters the off-state, and the power factor correction circuit 3 operates in the second operation mode. The first and second thresholds are both set to 140 V, for example.

The power factor correction circuit 3 performs different operations in the first operation mode and the second operation mode. Further, the power factor correction circuit 3 performs different operations when a positive voltage is input and when a negative voltage is input. Moreover, the power factor correction circuit 3 performs different operations in accordance with the state of the bidirectional switch 13.

FIGS. 6A to 6D are diagrams each showing a current path in the first operation mode in the power factor correction circuit 3. Herein, the input voltage is assumed to be an AC voltage of 100 V. When a positive voltage is input and the bidirectional switch 13 is in the on-state, a current flows through a path P21 shown in FIG. 6A. The current flows from the first terminal of the AC power supply 7 to the second terminal of the AC power supply 7 via the input terminal 51, the coil 11, the MOSFET 23, the MOSFET 24, and the input terminal 52. While the current is flowing through the path P21, the voltage is applied from the AC power supply 7 to the two ends of the coil 11, and energy is stored in the coil 11.

In order to turn the bidirectional switch 13 to the on-state when the positive voltage is input, the MOSFET 24 is turned to the on-state. When the positive voltage is input and the MOSFET 24 is in the on-state, even when the MOSFET 23 is in the off-state, the current flows via the parasitic diode 63 in the MOSFET 23. However, in order to reduce the conduction resistance, it is preferable to turn the MOSFET 23 to the on-state at this time.

Figure 6A:
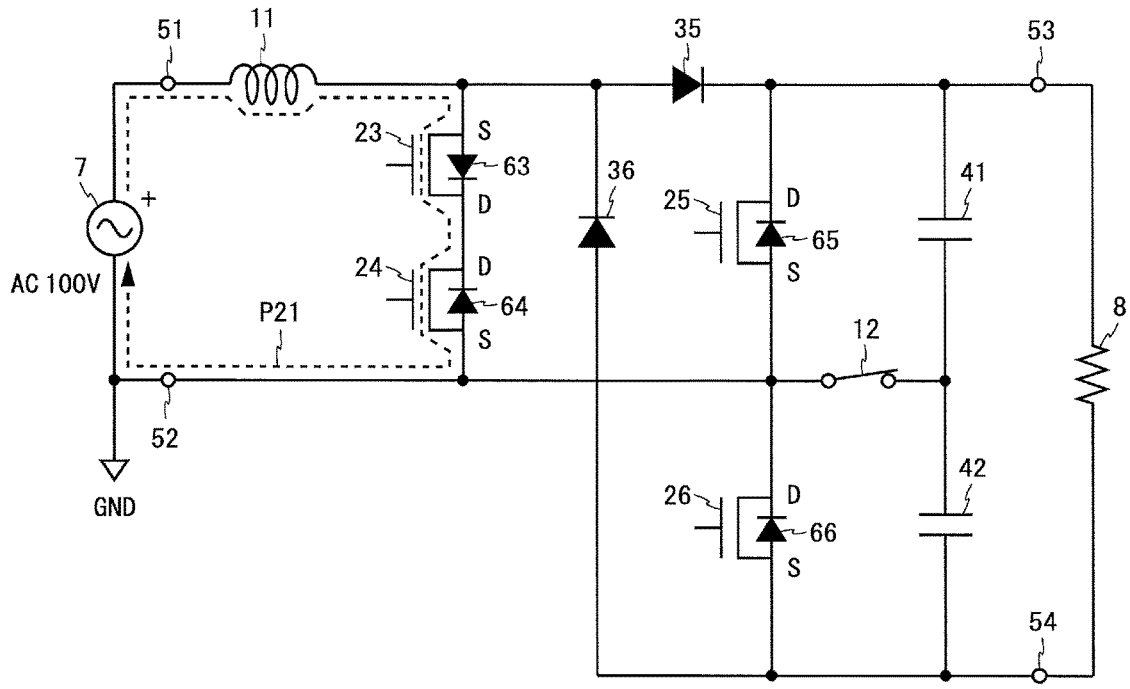
FIG. 6A is a diagram, showing a current path in the first operation mode in the power factor correction circuit shown in FIG. 5.
Figure 6B:
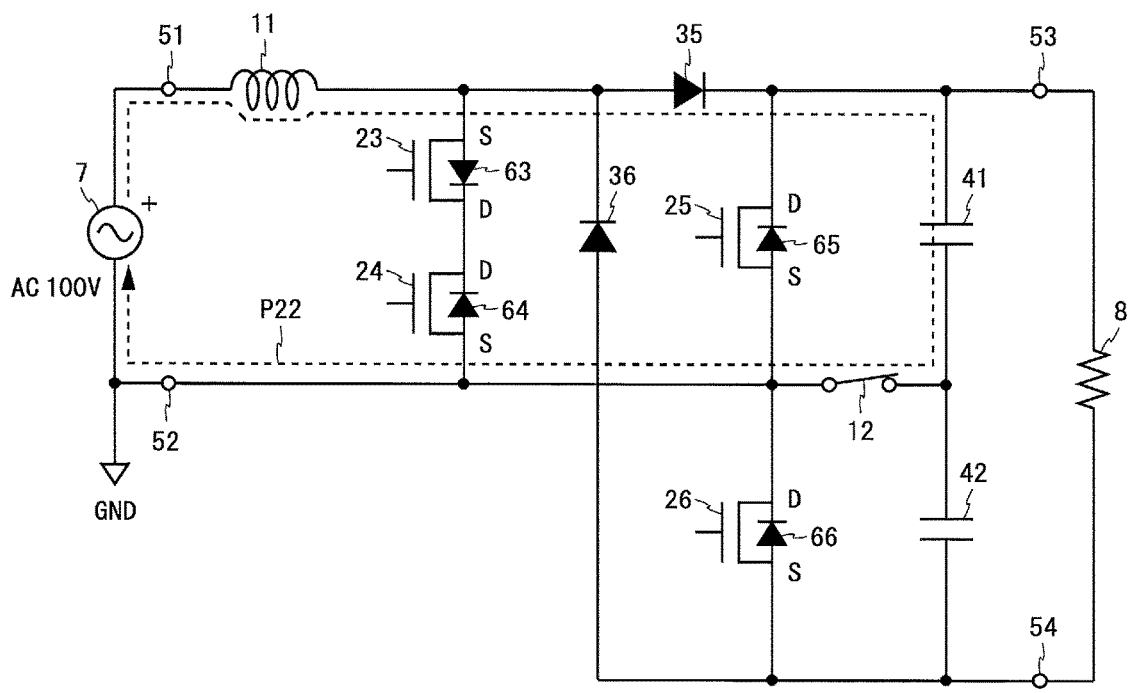
FIG. 6B is a diagram showing a current path in the first operation mode in the power factor correction circuit shown in FIG. 5.

When the positive voltage is input and the bidirectional switch 13 is in the off-state, a current flows through a path P22 shown in FIG. 6B. The current flows from the first terminal of the AC power supply 7 to the second terminal of the AC power supply 7 via the input terminal 51, the coil 11, the diode 35, the capacitor 41, the switch 12, and the input terminal 52. While the current is flowing through the path P22, the coil 11 is connected in series with the AC power supply 7, and the energy is released from the coil 11. At this time, a voltage obtained by boosting the input voltage is applied to the capacitor 41, and the capacitor 41 is charged with the boosted voltage.

In order to turn the bidirectional switch 13 to the off-state when the positive voltage is input, the MOSFET 24 is turned to the off-state. When the positive voltage is input and the MOSFET 24 is in the off-state, the bidirectional switch 13 enters the off-state irrespective of the state of the MOSFET 23.

Figure 6C:
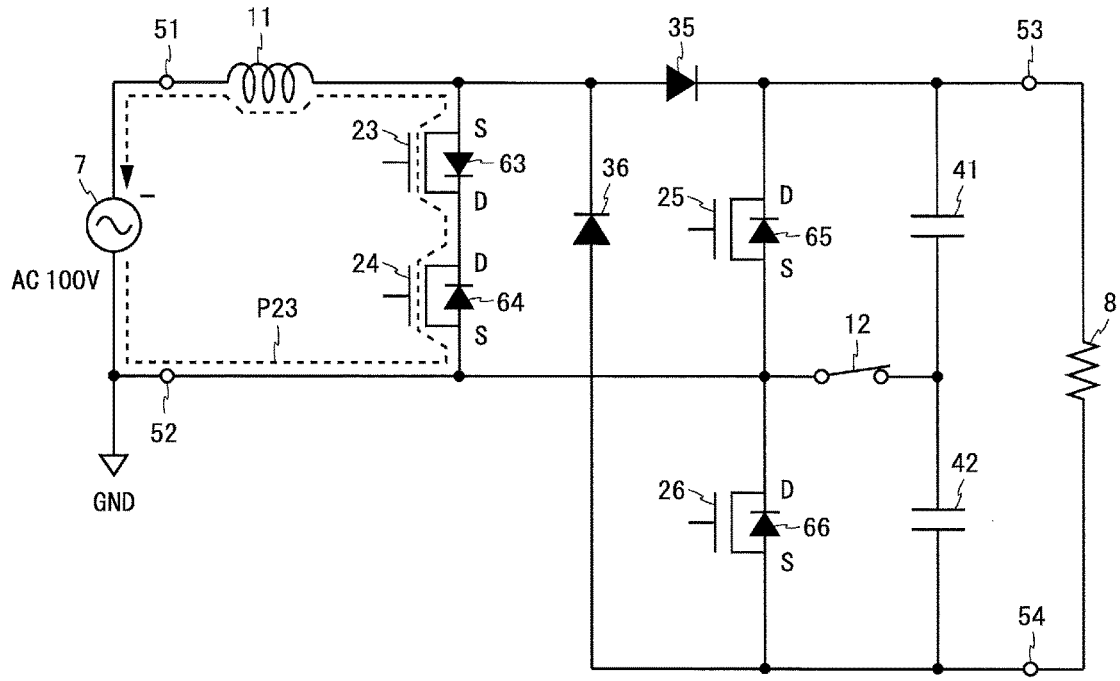
FIG. 6C is a diagram showing a current path in the first operation mode in the power factor correction circuit shown in FIG. 5.

When a negative voltage is input and the bidirectional switch 13 is in the on-state, a current flows through a path P23 shown in FIG. 6C. The current flows from the second terminal of the AC power supply 7 to the first terminal of the AC power supply 7 via the input terminal 52, the MOSFET 24, the MOSFET 23, the coil 11, and the input terminal 51. While the current is flowing through the path P23, the voltage is applied from the AC power supply 7 to the two ends of the coil 11, and energy is stored in the coil 11.

In order to turn the bidirectional switch 13 to the on-state when the negative voltage is input, the MOSFET 23 is turned to the on-state. When the negative voltage is input and the MOSFET 23 is in the on-state, even when the MOSFET 24 is in the off-state, the current flows via the parasitic diode 64 in the MOSFET 24. However, in order to reduce the conduction resistance, it is preferable to turn the MOSFET 24 to the on-state at this time.

Figure 6D:
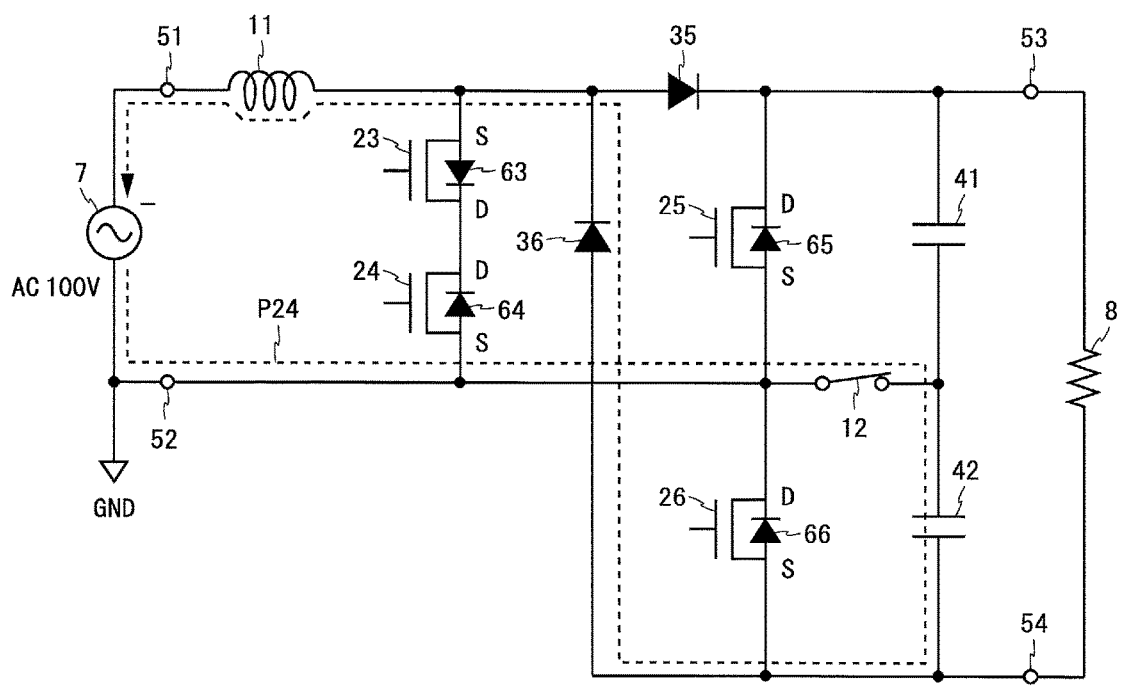
FIG. 6D is a diagram showing a current path in the first operation mode in the power factor correction circuit shown in FIG. 5.

When the negative voltage is input and the bidirectional switch 13 is in the off-state, a current flows through a path P24 shown in FIG. 6D. The current flows from the second terminal of the AC power supply 7 to the first terminal of the AC power supply 7 via the input terminal 52, the switch 12, the capacitor 42, the diode 36, the coil 11, and the input terminal 51. While the current is flowing through the path P24, the coil 11 is connected in series with the AC power supply 7, and the energy is released from the coil 11. At this time, a voltage obtained by boosting the input voltage is applied to the capacitor 42, and the capacitor 42 is charged with the boosted voltage.

In order to turn the bidirectional switch 13 to the off-state when the negative voltage is input, the MOSFET 23 is turned to the off-state. When the negative voltage is input and the MOSFET 23 is in the off-state, the bidirectional switch 13 enters the off-state irrespective of the state of the MOSFET 24.

FIGS. 7A to 7D are diagrams each showing a current path in the second operation mode in the power factor correction circuit 3. Herein, the input voltage is assumed to be an AC voltage of 200 V. When a positive voltage is input and the bidirectional switch 13 is in the on-state, a current flows through a path P25 shown in FIG. 7A. The path P25 is the same as the path P21 shown in FIG. 6A. While the current is flowing through the path P25, the voltage is applied from the AC power supply 7 to the two ends of the coil 11, and energy is stored in the coil 11.

Figure 7A:
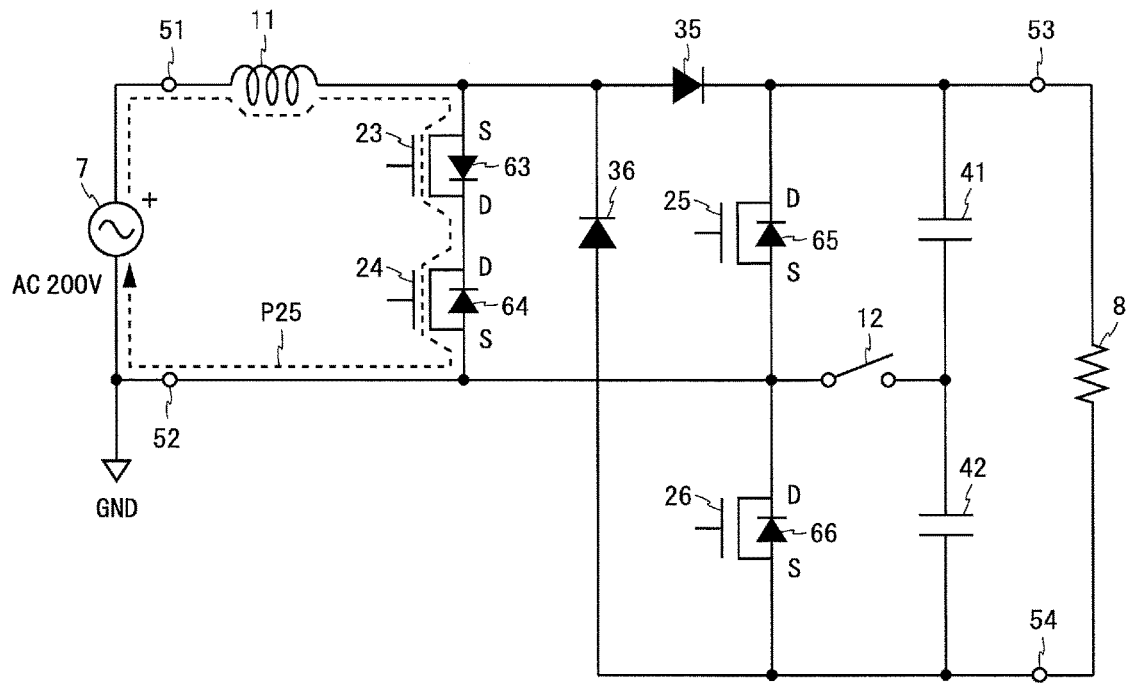
FIG. 7A is a diagram showing a current path in the second operation mode in the power factor correction circuit shown in FIG. 5.
Figure 7B:
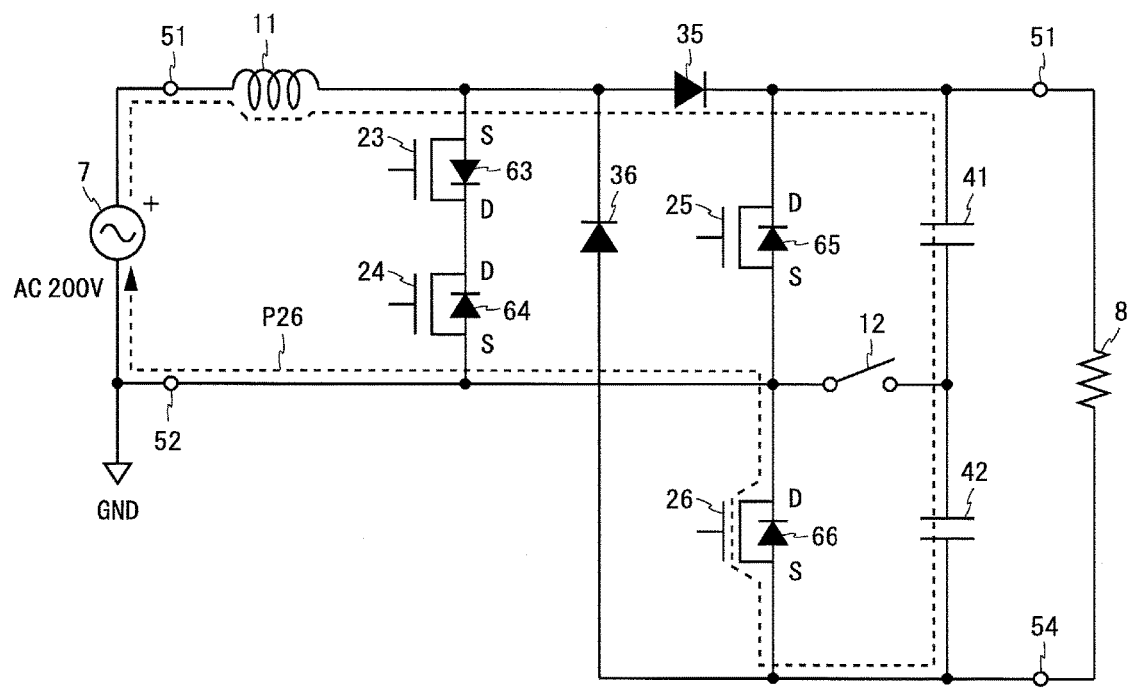
FIG. 7B is a diagram showing a current path in the second operation mode in the power factor correction circuit shown in FIG. 5.

When the positive voltage is input and the bidirectional switch 13 is in the off-state, a current flows through a path P26 shown in FIG. 7B. The current flows from the first terminal of the AC power supply 7 to the second terminal of the AC power supply 7 via the input terminal 51, the coil 11, the diode 35, the capacitor 41, the capacitor 42, the MOSFET 26, and the input terminal 52. While the current is flowing through the path P26, the coil 11 is connected in series with the AC power supply 7, and the energy is released from the coil 11. At this time, a voltage obtained by boosting the input voltage is applied to the capacitors 41, 42 connected in series, and the capacitors 41, 42 are charged with the boosted voltage.

When the positive voltage is input and the bidirectional switch 13 is in the off-state, even when the MOSFET 26 is in the off-state, the current flows via the parasitic diode 66 in the MOSFET 26. However, in order to reduce the loss in the parasitic diode 66, it is preferable to turn the MOSFET 26 to the on-state at this time.

Figure 7C:
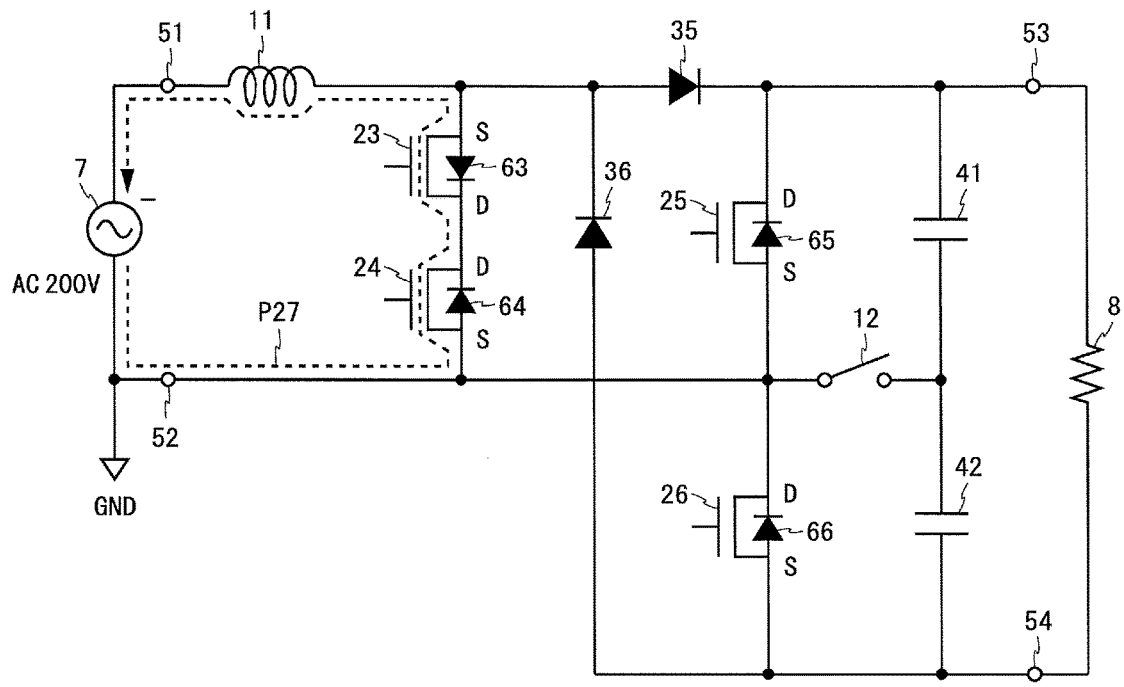
FIG. 7C is a diagram showing a current path in the second operation mode in the power factor correction circuit shown in FIG. 5.

When a negative voltage is input and the bidirectional switch 13 is in the on-state, a current flows through a path P27 shown in FIG. 7C. The path P27 is the same as the path P23 shown in FIG. 6C. While the current is flowing through the path P27, the voltage is applied from the AC power supply 7 to the two ends of the coil 11, and energy is stored in the coil 11.

Figure 7D:
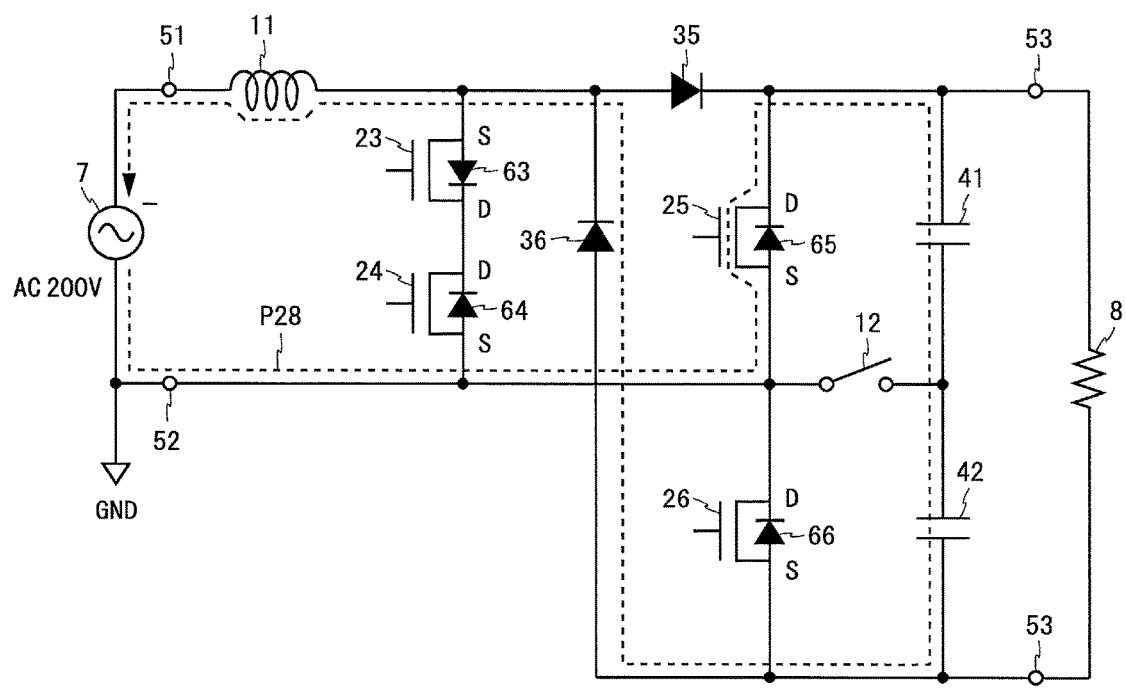
FIG. 7D is a diagram showing a current path in the second operation mode in the power factor correction circuit shown in FIG. 5.

When the negative voltage is input and the bidirectional switch 13 is in the off-state, a current flows through a path P28 shown in FIG. 7D. The current flows from the second terminal of the AC power supply 7 to the first terminal of the AC power supply 7 via the input terminal 52, the MOSFET 25, the capacitor 41, the capacitor 42, the diode 3 6, the coil 11, and the input terminal 51. While the current is flowing through the path P28, the coil 11 is connected in series with the AC power supply 7, and the energy is released from the coil 11. At this time, a voltage obtained by boosting the input voltage is applied to the capacitors 41, 42 connected in series, and the capacitors 41, 42 are charged with the boosted voltage.

When the negative voltage is input and the bidirectional switch 13 is in the off-state, even when the MOSFET 25 is in the off-state, the current flows via the parasitic diode 65 in the MOSFET 25. However, in order to reduce the loss in the parasitic diode 65, it is preferable to turn the MOSFET 25 to the on-state at this time.

Similarly to the first embodiment, in the first operation mode, the switch 12 enters the on-state, and the boosted voltage is applied to the two ends of the capacitor 41 such that the potential at the one end is higher than the potential at the other end when the positive voltage is input, and the boosted voltage is applied to the two ends of the capacitor 42 such that the potential at the one end is higher than the potential at the other end when the negative voltage is input. In the second operation mode, the switch 12 enters the off-state, and the boosted voltage is applied to two ends of the capacitors 41, 42 connected in series such that the potential at the one end of the capacitor 41 is higher than the potential at the other end of the capacitor 42 both when the positive voltage is input and when the negative voltage is input. The voltage at the two ends of the capacitors 41, 42 connected in series is output from, the output terminals 53, 54. Accordingly, when the boosting condition (a duty ratio of each of the MOSFETs 23, 24) is made the same in each operation mode, the boosting ratio in the first operation mode is about twice as large as the boosting ratio in the second operation mode.

Similarly to the first embodiment, the power factor correction circuit 3 is provided with a measurement circuit and a control circuit. The measurement circuit measures the voltage and the current supplied from the AC power supply 7 to the power factor correction circuit 3, as necessary. Based on the measurement results of the voltage and the current, the control circuit controls the duty ratio of each of the MOSFETs 23, 24 such that the current is proportional to the voltage. Further, the control circuit compares the measured voltage (input voltage) with the first and second thresholds, and switches the operation mode to the first operation mode when the input voltage is lower than the first threshold, and switches the operation mode to the second operation mode when the input voltage is higher than the second threshold. The first and second thresholds are both set to 140 V, for example.

Here, the current path of the power factor correction circuit 1 according to the first embodiment is compared with the current, path of the power factor correction circuit. 3 according to the present embodiment. In the power factor correction circuit 1, when energy is stored in the coil 11, the current passes through one MOSFET in the on-state and one diode (FIGS. 2A, 2C, 3A, and 3C). In the power factor correction circuit 3, when energy is stored in the coil 11, the current passes through one MOSFET in the on-state and one MOSFET in an arbitrary state (FIGS. 6A, 6C, 7A, and 7C). The MOSFET in the arbitrary state can be controlled to the on-state. Typically, the MOSFET in the on-state has smaller resistance (on-resistance) than forward resistance of the diode. Therefore, when energy is stored in the coil 11, the resistance of the current path of the power factor correction circuit 3 is smaller than the resistance of the current path of the power factor correction circuit 1.

In the power factor correction circuit 1, the current passes through two diodes when the energy is released from the coil 11 in the first operation mode (FIGS. 2B and 2D). The current passes through three diodes and one MOSFET in the arbitrary state when the energy is released from the coil 11 in the second operation mode (FIGS. 3B and 3D). In the power factor correction circuit 3, the current passes through one diode when the energy is released from the coil 11 in the first operation mode (FIGS. 6B and 6D). The current passes through one diode and one MOSFET in the arbitrary state when the energy is released from, the coil 11 in the second operation mode (FIGS. 7B and 7D). Therefore, also when the energy is released from the coil 11, the resistance of the current path of the power factor correction circuit 3 is smaller than the resistance of the current path of the power factor correction circuit 1. As thus described, according to the power factor correction circuit 3, the number of elements on the current path is reduced as compared to the power factor correction circuit 1, to make the resistance of the current path small, thus further enhancing the efficiency.

The power factor correction circuit 3 has the following effects. Generally, in a semiconductor chip with the MOSFET built therein, a drain terminal, of the MOSFET is connected to a metal part of a heat-sink mounting portion of a package. In the power factor correction circuit 3, since a potential at the drain terminal of the MOSFET 23 is equal to a potential at the dram terminal of the MOSFET 24, the MOSFETs 23, 24 can be connected to one heat sink.

In the power factor correction circuit 3, the distance between the MOSFETs 23, 24 is preferably small for making the parasitic inductance of the current path small. When the heat sinks are separately mounted to the MOSFETs 23, 24, potentials of the heat sinks are different, thus requiring a certain degree of creeping distance or spatial distance to be provided between the heat sinks. By the MOSFETs 23, 24 sharing one heat sink, it is possible to make the distance between the MOSFETs 23, 24 small and the parasitic inductance of the current path small, thus reducing the noise of the power factor correction circuit 3.

Generally, when two elements with different calorific values share one heat sink, heat is propagated from the element with a larger calorific value to the element with a smaller calorific value, and it is thus not necessarily preferable to share the heat sink. In the power factor correction circuit 3, since the MOSFET 24 is switched when the positive voltage is input and the MOSFET 23 is switched when the negative voltage is input, the calorific value of the MOSFET 23 is almost equal to the calorific value of the MOSFET 24. Hence in the power factor correction circuit 3, when the MOSFETs 23, 24 share one heat sink, only the effect can be obtained with no problem occurring.

In the power factor correction circuit, a control signal of the bidirectional switch is generated taking the potential at the source terminal of the MOSFET as a reference. In a power factor correction circuit according to a fourth embodiment described later (FIG. 8), a control circuit for a bidirectional switch 14 is connected to a connection point of the MOSFETs 23, 24 (connection node). Thus, when the MOSFETs 23, 24 are both in the off-state, a potential at the connection node maybe lower than potentials at the two ends of the bidirectional switch 13 due to a variety of surge and noise. At this time, source terminals of the MOSFETs 23, 24 enter a floating state.

In the power factor correction circuit 3, the control circuit of the MOSFET 23 is connected to the one end of the bidirectional switch 13, and the control circuit of the MOSFET 24 is connected to the other end of the bidirectional switch 13. For this reason, the control circuits for the MOSFETs 23, 24 are directly connected to the AC power supply 7. Thus, according to the power factor correction circuit 3, it is possible to prevent the control circuit from being influenced by noise or surge, thus preventing the control circuit from generating radiation noise. Further, it is possible to stabilize the potentials at the source terminals of the MOSFETs 23, 24 which provides the reference potentials, and reduce the noise, thus enabling stable operation of the power factor correction circuit 3.

As shown above, the power factor correction circuit 3 according to the present embodiment includes: the first and second input terminals 51, 52 for inputting an input voltage; the first and second output terminals 53, 54; the coil 11; a switch circuit (bidirectional switch 13) that boosts the input voltage to generate a boosted voltage in cooperation with the coil 11; the first capacitor 41 having one end connected to the first output terminal, and the other end connected to the intermediate node Nm; the second capacitor 42 having one end connected to the intermediate node Nm, and the other end connected to the second output terminal. In a manner similar to the power factor correction circuit 1 according to the first embodiment, the boosted voltage is applied to any of the two ends of the first capacitor, the two ends of the second capacitor, and the two ends of the first and second capacitors connected in series. Thus, similarly to the power factor correction circuit 1, the power factor correction circuit 3 has a high efficiency and is compatible with the input voltage in a broad range.

Further, the switch circuit is a bidirectional switch including a first transistor (MOSFET 23) connected between the first node N1 and the connection node, and a second transistor (MOSFET 24) connected between the connection node and the second node N2. The power factor correction circuit 3 includes: a mode switching circuit (switch 12) having one end connected to the second node, and the other end connected to the intermediate node Nm, the circuit being brought into the on-state in the first operation mode and into the off-state in the second operation mode; a first rectifier element (diode 35) connected between the first node and the one end of the first capacitor so as to allow a current to flow from a first node side; a second rectifier element (diode 36) connected between the first node and the other end of the second capacitor so as to allow a current to flow to the first node side; a third rectifier element (MOSFET 25) connected between the second node and the one end of the first capacitor so as to allow a current to flow from a second node side; and a fourth rectifier element (MOSFET 26) connected between the second node and the other end of the second capacitor so as to allow a current to flow to the second node side. The coil 11 is connected between the first input terminal and the first node. By connecting the coil, the two transistors, the mode switching circuit, the four rectifier elements, and the two capacitors as described above, it is possible to alternately apply the boosted voltage to the two ends of each of the two capacitors in the first operation mode and to apply the boosted voltage to two ends of the two capacitors connected in series in the second operation mode, with a simple circuit configuration. Moreover, the number of elements on the current path is reduced to make the resistance of the current path small, thus further enhancing the efficiency.

The first transistor is the MOSFET 23 having a source terminal connected to the first node, and a drain terminal connected to the connection node, and the second transistor is the MOSFET 24 having a drain terminal connected to the connection node, and a source terminal connected to the second node. By using the two MOSFETs having the drain terminals connected to each other, it is possible to constitute the bidirectional switch for generating the boosted voltage in cooperation with the coil. Further, one heat sink can be shared by the two MOSFETs to make the distance between the two MOSFETs small and the parasitic inductance of the current path small, thus reducing the noise. Moreover, it is possible to prevent the control circuit for the bidirectional switch from being influenced by noise or surge, thus preventing the control circuit from generating radiation noise. Furthermore, it is possible to stabilize the potentials at the source terminals of the first and second transistors and reduce the noise, thus enabling stable operation of the power factor correction circuit 3.

As for the power factor correction circuit 3 according to the present embodiment, it is possible to constitute the following modifications. The power factor correction circuit 3 shown in FIG. 5 includes the coil connected between the first input terminal and the first node. The power factor correction circuit according to a modification may include a coil connected between the second input terminal and the second node, or may include a coil connected between the first input terminal and the first node, and a coil connected between the second input terminal and the second node. As thus described, the power factor correction circuit may include the coil at least one of between the first input terminal and the first node, and between the second input terminal and the second node. Further, the power factor correction circuit according to another modification may include diodes as the third and fourth rectifier elements in place of the MOSFETs 25, 26. Also as for the power factor correction circuit 3, it is possible to constitute modifications including P-channel MOSFETs, IGBTs, bipolar transistors, or GaN-HEMTs in place of the N-channel MOSFETs.

Fourth Embodiment

Figure 8:
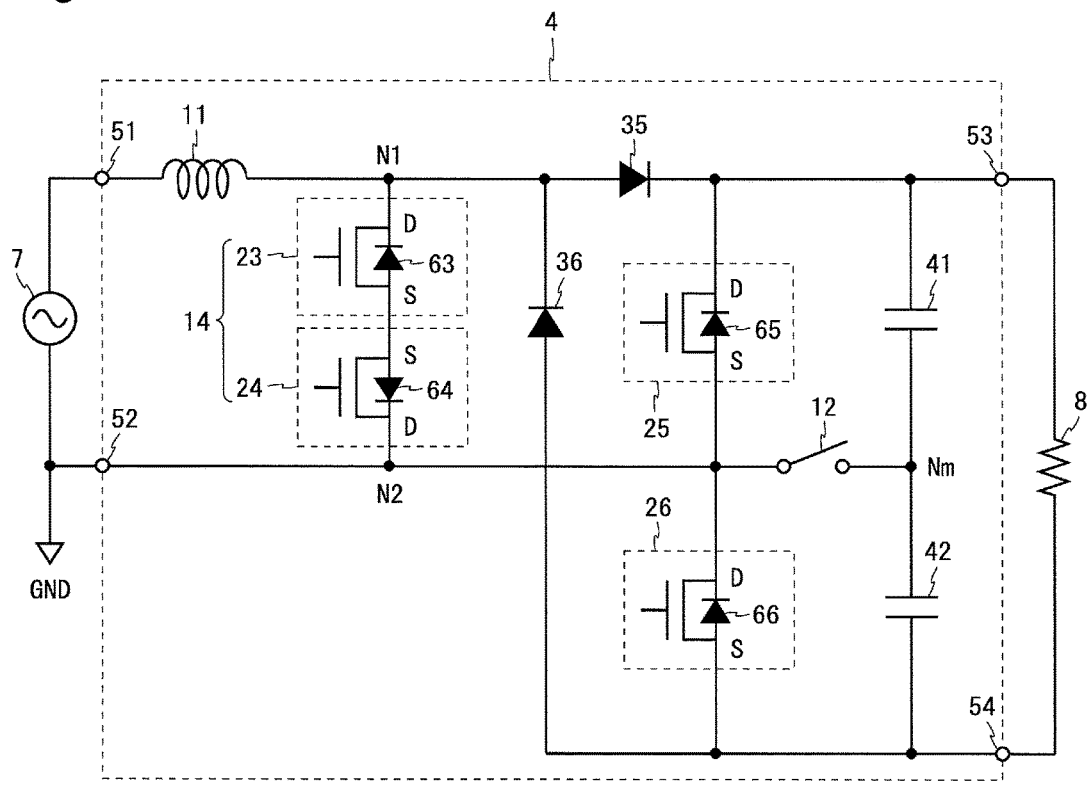
FIG. 8 is a circuit diagram of a power factor correction circuit according to a fourth embodiment of the present invention.

FIG. 8 is a circuit diagram, of a power factor correction circuit according to a fourth embodiment of the present invention. A power factor correction circuit 4 shown in FIG. 8 is obtained by changing the connection form of the MOSFETs 23, 24 in the power factor correction circuit. 3 according to the third embodiment. Hereinafter, a difference from the third embodiment is described.

In the power factor correction circuit 4, the MOSFETs 23, 24 are connected in series to constitute a bidirectional switch 14. The other end of the coil 11 (the right end in the figure) is connected to a drain terminal of the MOSFET 23, an anode terminal of the diode 35, and a cathode terminal of the diode 36. A source terminal of the MOSFET 23 is connected to a source terminal of the MOSFET 24. A source terminal of the MOSFET 25 is connected to the input terminal 52, a drain terminal of the MOSFET 24, a drain terminal of the MOSFET 26, and one end of the switch 12 (the left end in the figure). One end of the bidirectional switch 14 (the upper end in the figure) is connected to the input terminal 51 via the coil 11, and supplied with the power from the first terminal of the AC power supply 7. The other end of the bidirectional switch 14 is connected to the input terminal 52, and supplied with the power from, the second terminal of the AC power supply 7.

As described above, in the power factor correction circuit, a control signal of the bidirectional switch, is generated taking the potential at the source terminal of the MOSFET as a reference. In the power factor correction circuit 4, since the source terminals of the MOSFETs 23, 24 are connected to each other, potentials at the source terminals of the MOSFETs 23, 24 are the same. For this reason, the number of power supplies for the control circuit for the MOSFETs 23, 24 may be one. Thus, according to the power factor correction circuit 4, it is possible to simplify the power supply of the control circuit for the bidirectional switch 14.

As for the power factor correction circuit 4 according to the present embodiment, it is possible to constitute the following modifications. The power factor correction circuit according to a modification may include a coil connected between the second input terminal and the second node, or may include a coil connected between the first input terminal and the first node, and a coil connected between the second input terminal and the second node. Also as for the power factor correction circuit 4 according to the present embodiment, it is possible to constitute modifications including P-channel MOSFETs, IGBTs, bipolar transistors, or GaN-HEMTs in place of the N-channel MOSFETs.

Fifth Embodiment

Figure 9:
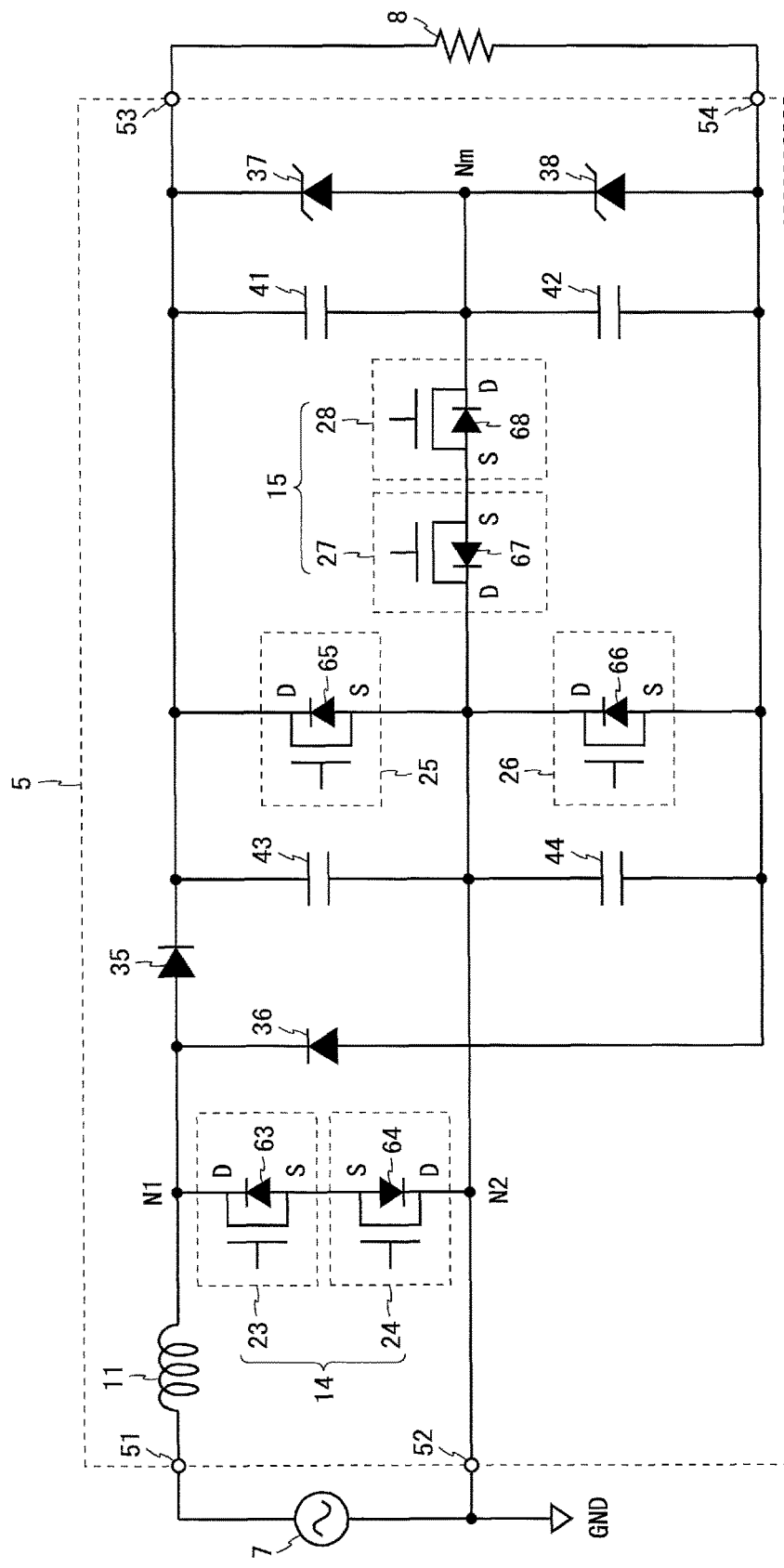
FIG. 9 is a circuit diagram of a power factor correction circuit according to a fifth embodiment of the present invention.

FIG. 9 is a circuit diagram of a power factor correction circuit according to a fifth embodiment of the present invention. A power factor correction circuit 5 shown in FIG. 9 is obtained by replacing the switch 12 with a bidirectional switch 15 and adding Zener diodes 37, 38 and capacitors 43, 44 in the power factor correction circuit 4 according to the fourth embodiment. Hereinafter, a difference from the fourth embodiment is described.

The bidirectional switch 15 includes MOSFETs 27, 28 connected in series and functions as a mode switching circuit. The MOSFETs 27, 28 respectively have parasitic diodes 67, 68 built therein. A source terminal of the MOSFET 27 is connected to a source terminal of the MOSFET 28. A drain terminal of the MOSFET 27 is connected to the input terminal 52 and the like. A drain terminal of the MOSFET 2 8 is connected to the other end of the capacitor 41 and the like.

The Zener diodes 37, 38 are respectively connected in parallel with the capacitors 41, 42. A cathode terminal of the Zener diode 37 is connected to one end of the capacitor 41, and an anode terminal of the Zener diode 37 is connected to the other end of the capacitor 41. The Zener diode 37 prevents potentials at the two ends of the capacitor 41 from being significantly different from each other. A connection form and a function of the Zener diode 38 are the same as those of the Zener diode 37.

The capacitor 43 is connected in parallel with the MOSFET 25 between the input terminal 52 and the output terminal 53. The capacitor 44 is connected in parallel with the MOSFET 26 between the input terminal 52 and the output terminal 54. One end of the capacitor 43 is connected to a drain terminal of the MOSFET 25, and the other end of the capacitor 43 is connected to a source terminal of the MOSFET 25. One end of the capacitor 44 is connected to a drain terminal of the MOSFET 26, and the other end of the capacitor 44 is connected to a source terminal of the MOSFET 26.

In the power factor correction circuit 5, a wiring route from one end of the bidirectional switch 14 (the upper end in the figure) to the other end of the bidirectional switch 14 via the capacitor 43 is shorter than a wiring route from, the one end of the bidirectional switch 14 to the other end of the bidirectional switch 14 via the MOSFET 25. A wiring route from the other end of the bidirectional switch 14 to the one end of the bidirectional switch 14 via the capacitor 44 is shorter than a wiring route from the other end of the bidirectional switch 14 to the one end of the bidirectional switch 14 via the MOSFET 26. Accordingly, by storing power supplied from the coil 11 in the capacitors 43, 44 which are disposed near the bidirectional switch 14, the wiring route in which a current amount greatly changes by switching can be made short, whereby the noise at the time of switching can be reduced.

In order to obtain the above effect, a film capacitor or the like having a fast response speed is preferably used for the capacitors 43, 44. Further, when capacitances of the capacitors 43, 44 are excessively small, the power supplied by single switching cannot be sufficiently stored in the capacitors 43, 44. On the contrary, when the capacitances of the capacitors 43, 44 are excessively large, the current peak increases when the polarity of the input voltage is reversed in the second operation mode and the capacitors 43, 44 perform charging or discharging at a high speed. Considering these points, the capacitances of the capacitors 43, 44 are preferably from 0.005 μF to 0.5 μF, for example.

As shown above, the power factor correction circuit 5 according to the present embodiment includes the third capacitor 43 connected in parallel with the third rectifier element (MOSFET 25) between the second node N2 and the one end of the first capacitor 41, and the fourth capacitor 44 connected in parallel with the fourth rectifier element (MOSFET 26) between the second node and the other end of the second capacitor 42. A wiring route from the first node N1 to the second node via the third capacitor is shorter than a wiring route from the first node to the second node via the third rectifier element, and a wiring route from the second node to the first node via the fourth capacitor is shorter than a wiring route from the second node to the first node via the fourth rectifier element. Thus, according to the power factor correction circuit 5, by storing power supplied from the coal 11 in the capacitors 43, 4 4 which are disposed near the bidirectional switch 14, the wiring route in which a current amount greatly changes by switching can be made short, whereby the noise at the time of switching can be reduced.

The power factor correction circuit 5 includes, as the mode switching circuit, a bidirectional switch including first and second MOSFETs (MOSFETs 27, 28) having source terminals connected to each other. A drain terminal of the first MOSFET is connected to the second node, and a drain terminal of the second MOSFET is connected to the intermediate node Nm. By using the two MOSFETs having the source terminals connected to each other as thus described, it is possible to constitute the mode switching circuit that allows the current to flow bidirectionally.

Also as for the power factor correction circuit 5 according to the present embodiment, it is possible to constitute modifications similar to the fourth embodiment. Further, a power factor correction circuit according to a modification of the present embodiment may include, as the mode switching circuit, a bidirectional switch including first and second MOSFETs having drain terminals connected to each other. In this case, a source terminal of the first MOSFET is connected to the second node, and a source terminal of the second MOSFET is connected to the intermediate node Nm.

By using the two MOSFETs having the drain terminals connected to each other as thus described, it is possible to constitute the mode switching circuit that allows the current to flow bidirectionally.

Note that, the power factor correction circuit in each of the first to fourth embodiments and the modifications thereof may also include, as the mode switching circuit, two MOSFETs having source terminals connected to each other, or two MOSFETs having drain terminals connected to each other.

Sixth Embodiment

Figure 10:
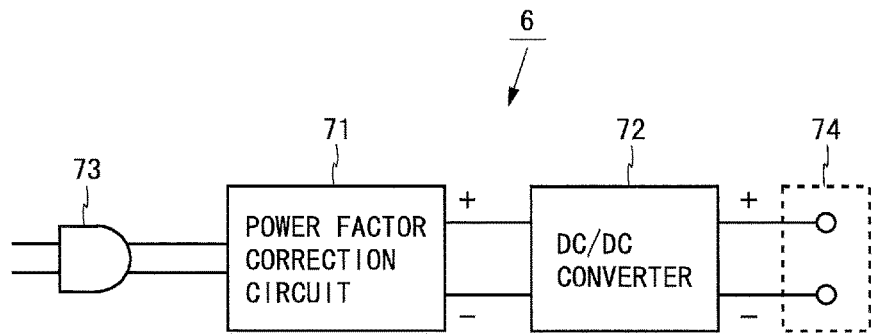
FIG. 10 is a block diagram of a power supply device according to a sixth embodiment of the present invention.

FIG. 10 is a block diagram showing a power supply device according to a sixth embodiment of the present invention. A power supply device 6 shown in FIG. 10 includes a power factor correction circuit 71 and a DC-DC converter 72. The power factor correction circuit 71 is any of the power factor correction circuits according to the first to fifth embodiments and the modifications thereof. The DC-DC converter 72 converts an output voltage of the power factor correction circuit 71 to a DC voltage at a predetermined level. The power supply device 6 has an insertion plug 73 for receiving the power of the commercial power supply. The power supply device 6 is used with being connected to a load 74.

According to the present embodiment, it is possible to provide the power supply device 6 which has a high efficiency and is compatible with the input voltage in a broad range by using the power factor correction circuit according to the first to fifth embodiments and the modifications thereof.

Seventh Embodiment

Figure 11:
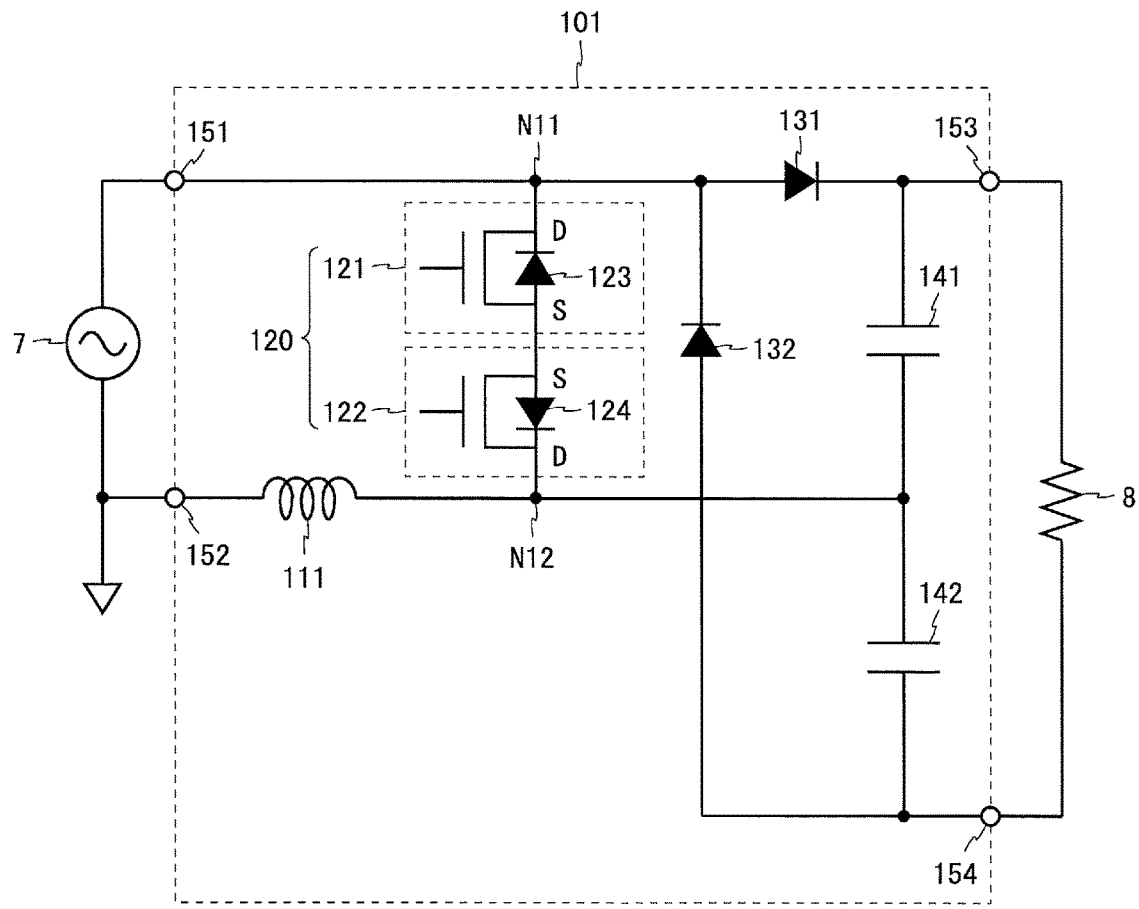
FIG. 11 is a circuit diagram of a power factor correction circuit according to a seventh embodiment of the present invention.

FIG. 11 is a circuit diagram of a power factor correction circuit according to a seventh embodiment of the present invention. A power factor correction circuit 101 shown in FIG. 11 includes a coil 111, N-channel MOSFETs 121, 122, diodes 131, 132, capacitors 141, 142, input terminals 151, 152, and output terminals 153, 154. The MOSFETs 121, 122 respectively have parasitic diodes 123, 124 built therein.

A drain terminal of the MOSFET 121 is connected to a node N11. A source terminal of the MOSFET 121 is connected to a source terminal of the MOSFET 122. A drain terminal of the MOSFET 122 is connected to a node N12. In this manner, there is configured a bidirectional switch 120 which includes the two MOSFETs 121, 122 connected in anti-series, the bidirectional switch 120 having one end connected to the node N11 and the other end connected to the node N12. An anode terminal and a cathode terminal of the parasitic diode 123 are respectively connected to the source terminal and the drain terminal of the MOSFET 121. This also applies to the parasitic diode 124.

One end of the capacitor 141 (the upper end in the figure) is connected to the output terminal 153 and a cathode terminal of the diode 131. The other end of the capacitor 141 and one end of the capacitor 142 (the upper end in the figure) are connected to the node N12. The other end of the capacitor 142 is connected to the output terminal 154 and an anode terminal of the diode 132. An anode terminal of the diode 131 and a cathode terminal of the diode 132 are connected to the node N11. As thus described, the capacitors 141, 142 are connected in series between the output terminals 153, 154. The diode 131 is connected between the node N11 and the one end of the capacitor 141 so as to allow a current to flow from a node N11 side. The diode 132 is connected between the node N11 and the other end of the capacitor 142 so as to allow a current to flow to the node N11 side.

The input terminal 151 is connected to the node N11. The node N12 is connected to one end of the coil 111 (the right end in the figure). The other end of the coil 111 is connected to the input terminal 152. When the bidirectional switch 120 is in the on-state, a current path is formed between the input terminals 151, 152 via the node N11, the bidirectional switch 120, the node N12, and the coil 111. As thus described, the power factor correction circuit 101 has a current path between the input terminals 151, 152 via the coil 111 and the bidirectional switch 120. The coil 111 is connected between the node N12 and the input terminal 152.

An AC power supply 7 is connected to the input side of the power factor correction circuit 101, and a load 8 is connected to the output side thereof. A first terminal of the AC power supply 7 (the upper-side terminal in the figure) is connected to the input terminal, and a second terminal of the AC power supply 7 (the lower-side terminal in the figure) is connected to the input terminal 152. One terminal of the load 8 is connected to the output terminal 153, and the other terminal of the load 8 is connected to the output terminal 154. One end of the bidirectional switch 120 (node N11) is supplied with the power from the first terminal of the AC power supply 7 via the input terminal 151. The other end of the bidirectional switch 120 (node N12) is supplied with the power from the second terminal of the AC power supply 7 via the input terminal 152 and the coil 111.

The coil 111 charges and discharges power when performing boosting operation (detailed later). An inductance of the coil 111 is 100 μH to 1 mH, for example. The inductance of the coil 111 may be a value outside this range. The diodes 131, 132 respectively function as first and second rectifier elements. For each of the diodes 131, 132, for example, an FRD, a SiC diode, or the like is used. The capacitors 141, 142 store the power to smooth the output. For each of the capacitors 141, 142, for example, an electrolytic capacitor is used. Capacitances of the capacitors 141, 142 are from 100 μF to 10 mF, for example. The capacitances of the capacitors 141, 142 may be values outside this range.

Hereinafter, the operation of the power factor correction circuit 101 is described with reference to FIGS. 12A and 12B. The power factor correction circuit 101 performs different operations when a potential at the input terminal 151 is higher than a potential at the input terminal 152 (hereinafter referred to as "when a positive voltage is input") and when the potential at the input terminal 151 is lower than the potential at the input terminal 152 (hereinafter referred to as "when a negative voltage is input").

Figure 12A:
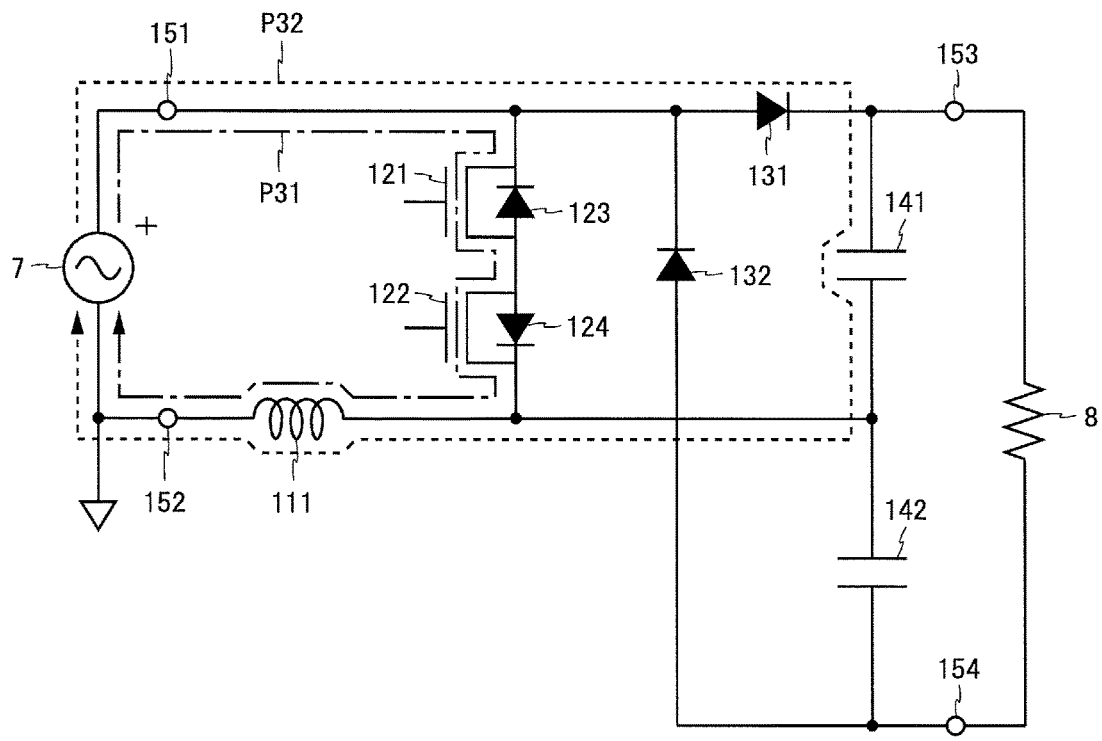
FIG. 12A is a diagram, showing a current path when a positive voltage is input in the power factor correction circuit shown in FIG. 11.

FIG. 12A is a diagram showing a current path when a positive voltage is input. When the positive voltage is input and the bidirectional switch 120 is in the on-state, a current flows through a path P31 indicated by a one-dot chain line in FIG. 12A. The current flows from the first terminal of the AC power supply 7 to the second terminal of the AC power supply 7 via the input terminal 151, the node N11, the MOSFET 121, the MOSFET 122, the node N12, the coil 111, and the input terminal 152. While the current is flowing through the path P31, the voltage is applied from the AC power supply 7 to the two ends of the coil 111, and energy is stored in the coil 111.

When, the positive voltage is input and the bidirectional switch 120 is in the off-state, a current flows through a path P32 indicated by a broken line in FIG. 12A. The current flows from the first terminal of the AC power supply 7 to the second terminal of the AC power supply 7 via the input terminal 151, the node N11, the diode 131, the capacitor 141, the node N12, the coil 111, and the input terminal 152. While the current is flowing through the path P32, the coil 111 is connected in series with the AC power supply 7, and the energy is released from, the coil 111. At this time, the voltage obtained by boosting the voltage supplied from, the AC power supply 7 is applied to the capacitor 141, and the capacitor 141 is charged with the boosted voltage.

When the positive voltage is input, the switching (on/off control) of the bidirectional switch 120 is performed by controlling the state of the MOSFET 121. When the MOSFET 121 is controlled to the off-state, the bidirectional switch 120 enters the off-state irrespective of the state of the MOSFET 122. When the MOSFET 121 is controlled to the on-state, even with the MOSFET 122 in the off-state, the current flows via the parasitic diode 124 in the MOSFET 122, and hence the bidirectional switch 12 0 enters the on-state. However, in order to reduce the loss due to the voltage drop in the parasitic diode 124, when the MOSFET 121 is controlled to the on-state, it is preferable to also control the MOSFET 122 to the on-state. In particular, when the positive voltage is input, it is preferable to switch the MOSFET 121 while holding the MOSFET 122 in the on-state. Accordingly, the loss due to the voltage drop in the parasitic diode 124 can be reduced.

Figure 12B:
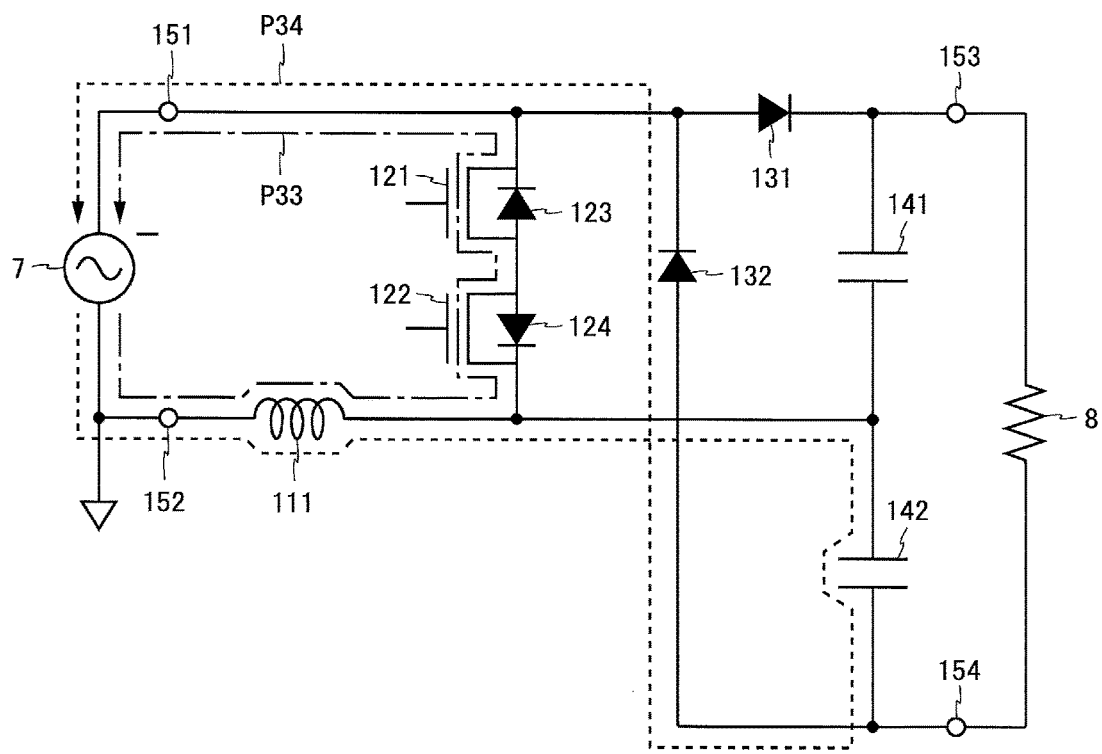
FIG. 12B is a diagram showing a current path when a negative voltage is input in the power factor correction circuit shown in FIG. 11.

FIG. 12B is a diagram showing a current path when a negative voltage is input. When the negative voltage is input and the bidirectional switch 120 is in the on-state, a current flows through a path P33 indicated by a one-dot chain line in FIG. 12B. The current flows from the second terminal of the AC power supply 7 to the first terminal of the AC power supply 7 via the input terminal 152, the coil 111, the node N12, the MOSFET 122, the MOSFET 121, the node N11, and the input terminal 151. While the current is flowing through the path P33, the voltage is applied from, the AC power supply 7 to the two ends of the coil 111, and energy is stored in the coil. 111.

When the negative voltage is input and the bidirectional switch 120 is in the off-state, a current flows through a path P34 indicated by a broken line in FIG. 12B. The current flows from the second terminal of the AC power supply 7 to the first terminal of the AC power supply 7 via the input terminal 152, the coil 111, the node N12, the capacitor 142, the diode 132, the node N11, and the input terminal 151. While the current is flowing through the path P34, the coil 111 is connected in series with the AC power supply 7, and the energy is released from, the coil 111. At this time, the voltage obtained by boosting the voltage supplied from, the AC power supply 7 is applied to the capacitor 142, and the capacitor 142 is charged with the boosted voltage.

When, the negative voltage is input, the switching of the bidirectional switch 120 is performed by controlling the state of the MOSFET 122, When the MOSFET 122 is controlled to the off-state, the bidirectional switch 120 enters the off-state irrespective of the state of the MOSFET 121. When the MOSFET 122 is controlled to the on-state, even with the MOSFET 121 in the off-state, the current flows via the parasitic diode 123 in the MOSFET 121, and hence the bidirectional switch 120 enters the on-state. However, in order to reduce the loss due to the voltage drop in the parasitic diode 123, when the MOSFET 122 is controlled to the on-state, it is preferable to also control the MOSFET 121 to the on-state. In particular, when the negative voltage is input, it is preferable to switch the MOSFET 122 while holding the MOSFET 121 in the on-state. Accordingly, the loss due to the voltage drop in the parasitic diode 123 can be reduced.

In the power factor correction circuit 101, a measurement circuit and a control circuit (neither is shown) are provided. The measurement circuit measures the voltage and the current supplied from the AC power supply 7 to the power factor correction circuit 101, as necessary. Based on the measurement results of the voltage and the current, the control circuit controls a duty ratio of each of the MOSFETs 121, 122 such that the current is proportional to the voltage.

The capacitor 141 is charged when the positive voltage is input, and the capacitor 142 is charged when the negative voltage is input. Since the capacitors 141, 142 are connected in series between the output terminals 153, 154, a voltage between the output terminals 153, 154 is equal to a sum of an end-to-end voltage V1 of the capacitor 141 and an end-to-end voltage V2 of the capacitor 142. Since the voltage V1 and voltage V2 are the same, the output voltage of the power factor correction circuit 101 (the voltage between the output terminals 153, 154) is twice as large as the voltage V1. The power factor correction circuit 101 applies, to the load 8, the voltage that is twice as large as the voltage generated by the boosting circuit including the coil 111 and the bidirectional switch 120.

Hereinafter, effects of the power factor correction circuit 101 according to the present embodiment are described. According to the power factor correction circuit 101, the voltage generated by the boosting circuit including the coil 111 and the bidirectional switch 120 is alternately applied to each of the two capacitors 141, 142, thereby enabling output of the voltage that is twice as large as the voltage generated by the boosting circuit. Hence it is possible to constitute the power factor correction circuit 101 by using a small-sized element with a small withstand voltage. This can reduce the power factor correction circuit 101 in size and cost. Further, since the boosting ratio in the boosting circuit is small, the switching loss, which increases with a higher boosted voltage, can be reduced to enhance the efficiency of the power factor correction circuit 101.

Figure 18:
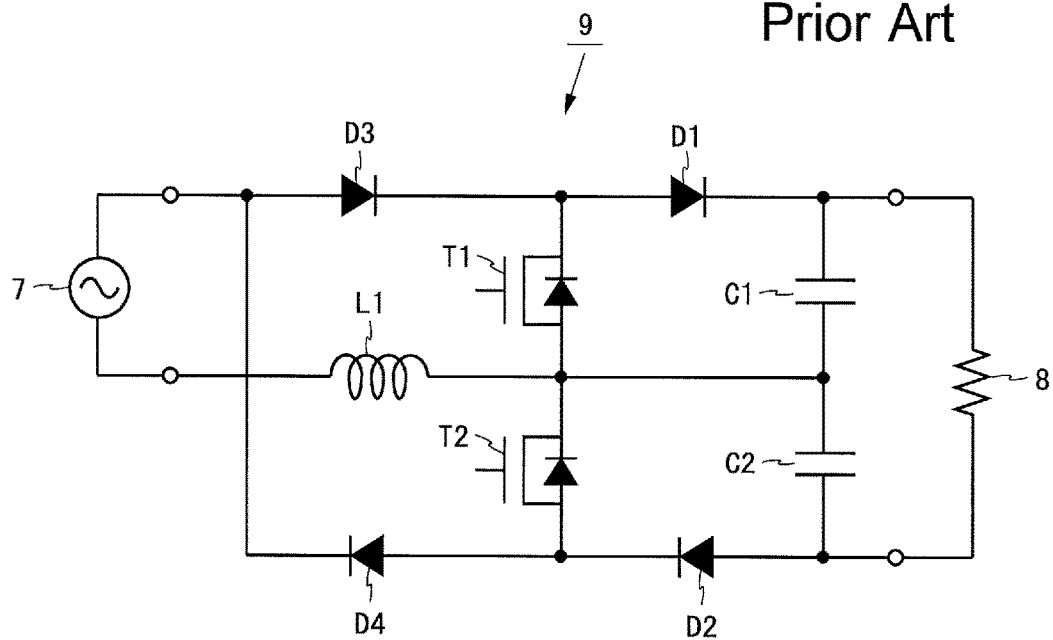
FIG. 18 is a circuit, diagram of a conventional power factor correction circuit.

Although the power factor correction circuit 9 shown in FIG. 18 requires four diodes, the number of diodes included in the power factor correction circuit 101 is two. Thus, the power factor correction circuit 101 also has the effect that a small number of rectifier elements are required. As described above, in the power factor correction circuit 9, the diode D4 prevents an unnecessary current from continuously flowing when the positive voltage is input, and the diode D3 prevents an unnecessary current from continuously flowing when the negative voltage is input. Hence the diodes D3, D4 are essential elements for the power factor correction circuit 9. This is because, in the power factor correction circuit 9, the FETs T1, T2 are connected in forward series, and the power from, the AC power supply 7 is supplied to the two ends of the connected FETs T1, T2.

In contrast, in the power factor correction circuit 101, the MOSFETs 121, 122 are connected in anti-series, and the two ends of the connected MOSFETs 121, 122 are supplied with the power from the AC power supply 7. When the positive voltage is input, the MOSFET 121 is switched to charge the capacitor 141 with the boosted voltage. When the negative voltage is input, the MOSFET 122 is switched to charge the capacitor 142 with the boosted voltage. Hence the power factor correction circuit 101 does not require elements corresponding to the diodes D3, D4 in the power factor correction circuit 9. Thus, according to the power factor correction circuit 101, the number of rectifier elements is made smaller than that in the power factor correction circuit 9, thus enhancing the efficiency.

Further, in the power factor correction circuit 9, when the capacitor C1 is charged, the current passes through the diodes D1, D3. In contrast, in the power factor correction circuit 101, when the capacitor 141 is charged, the current passes only through the diode 131 (FIG. 12A). Thus, according to the power factor correction circuit 101, the loss in the rectifier element can be reduced more than in the power factor correction circuit 9.

As shown above, the power factor correction circuit 101 according to the present embodiment includes: the first and second input terminals 151, 152; the first and second output terminals 153, 154; the coil 111; the bidirectional switch 120 that includes first and second transistors (MOSFETs 121, 122) connected in anti-series, the bidirectional switch 120 having one end connected to the first node N11 and the other end connected to the second node N12; the first capacitor 141 having one end connected to the first output terminal 153, and the other end connected to the second node N12; the second capacitor 142 having one end connected to the second node N12, and the other end connected to the second output terminal 154; a first rectifier element (diode 131) connected between the first node N11 and the one end of the first capacitor 141 so as to allow a current to flow from the first node N11 side; and a second rectifier element (diode 132) connected between the first node N11 and the other end of the second capacitor 142 so as to allow a current to flow to the first node side. The power factor correction circuit 101 has a current path between the first and second input terminals 151, 152 via the coil 111 and the bidirectional switch 120. The coil 111 is connected between the second node N12 and the input terminal 152.

Thus, according to the power factor correction circuit 101 of the present embodiment, the voltage generated by the boosting circuit including the bidirectional switch 120 and the coil 111 provided on a second input terminal 152 side is alternately applied to each of the two capacitors 141, 142, thereby enabling output of the voltage that is twice as large as the voltage generated by the boosting circuit. Hence it is possible to constitute the power factor correction circuit 101 by using a small-sized element with a small withstand voltage and reduce the circuit in size and cost. Further, since the boosting ratio in the boosting circuit is small, the switching loss can be reduced to enhance the efficiency of the power factor correction circuit 101. Moreover, the number of rectifier elements may be two. Hence it is possible to provide the power factor correction circuit 101 which has a high efficiency and includes a small number of components.

The first transistor is the MOSFET 121 having a source terminal, and a drain terminal connected to the first node N11, and the second transistor is the MOSFET 122 having a source terminal connected to the source terminal of the first transistor, and a drain terminal connected to the second node N12. Accordingly, the bidirectional switch 120 including the two transistors connected in anti-series can be configured by connecting the source terminals of the two MOSFETs 121, 122 to each other. By using this bidirectional switch 120, it is possible to provide the power factor correction circuit 101 which has a high efficiency and includes a small number of components.

The first transistor is switched when a potential at the first input terminal 151 is higher than a potential at the second input terminal 152, and the second transistor is switched when the potential at the first input terminal 151 is lower than the potential at the second input terminal 152. In this manner, the first and second transistors are switched in accordance with the polarity of the input voltage, to alternately apply, to each of the two capacitors 141, 142, the voltage generated by the boosting circuit including the coil 111 and the bidirectional switch 120, thus enabling output of the voltage that is twice as large as the voltage generated by the boosting circuit.

The second transistor is controlled to the on-state when the potential at the first input terminal 151 is higher than the potential at the second input terminal 152, and the first transistor is controlled to the on-state when the potential at the first input terminal 151 is lower than the potential at the second input terminal 152. In this manner, the transistor not to be switched, of the first and second transistors, is controlled to the on-state, whereby the loss due to the voltage drop in the parasitic diode built in the transistor can be reduced.

As for the power factor correction circuit 101 according to the present embodiment, it is possible to constitute the following modifications. For example, the bidirectional switch may include two P-channel transistors connected in anti-series. Further, the bidirectional switch may include two IGBTs having emitter terminals connected to each other, or two bipolar transistors having emitter terminals connected to each other. In this bidirectional switch, an FRD or the like is externally attached to each IGBT or bipolar transistor. An anode terminal of the FRD is connected to an emitter terminal of the IGBT or the bipolar transistor, and a cathode terminal of the FRD is connected to a collector terminal of the IGBT or the bipolar transistor.

As thus described, the first transistor may be an IGBT or a bipolar transistor having the emitter terminal, and the collector terminal connected to the first node N11, and the second transistor may be an IGBT or a bipolar transistor having the emitter terminal connected to the emitter terminal of the first transistor, and the collector terminal connected to the second node N12. Also in this case, the bidirectional switch including two transistors connected in anti-series can be configured by connecting the two emitter terminals of the two IGBTs (or bipolar transistors) to each other. By using this bidirectional switch, it is possible to provide the power factor correction circuit which has a high efficiency and includes a small number of components.

Further, the bidirectional switch may include rectifier elements (FRDs) connected in anti-parallel with the first and second transistors. Thus, even when the parasitic diodes are not built in the first and second transistors, the bidirectional switch can be configured by connecting the rectifier elements in anti-parallel with the first and second transistors. By using this bidirectional switch, it is possible to provide the power factor correction circuit which has a high efficiency and includes a small number of components.

Moreover, the bidirectional switch may include two GaN-HEMTs having source terminals connected to each other. When the GaN-HEMT is a normally-off type, an FRD or the like is externally attached to each GaN-HEMT. When the GaN-HEMT is a normally-on type, a silicon MOSFET is preferably connected in cascode to each GaN-HEMT. Accordingly, the source terminals of the two HEMTs are connected to each other to constitute the bidirectional switch including the two transistors connected in anti-series. By using this bidirectional switch, it is possible to provide the power factor correction circuit which has a high efficiency and includes a small number of components.

Eighth Embodiment

Figure 13:
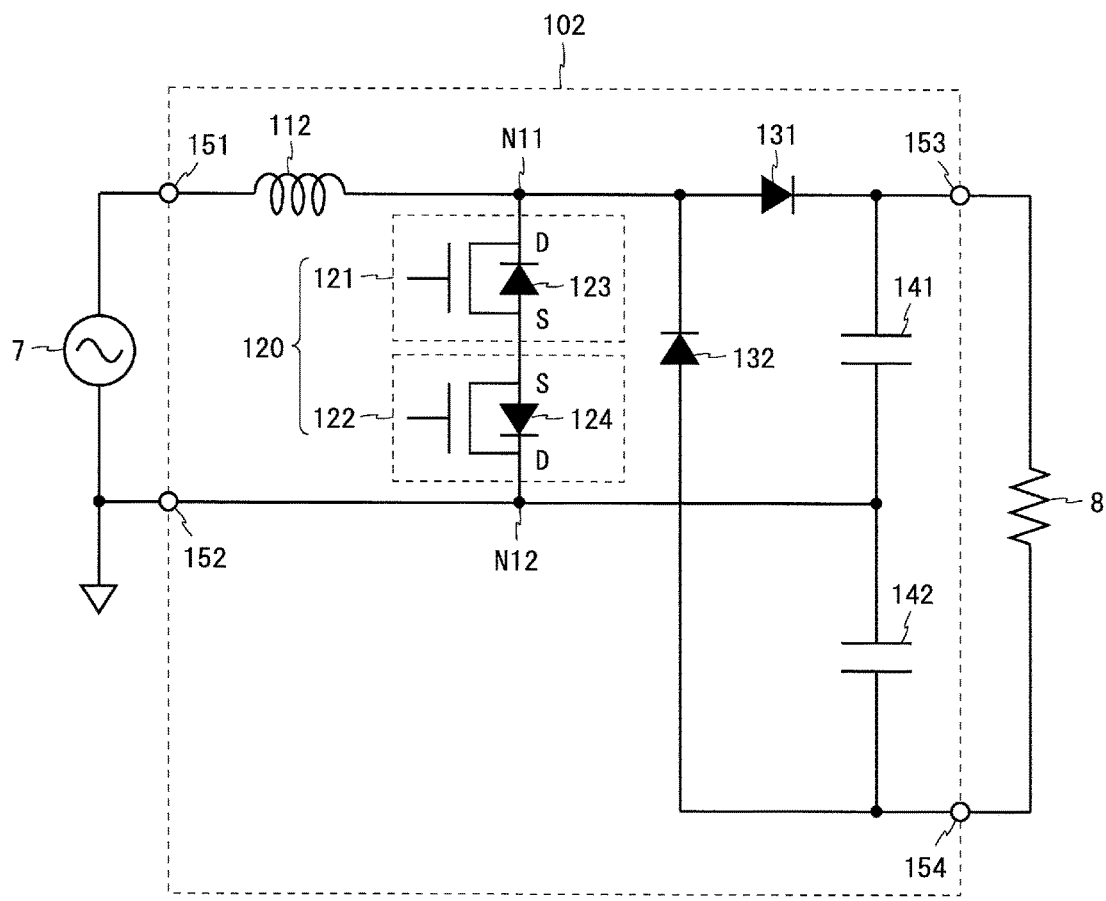
FIG. 13 is a circuit diagram of a power factor correction circuit according to an eighth embodiment, of the present invention.

FIG. 13 is a circuit diagram of a power factor correction circuit according to an eighth embodiment, of the present invention. A power factor correction circuit 102 shown in FIG. 13 includes a coil 112, N-channel MOSFETs 121, 122, diodes 131, 132, capacitors 141, 142, input terminals 151, 152, and output terminals 153, 154.

The power factor correction circuit 102 is obtained by changing the connection position of the coil in the power factor correction circuit 101 according to the seventh embodiment. In the power factor correction circuit 102, one end of the coil 112 (the left end in the figure) is connected to the input terminal 151. The other end of the coil 112 is connected to one end of the bidirectional switch 12 0 (node N11). An anode terminal of the diode 131 and a cathode terminal of the diode 132 are also connected to the node N11. The other end of the bidirectional switch 120 (node N12) is connected to the other end of the capacitor 141 (the lower end in the figure), one end of the capacitor 142 (the upper end in the figure), and the input terminal 152. When the bidirectional switch 120 is in the on-state, a current path is formed between the input terminals 151, 152 via the coil 112, the node N11, the bidirectional switch 120, and the node N12. As thus described, the power factor correction circuit 102 has a current path between the input terminals 151, 152 via the coil 112 and the bidirectional switch 120. The coil 112 is connected between the input terminal 151 and the node N11.

The power factor correction circuit 102 operates similarly to the power factor correction circuit 101 according to the seventh embodiment. When the positive voltage is input, the MOSFET 121 is switched to charge the capacitor 141 with the voltage obtained by boosting the voltage supplied from the AC power supply 7. When the negative voltage is input, the MOSFET 122 is switched to charge the capacitor 142 with the voltage obtained by boosting the voltage supplied from, the AC power supply 7. The power factor correction circuit 102 applies, to the load 8, the voltage that is twice as large as the voltage generated by the boosting circuit including the coil 112 and the bidirectional switch 120.

Thus, according to the power factor correction circuit 102 of the present embodiment, similarly to the power factor correction circuit 101, it is possible to reduce the circuit in size and cost, enhance the efficiency, reduce the number of rectifier elements, and reduce the loss in the rectifier element.

Further, the power factor correction circuit 102 has the following effect. In the power factor correction circuit 101, the connection point of the capacitors 141, 142 (hereinafter referred to as middle point) is connected to the second terminal of the AC power supply 7 via the coil 111. For this reason, the common-mode noise may occur by fluctuations in voltage between the two ends of the coil 111. In contrast, in the power factor correction circuit 102, the middle point is connected to the second terminal of the AC power supply 7 not via a coil. For this reason, a potential at the middle point is always equal to a potential at the second terminal of the AC power supply 7, and an effective value of a potential difference between the output terminal 153 and the middle point is equal to an effective value of a potential difference between the output terminal 154 and the middle point. Thus, according to the power factor correction circuit 102 of the present embodiment, the common-mode noise can be made smaller than in the power factor correction circuit 101, As shown above, in the power factor correction circuit 102 according to the present embodiment, the coil 112 is connected between the first input terminal 151 and the first node N11. Hence it is possible to constitute a boosting circuit by using the bidirectional switch 120 and the coil 112 provided on a first input terminal 151 side, and apply the voltage generated by the boosting circuit, to the two capacitors 141, 142. Further, the connection point of the two capacitors 141, 142 is connected to the second input terminal 152 not via a coil, whereby the common-mode noise can be reduced.

As for the power factor correction circuit 102 according to the present embodiment, it is possible to constitute the following modifications. For example, the power factor correction circuit in a modification may include two coils. In this power factor correction circuit, one coil is connected between the input terminal 151 and the one end of the bidirectional switch 120 (node N11), and the other coil is connected between the other end of the bidirectional switch 120 (node N12) and the input terminal 152.

In this power factor correction circuit, the coils are connected both between the first input terminal 151 and the first node N11 and between the second node N12 and the second input terminal 152. Hence it is possible to constitute a boosting circuit by using the bidirectional switch 120 and the two coils provided on the first and second input terminals 151, 152 sides, and apply the voltage generated by the boosting circuit to the two capacitors 141, 142. Further, by using two coils, inductance of each coil can be reduced. In this power factor correction circuit, the coil may be connected at least one of between the first input terminal 151 and the first node N11, and between the second node N12 and the second input terminal 152.

The bidirectional switch may include two P-channel transistors connected in anti-series. Further, the bidirectional switch may include two IGBTs having emitter terminals connected to each other, two bipolar transistors having emitter terminals connected to each other, or two GaN-HEMTs having source terminals connected to each other.

Ninth Embodiment

Figure 14:
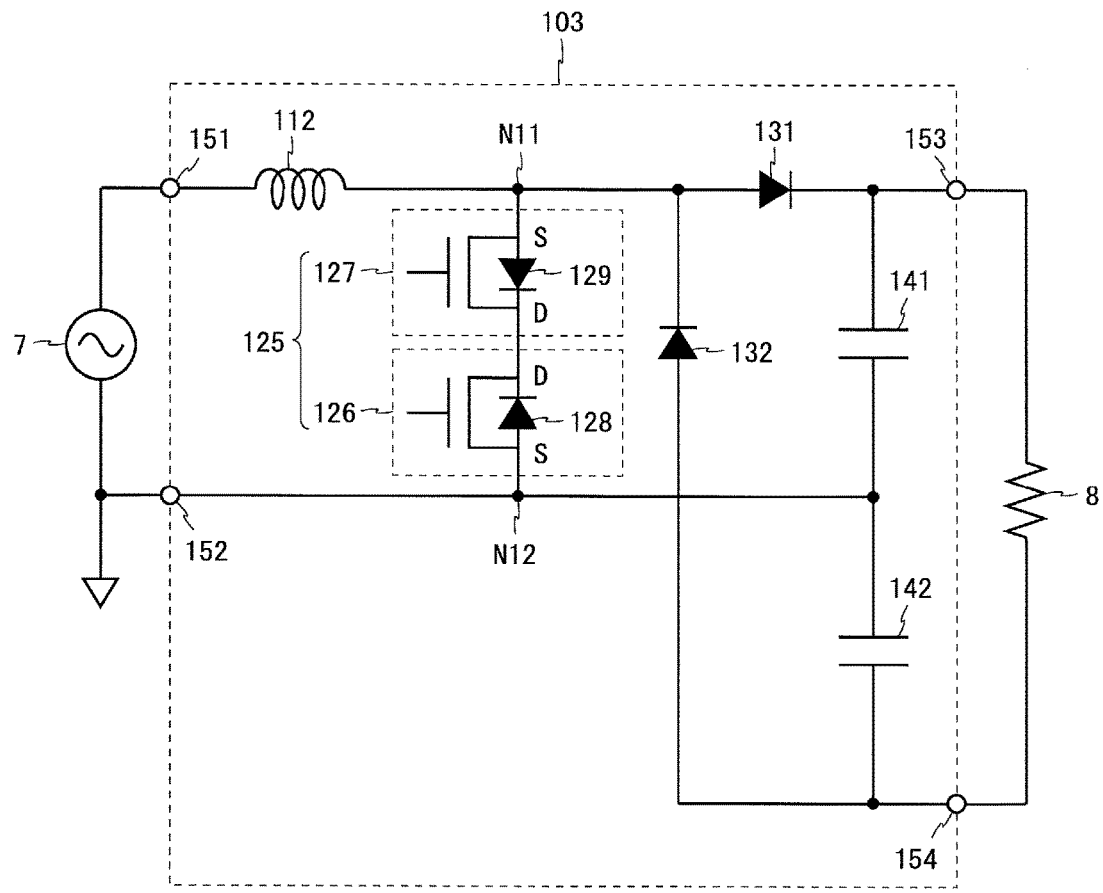
FIG. 14 is a circuit diagram of a power factor correction circuit according to a ninth embodiment of the present invention.

FIG. 14 is a circuit diagram of a power factor correction circuit according to a ninth embodiment of the present invention. A power factor correction circuit 103 shown in FIG. 14 includes a coil 112, N-channel MOSFETs 126, 127, diodes 131, 132, capacitors 141, 142, input terminals 151, 152, and output terminals 153, 154. The MOSFETs 126, 127 respectively have parasitic diodes 128, 129 built therein.

The power factor correction circuit 103 is obtained by changing the configuration of the bidirectional switch in the power factor correction circuit 102 according to the eighth embodiment. In the power factor correction circuit 103, a source terminal of the MOSFET 126 is connected to the node N12. A drain terminal of the MOSFET 126 is connected to a drain terminal of the MOSFET 127. A source terminal of the MOSFET 127 is connected to the node N11. Accordingly, there is configured a bidirectional switch 125 which includes the two MOSFETs 126, 127 connected in anti-series, the bidirectional switch 125 having one end connected to the node N11 and the other end connected to the node N12. An anode terminal and a cathode terminal of the parasitic diode 128 are respectively connected to the source terminal and the drain terminal of the MOSFET 126. This also applies to the parasitic diode 129.

The power factor correction circuit 103 operates similarly to each of the power factor correction circuits 101, 102 according to the seventh and eighth embodiments. When a positive voltage is input, the MOSFET 126 is switched to charge the capacitor 141 with the voltage obtained by boosting the voltage supplied from, the AC power supply 7. When a negative voltage is input, the MOSFET 127 is switched to charge the capacitor 142 with the voltage obtained by boosting the voltage supplied from the AC power supply 7. The power factor correction circuit 103 applies, to the load 8, the voltage that is twice as large as the voltage generated by the boosting circuit including the coil 112 and the bidirectional switch 125.

In the power factor correction circuit 103, when the MOSFET 126 is controlled to the on-state and the positive voltage is input, it is preferable to also control the MOSFET 127 to the on-state. In particular, when the positive voltage is input, it is preferable to switch the MOSFET 126 while holding the MOSFET 127 in the on-state. Accordingly, the loss due to the voltage drop in the parasitic diode 129 can be reduced. Further, when the MOSFET 127 is controlled to the on-state when the negative voltage is input, it is preferable to also control the MOSFET 126 to the on-state. In particular, when the negative voltage is input, it is preferable to switch the MOSFET 127 while holding the MOSFET 126 in the on-state. Accordingly, the loss due to the voltage drop in the parasitic diode 128 can be reduced.

Thus, according to the power factor correction circuit 103 of the present embodiment, similarly to the power factor correction circuits 101, 102, it is possible to reduce the circuit in size and cost, enhance the efficiency, reduce the number of rectifier elements, and reduce the loss in the rectifier element.

Further, the power factor correction circuit 103 has the following effects. Generally, in a semiconductor chip with the MOSFET built therein, a drain terminal of the MOSFET is connected to a metal part of a heat-sink mounting portion of a package. In the power factor correction circuit. 103, since a potential at the drain terminal of the MOSFET 126 is equal to a potential at the drain terminal of the MOSFET 127, the MOSFETs 126, 127 can be connected to one heat sink.

In the power factor correction circuit 103, the distance between the MOSFETs 126, 127 is preferably small for making the parasitic inductance of the current path small. When the heat sinks are separately mounted to the MOSFETs 126, 127, potentials at the heat sinks are different, thus requiring a certain degree of creeping distance or spatial distance to be provided between the heat sinks. By the MOSFETs 126, 127 sharing one heat sink, it is possible to make the distance between the MOSFETs 126, 127 small and the parasitic inductance of the current path small, thus reducing the noise of the power factor correction circuit 103.

Generally, when two elements with different calorific values share one heat sink, heat is transmitted from the element with a larger calorific value to the element with a smaller calorific value, and it is thus not necessarily preferable to share the heat sink. In the power factor correction circuit 103, the MOSFET 126 is switched when the positive voltage is input and the MOSFET 127 is switched when the negative voltage is input, the calorific value of the MOSFET 126 is almost equal to the calorific value of the MOSFET 127. Hence in the power factor correction circuit 103, when the MOSFETs 126, 127 share one heat sink, only the effect can be obtained with no problem occurring.

In the power factor correction circuit, a control signal of the bidirectional switch is generated taking the potential at the source terminal of the MOSFET as a reference. In each of the power factor correction circuits 101, 102, a control circuit (not shown) for the MOSFETs 121, 122 is connected to the connection point of the MOSFETs 121, 122. Thus, when the MOSFETs 121, 122 are both in the off-state, a potential at the connection point of the MOSFETs 121, 122 may be lower than potentials at two ends of the bidirectional switch 120 due to a variety of surge and noise. At this time, source terminals of the MOSFETs 121, 122, which provide the reference potentials for the switching, enter the floating.

In the power factor correction circuit 103, a control circuit (not shown) for the MOSFET 126 is connected to the other end of the bidirectional switch 120 (node N12), and a control circuit (not shown) for the MOSFET 127 is connected to the one end of the bidirectional switch 120 (node N11). For this reason, the control circuits for the MOSFETs 126, 127 are directly connected to the AC power supply 7. Thus, according to the power factor correction circuit 103, it is possible to prevent the control circuit from being influenced by noise or surge and generating radiation noise. Further, it is possible to stabilize the potentials at the source terminals of the MOSFETs 126, 127 which provide the reference potentials for the switching, and reduce the noise, thus enabling stable operation of the circuit.

As shown above, in the power factor correction circuit 103 according to the present embodiment, the first transistor is the MOSFET 126 having a drain terminal, and a source terminal connected to the second node N12, and the second transistor is the MOSFET 127 having a drain terminal connected to the drain terminal of the first transistor, and a source terminal connected to the first node N11.

Accordingly, the bidirectional switch 125 including the two transistors connected in anti-series can be configured by connecting the drain terminals of the two MOSFETs 126, 127 to each other. By using this bidirectional switch 125, it is possible to provide the power factor correction circuit 103 which has a high efficiency and includes a small number of components. Further, since two transistors can be connected to one heat sink, the distance between the two transistors can be made small and the parasitic inductance of the current path can be made small, whereby the noise of the power factor correction circuit 103 can be reduced. Moreover, by connecting the source terminals of the two transistors to the first and second input terminals 151, 152, the control circuit for the bidirectional switch 125 can be prevented from being influenced by noise or the like, and the potentials at the source terminals of the two transistors can be stabilized, thus leading to stable operation of the power factor correction circuit 103, As for the power factor correction circuit 103 according to the present embodiment, it is possible to constitute the following modifications. For example, in the power factor correction circuit in a modification, the coils maybe connected both between the first input terminal 151 and the first node N11, and between the second node N12 and the second input terminal 152. Further, the bidirectional switch may include two P-channel transistors connected in anti-series. Moreover, the bidirectional switch may include two IGBTs having collector terminals connected to each other, two bipolar transistors having collector terminals connected to each other, or two GaN-HEMTs having drain terminals connected to each other.

Figure 15:
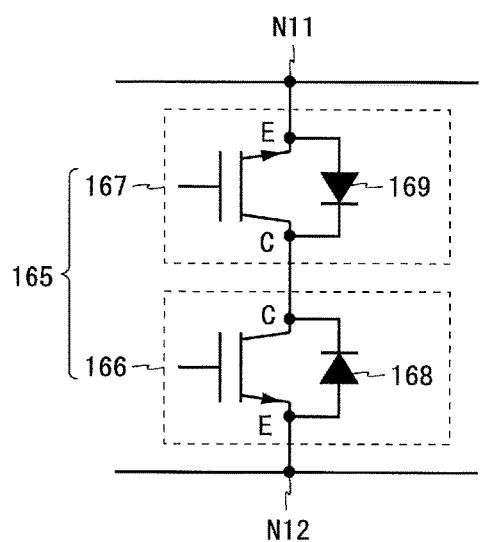
FIG. 15 is a circuit diagram of a bidirectional switch of a power factor correction circuit according to one modification of the ninth embodiment of the present invention.

FIG. 15 is a circuit diagram of a bidirectional switch of the power factor correction circuit according to one modification of the ninth embodiment of the present invention. A bidirectional switch 165 shown in FIG. 15 includes IGBTs 166, 167 and FRDs 168, 169. An emitter terminal of the IGBT 166 is connected to the node N12. A collector terminal of the IGBT 166 is connected to the collector terminal of the IGBT 167. An emitter terminal of the IGBT 167 is connected to the node N11. The FRDs 168, 169 are respectively externally attached to the IGBTs 166, 167. An anode terminal and a cathode terminal of the FRD 168 are respectively connected to the emitter terminal and the collector terminal of the IGBT 166. This also applies to the FRD 169.

Also in the power factor correction circuit provided with the bidirectional switch 165, effects similar to the power factor correction circuit 103 can be obtained. In the description of the effect of the power factor correction circuit 103, a similar description may be applied to the power factor correction circuit including the bidirectional switch 165 when the MOSFET 126 is replaced with the IGBT 166, the MOSFET 127 with the IGBT 167, the source terminal with the emitter terminal, and the drain terminal with the collector terminal.

As thus described, the first transistor may be an IGBT or a bipolar transistor having a collector terminal, and an emitter terminal connected to the second node N12, and the second transistor may be an IGBT or a bipolar transistor having a collector terminal connected to the collector terminal of the first transistor, and an emitter terminal connected to the first node. Further, the first transistor may be a HEMT having a drain terminal, and a source terminal connected to the second node N12, and the second transistor may be a HEMT having a collector terminal connected to the collector terminal of the first transistor, and an emitter terminal connected to the first node. Also in these cases, effects similar to the case where the first and second transistors are the MOSFETs can be obtained.

Tenth Embodiment

Figure 16:
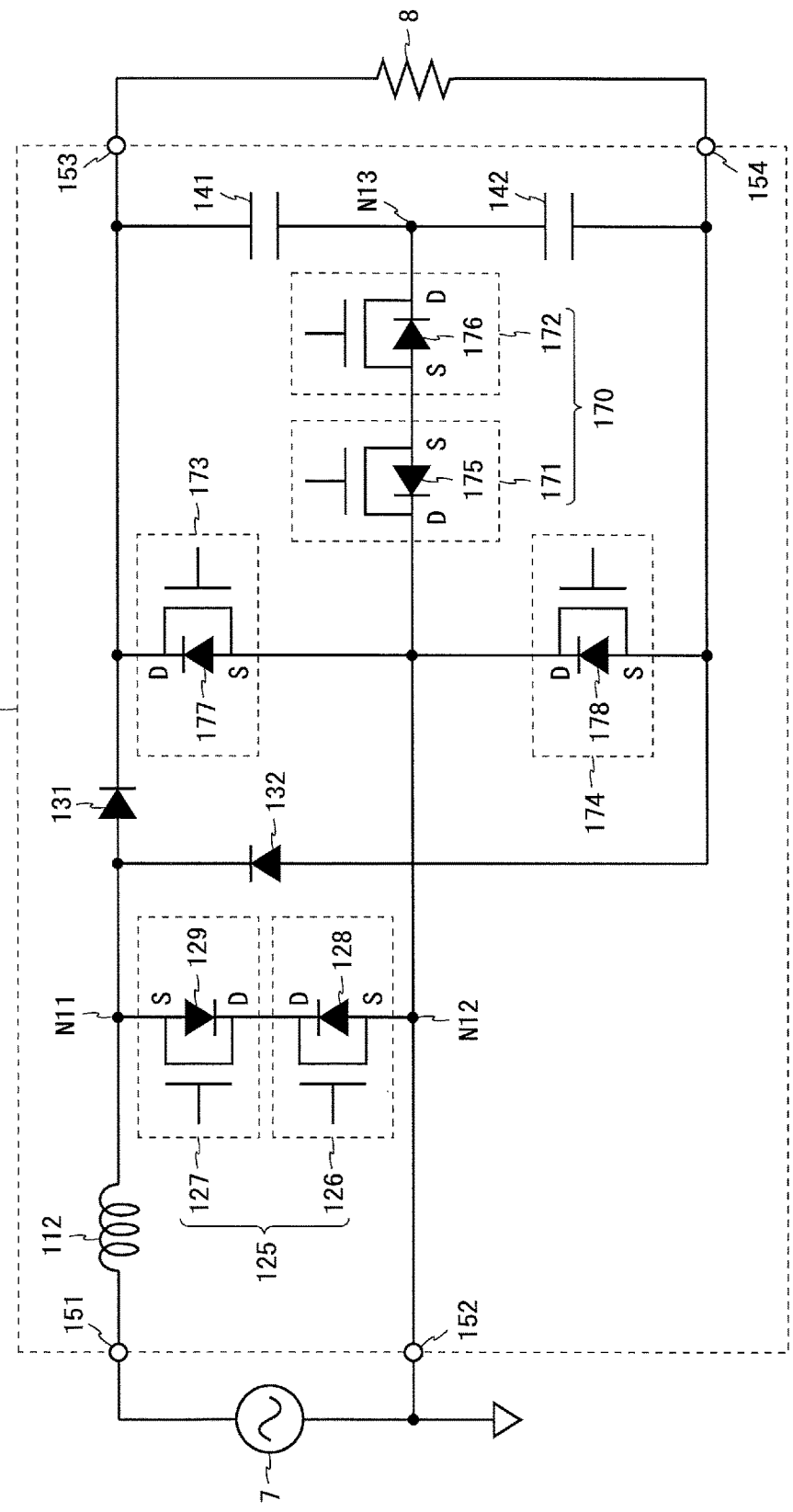
FIG. 16 is a circuit diagram of a power factor correction circuit according to a tenth embodiment of the present invention.

FIG. 16 is a circuit diagram of a power factor correction circuit according to a tenth embodiment of the present invention. A power factor correction circuit 104 shown in FIG. 16 includes a coil 112, MOSFETs 126, 127, 171 to 174, diodes 131, 132, capacitors 141, 142, input terminals 151, 152, and output terminals 153, 154. The MOSFETs 126, 127, 171 to 174 respectively have parasitic diodes 128, 129, 175 to 178 built therein. The power factor correction circuit 104 is obtained by adding the MOSFETs 171 to 174 to the power factor correction circuit 103 according to the ninth embodiment. Hereinafter, a difference from, the power factor correction circuit 103 is described.

In the power factor correction circuit 104, the other end of the capacitor 141 (the lower end in the figure) and one end of the capacitor 142 (the upper end in the figure) are connected to a node N13. A drain, terminal of the MOSFET 171 is connected to the other end of the bidirectional switch 125 (node N12). A source terminal of the MOSFET 171 is connected to a source terminal of the MOSFET 172. A drain terminal of the MOSFET 172 is connected to the node N13. Accordingly, there is configured, a bidirectional switch 170 which includes the two MOSFETs 171, 172 connected in anti-series, the bidirectional switch 170 having one end connected to the node N12 and the other end connected to the node M13. An anode terminal and a cathode terminal of the parasitic diode 175 are respectively connected to the source terminal and the drain terminal of the MOSFET 171. This also applies to the parasitic diode 176.

A source terminal of the MOSFET 173 and a drain terminal of the MOSFET 174 are connected to the other end of the bidirectional switch 125 (node N12). A drain terminal of the MOSFET 173 is connected, to the cathode terminal, of the diode 131, one end of the capacitor 141, and the output terminal 153. A source terminal of the MOSFET 174 is connected to the anode terminal of the diode 132, the other end of the capacitor 142, and the output, terminal 154. An anode terminal and a cathode terminal of the parasitic diode 177 are respectively connected to the source terminal and the drain terminal of the MOSFET 173. This also applies to the parasitic diode 178.

As described above, the bidirectional switch 170 is connected between the node N12 and the node N13. The MOSFET 173 is connected between the node N12 and the one end of the capacitor 141 so as to allow a current to flow a node N12 side. The MOSFET 174 is connected between the node N12 and the other end of the capacitor 142 so as to allow a current to flow to the node N12 side. The MOSFETs 173, 174 function as rectifier elements.

The power factor correction circuit 104 is a power factor correction circuit usable in every country around the world and compatible with the commercial power supply in each country. The commercial power supply voltage in each country is within the range of approximately 100 V to 240 V. Hence the conventional boosting-type power factor correction circuit boosts the input voltage to a predetermined level (e.g., about 400 V) irrespective of the level of the input voltage so that the circuit stably operates even when the input voltage slightly exceeds 240 V (peak voltage is about 340 V). For this reason, when the input voltage is low, the boosting ratio increases and the loss in the boosting circuit increases. As thus described, the conventional boosting-type power factor correction circuit has a problem that the efficiency is low when the input voltage is low.

In order to solve this problem, the power factor correction circuit 104 has the function of switching the operation mode. In the power factor correction circuit 104, the commercial power supply voltage in each country is classified into a group of 100 V to 130 V and a group of 200 V to 240 V, with 140 V taken as a threshold, for example. The power factor correction circuit 104 compares the input voltage (the voltage supplied from the AC power supply 7) with the threshold, and controls the state of the bidirectional switch 170 based on the comparison result. When the input voltage is lower than the threshold, the bidirectional switch 170 is controlled to the on-state, and the power factor correction circuit 104 operates in a first operation mode in which the double voltage boosting is performed. When the input voltage is higher than the threshold, the bidirectional switch 170 is controlled to the off-state, and the power factor correction circuit 104 operates in a second operation mode in which the double voltage boosting is not performed.

In the first operation mode, the bidirectional switch 170 is always controlled to the on-state, and the MOSFETs 173, 174 are controlled to the off-state. At this time, the power factor correction circuit 104 becomes substantially the same circuit as the power factor correction circuit 103 according to the ninth embodiment, and operates similarly to the power factor correction circuit 103. In the first operation mode, the power factor correction circuit 104 applies, to the load 8, the voltage that is twice as large as the voltage generated by the boosting circuit including the coil 112 and the bidirectional switch 125. At this time, the boosting ratio is one-half as large as that of the typical boosting-type power factor correction circuit, and hence the efficiency can be enhanced even when the input voltage is low.

In the second operation mode, the bidirectional switch 170 is always controlled to the off-state. Further, the MOSFET 174 is preferably controlled to the on-state when the positive voltage is input, and the MOSFET 173 is preferably controlled to the on-state when the negative voltage is input.

Figure 17A:
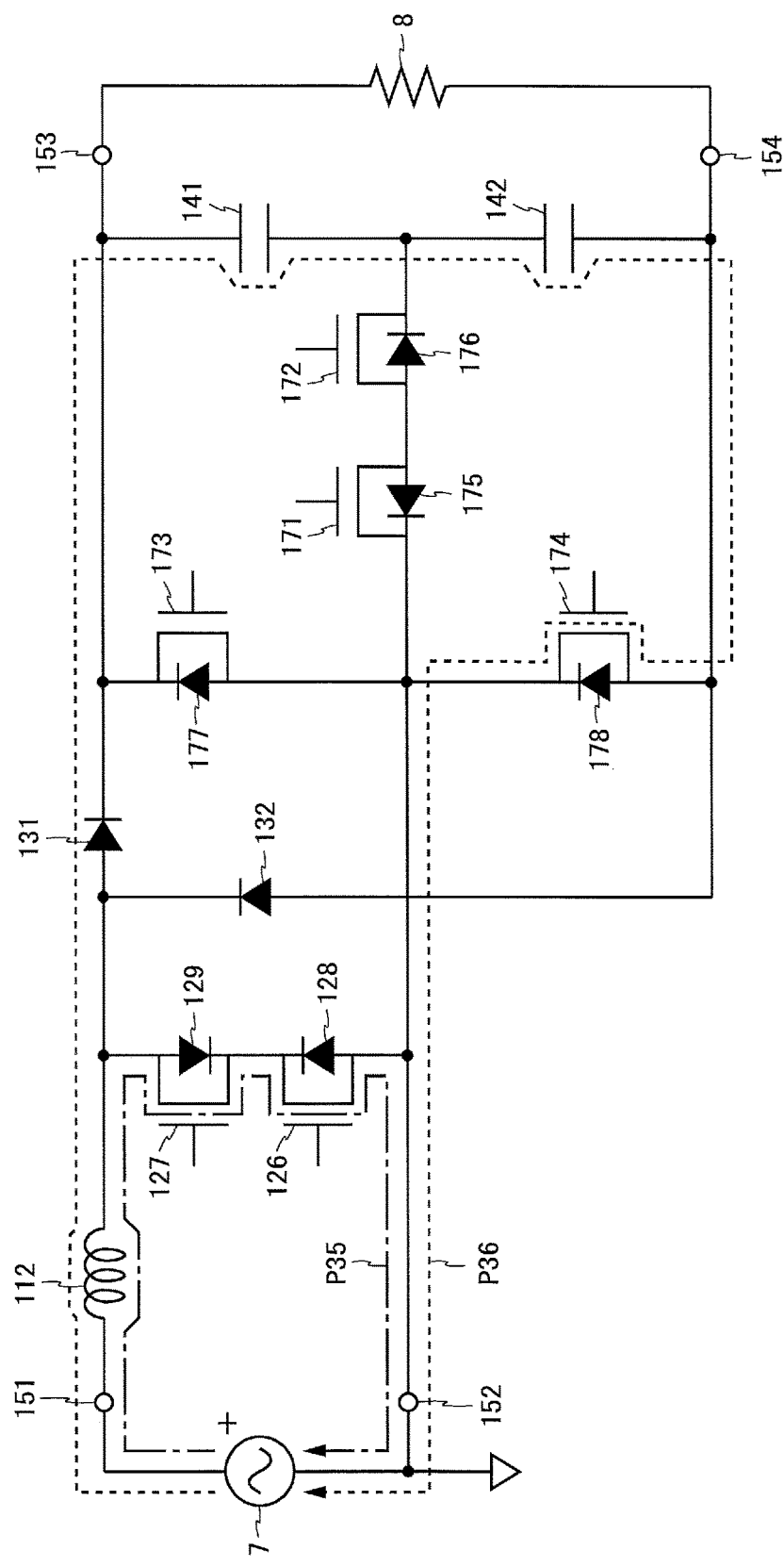
FIG. 17A is a diagram showing a current path in the second operation mode when a positive voltage is input in the power factor correction circuit shown in FIG. 16.

FIG. 17A is a diagram showing a current path in the second operation mode when the positive voltage is input. When the bidirectional switch 125 is in the on-state in the second operation mode and the positive voltage is input, a current flows through a path P35 indicated by a one-dot chain line in FIG. 17A. The current flows from the first terminal of the AC power supply 7 to the second terminal of the AC power supply 7 via the input terminal 151, the coil 112, the node N11, the MOSFET 127, the MOSFET 126, the node N12, and the input terminal 152. While the current is flowing through the path P35, the voltage is applied from the AC power supply 7 to two ends of the coil 112, and energy is stored in the coil 112.

When the bidirectional switch 125 is in the off-state in the second operation mode and the positive voltage is input, a current flows through a path P3 6 indicated by a broken line in FIG. 17A. The current flows from the first terminal of the AC power supply 7 to the second terminal of the AC power supply 7 via the input terminal 151, the coil 112, the node N11, the diode 131, the capacitor 141, the capacitor 142, the MOSFET 174, the node N12, and the input terminal 152. While the current is flowing through the path P36, the coil 112 is connected in series with the AC power supply 7, and the energy stored in the coil 112 is released. Therefore, the voltage obtained by boosting the voltage supplied from the AC power supply 7 is applied to the circuit with the capacitors 141, 142 connected in series, and the capacitors 141, 142 are charged with a voltage that is half as large as the boosted voltage.

Figure 17B:
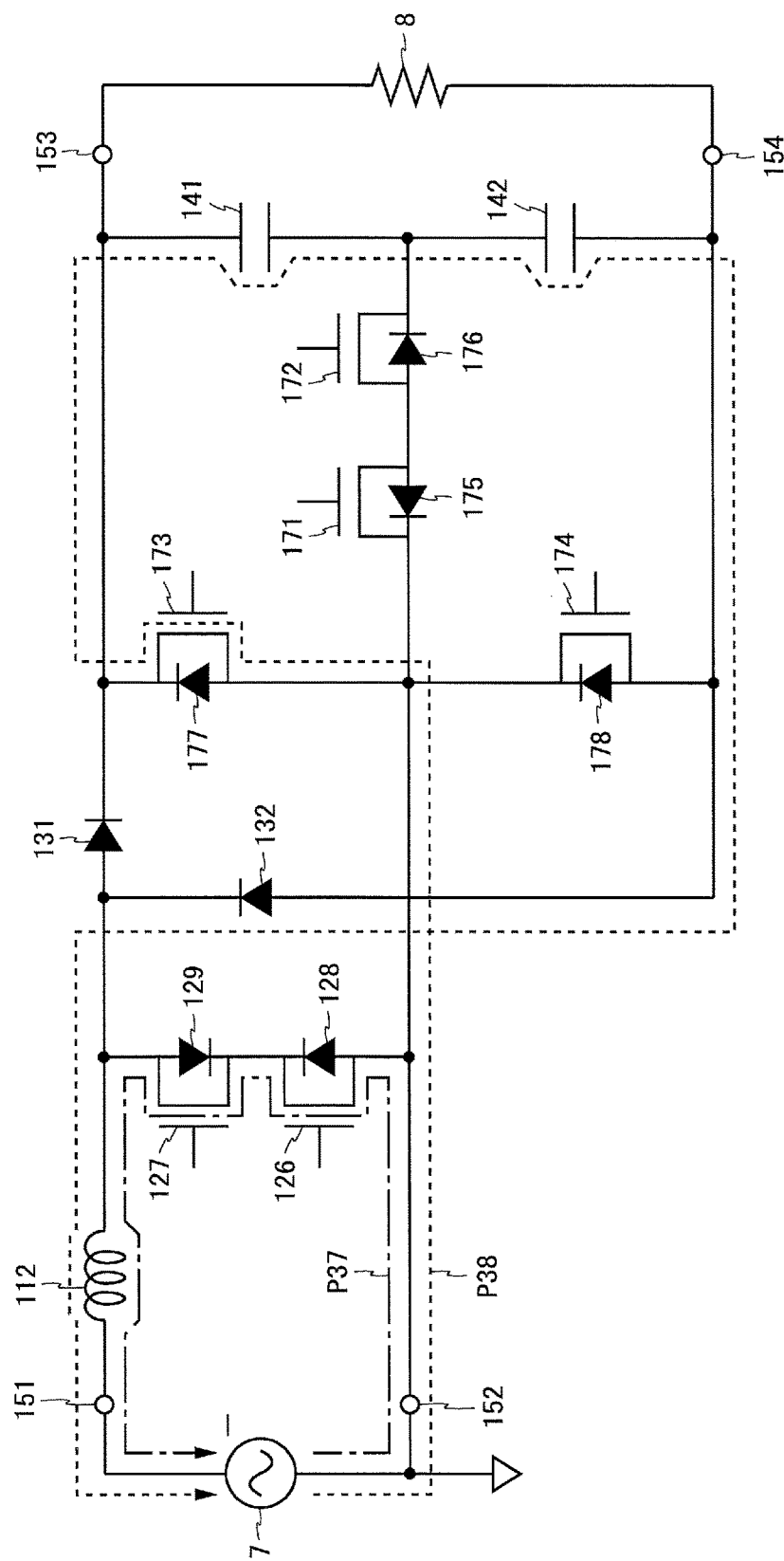
FIG. 17B is a diagram showing a current path in the second operation mode when a negative voltage is input in the power factor correction circuit shown in FIG. 16.

FIG. 17B is a diagram showing a current path in the second operation mode when the negative voltage is input. When the bidirectional switch 125 is in the on-state in the second operation mode and the negative voltage is input, a current flows through a path P37 indicated by a one-dot chain line in FIG. 17B. The current flows from the second terminal of the AC power supply 7 to the first terminal of the AC power supply 7 via the input terminal 152, the node N12, the MOSFET 12 6, the MOSFET 127, the node N11, the coil 112, and the input terminal 151. While the current is flowing through the path P37, the voltage is applied from the AC power supply 7 to the two ends of the coil 112, and energy is stored in the coil 112.

When the bidirectional switch 125 is in the off-state in the second operation mode and the negative voltage is input, a current, flows through a path P38 indicated by a broken line in FIG. 17B. The current flows from, the second terminal of the AC power supply 7 to the first terminal of the AC power supply 7 via the input terminal 152, the node N12, the MOSFET 173, the capacitor 141, the capacitor 142, the diode 132, the node N11, the coil 112, and the input terminal 151. While the current is flowing through the path P38, the coil 112 is connected in series with the AC power supply 7, and the energy stored, in the coil 112 is released. Therefore, the voltage obtained by boosting the voltage supplied from the AC power supply 7 is applied to the circuit with the capacitors 141, 142 connected in series, and the capacitors 141, 142 are charged with a voltage that is half as large as the boosted voltage. Hence in the second operation mode, the power factor correction circuit 104 applies the voltage generated by the boosting circuit, including the coil. 112 and the bidirectional switch 125, as it is to the load 8.

The operation mode of the power factor correction circuit 104 is selected by, for example, comparing the input voltage with the threshold at when the power factor correction circuit 104 is connected to the AC power supply 7, and making the selection in accordance with the comparison result. Further, in order to be compatible with a country where an input voltage greatly fluctuates, the power factor correction circuit 104 may repeatedly compare the input voltage with the threshold and select the operation mode in accordance with the comparison result as appropriate.

When the input voltage is lower than the threshold, the power factor correction circuit 104 operates in the first operation mode in which the double voltage boosting is performed. In the first operation mode, the power factor correction circuit 104 operates with a high efficiency while holding the boosting ratio low. When the input voltage is higher than the threshold, the power factor correction circuit 104 operates in the second operation mode in which the double voltage boosting is not performed. Thus, according to the power factor correction circuit 104 of the present embodiment, a fixed voltage is output with respect to a broad range of the input voltage, and hence the efficiency can be enhanced even when the input voltage is low.

As shown above, the power factor correction circuit 104 according to the present embodiment includes: the first and second input terminals 151, 152; the first and second output terminals 153, 154; the coil 112; the first bidirectional switch 125 that includes first and second transistors (MOSFETs 126, 127) connected in anti-series, the first bidirectional switch 125 having one end connected to the first node N11 and the other end connected to the second node N12; the first capacitor 141 having one end connected to the first output terminal 153, and the other end connected to the third node N13; the second capacitor 142 having one end connected to the third node N13, and the other end connected to the second output terminal 154; the second bidirectional switch 170 connected between the second node N12 and the third node N13; a first rectifier element (diode 131) connected between the first node N11 and the one end of the first capacitor 141 so as to allow a current to flow from the first node N11 side; a second rectifier element (diode 132) connected between the first node N11 and the other end of the second capacitor 142 so as to allow a current to flow to the first node N11 side; a third rectifier element (MOSFET 173) connected between the second node N12 and the one end of the first capacitor 141 so as to allow a current to flow from the second node N12 side; and a fourth rectifier element (MOSFET 174) connected between the second node N12 and the other end of the second capacitor 142 so as to allow a current to flow to the second node N12 side. The power factor correction circuit 104 has a current path between the first and second input terminals 151, 152 via the coil 112 and the first bidirectional switch 125. The coil 112 is connected between the first input terminal 151 and the first node N11.

Thus, according to the power factor correction circuit 104 of the present embodiment, by controlling the conduction state of the second bidirectional switch 170 in accordance with the input voltage, selection can be made between the first operation mode in which the boosting ratio is held low and the double voltage boosting is performed with a high efficiency, and the second operation mode in which the double voltage boosting is not performed. Hence, a fixed voltage is output with respect to a broad range of the input voltage, thus enabling provision of the power factor correction circuit 104 that has a high efficiency even when the input voltage is low.

Also as for the power factor correction circuit 104 according to the present embodiment, it is possible to constitute the following modifications. For example, the power factor correction circuit according to a modification may include a coil connected between the other end of the bidirectional switch 125 and the input terminal 152 in place of the coil 112, or include a coil connected between the other end of the bidirectional switch 125 and the input terminal 152 together with the coil 112. Further, the power factor correction circuit according to another modification may include a bidirectional switch including two IGBTs, two bipolar transistors, or two GaN-HEMTs, which are connected in anti-series.

Moreover, the threshold used for selection of the operation mode may be other than 140 V.

As for the bidirectional switch 170, there can be used an arbitrary bidirectional switch that switches whether or not to electrically connect between the nodes N12, N13. For example, a bidirectional switch configured by connecting two P-channel transistors in anti-series may be used, or a bidirectional switch using other switching element such as a relay may be used. Further, diodes may be used as the third and fourth rectifier elements in place of the MOSFETs 173, 174.

Eleventh Embodiment

A power supply device according to an eleventh embodiment of the present invention has a configuration shown in FIG. 10. In the present embodiment, the power factor correction circuit 71 is any of the power factor correction circuits according to the seventh to tenth embodiments and the modifications thereof. According to the present embodiment, it is possible to provide the power supply device 6 which has a high efficiency and includes a small number of components by using the power factor correction circuit according to the seventh to tenth embodiments and the modifications thereof.

Note that the features of the first to fifth embodiments and the modifications thereof may be arbitrarily combined to constitute a power factor correction circuit having the features of a plurality of embodiments or modifications unless contrary to the nature thereof. Further, the features of the seventh to tenth embodiments and the modifications thereof may be arbitrarily combined to constitute a power factor correction circuit having the features of a plurality of embodiments or modifications unless contrary to the nature thereof.

Although the present invention has been described in detail above, the above description is exemplary in all aspects, and not restrictive. It is understood that a large number of other alternations and modifications can be devised without deviating from the scope of the present invention.

The present application claims priority based on Japanese Patent Application No. 2015-129107 filed on Jun. 26, 2015 and entitled "Power factor correction circuit and power supply device", and priority based on Japanese Patent Application No. 2015-177355 filed on Sep. 9, 2015 and entitled "Power factor correction circuit and power supply device", which are incorporated herein by reference in their entirety.

What is claimed is:

1. A power factor correction circuit capable of switching an operation mode, the circuit comprising:
   first and second input terminals for inputting an input voltage;
   first and second output terminals;
   a coil;
   a switch circuit that, boosts the input voltage to generate a boosted voltage in cooperation with the coil;
   a first capacitor having one end connected to the first output terminal, and the other end connected to an intermediate node; and
   a second capacitor having one end connected, to the intermediate node, and the other end connected to the second output terminal, wherein
   when a potential at the first input terminal is higher than a potential at the second input terminal in a first operation mode, the boosted voltage is applied to the two ends of the first capacitor such that a potential at the one end is higher than a potential at the other end,
   when the potential at the first input terminal is lower than the potential at the second input terminal in the first operation mode, the boosted voltage is applied to the two ends of the second capacitor such that a potential at the one end is higher than a potential at the other end, and
   in a second operation mode, the boosted voltage is applied to two ends of the first and second capacitors connected in series such that the potential at the one end of the first capacitor is higher than the potential at the other end of the second capacitor.

2. The power factor correction circuit according to claim 1, wherein
   the switch circuit is a bidirectional switch including
      a first transistor connected between a first node and a connection node, and
      a second transistor connected between the connection node and a second node,
   the power factor correction circuit further comprises:
   a mode switching circuit having one end connected to the second node, and the other end connected to the intermediate node, the circuit being brought into an on-state in the first operation mode and into an off-state in the second operation mode;
   a first rectifier element connected between the first node and the one end of the first capacitor so as to allow a current to flow from a first node side;
   a second rectifier element connected between the first node and the other end of the second capacitor so as to allow a current to flow to the first node side;
   a third rectifier element connected between the second node and the one end of the first capacitor so as to allow a current to flow from a second node side; and
   a fourth rectifier element connected between the second node and the other end of the second capacitor so as to allow a current to flow to the second node side, and
   the coil is connected at least one of between the first input terminal and the first node, and between the second input terminal and the second node.

3. The power factor correction circuit according to claim 2, wherein
   the first transistor is a MOSFET or a HEMT having a first conduction terminal connected to the first node, and a second conduction terminal connected to the connection node,
   the second transistor is a MOSFET or a HEMT having a second conduction terminal connected to the connection node, and a first conduction terminal connected to the second node,
   the first conduction terminal is one of a source terminal and a drain terminal, and
   the second conduction terminal is the other of the source terminal and the drain terminal.

4. The power factor correction circuit according to claim 2, wherein
   the first transistor is an IGBT or a bipolar transistor having a first conduction terminal connected to the first node, and a second, conduction terminal connected to the connection node,
   the second transistor is an IGBT or a bipolar transistor having a second conduction terminal connected to the connection node, and a first conduction terminal connected to the second node,
   the first conduction terminal is one of an emitter terminal and a collector terminal, and the second conduction terminal is the other of the emitter terminal and the collector terminal.

5. The power factor correction circuit according to claim. 2, wherein
the third rectifier element is a MOSFET having a drain terminal connected to the one end of the first capacitor, and a source terminal connected to the second node, and
the fourth rectifier element is a MOSFET having a drain terminal connected to the second node, and a source terminal connected to the other end of the second capacitor.

6. The power factor correction circuit according to claim 2, further comprising:
a third capacitor connected in parallel with the third rectifier element between the second node and the one end of the first capacitor; and
a fourth capacitor connected in parallel with the fourth rectifier element between the second node and the other end of the second capacitor, wherein
a wiring route from the first node to the second node via the third capacitor is shorter than a wiring route from the first node to the second node via the third rectifier element, and
a wiring route from the second node to the first node via the fourth capacitor is shorter than a wiring route from the second node to the first node via the fourth rectifier element.

7. The power factor correction circuit according to claim 2, wherein
the mode switching circuit is a bidirectional switch that includes first and second MOSFETs having first conduction terminals connected to each other,
a second conduction terminal of the first MOSFET is connected to the second node,
a second conduction terminal of the second MOSFET is connected to the intermediate node,
the first conduction terminal is one of a source terminal and a drain terminal, and
the second conduction terminal is the other of the source terminal and the drain terminal.

8. The power factor correction circuit according to claim. 1, wherein
the switch circuit includes
a first transistor connected between a first node and a second node, and
a second transistor connected between the second node and a third, node,
the power factor correction circuit further comprises:
a mode switching circuit having one end connected to the second node, and the other end connected to the intermediate node, the circuit being brought into an on-state in the first operation mode and into an off-state in the second operation mode;
a first rectifier element connected between the first node and the one end of the first capacitor so as to allow a current to flow from a first node side;
a second rectifier element connected between the third node and the other end of the second, capacitor so as to allow a current to flow to a third node side;
a third rectifier element connected between the first node and a fourth node so as to allow a current to flow to the first node side; and
a fourth rectifier element connected between the third node and the fourth node so as to allow a current to flow from the third node side, and the coil is connected at least one of between the second input terminal and the second node, and between the first input terminal and the fourth node.

9. The power factor correction circuit according to claim 8, wherein
the first transistor is a MOSFET or a HEMT having a drain terminal connected to the first node, and a source terminal connected to the second node, and
the second transistor is a MOSFET or a HEMT having a drain terminal connected to the second node, and a source terminal connected to the third node.

10. The power factor correction circuit according to claim 8, wherein
the first transistor is an IGBT or a bipolar transistor having a collector terminal connected to the first node, and an emitter terminal connected to the second node, and
the second transistor is an IGBT or a bipolar transistor having a collector terminal connected to the second node, and an emitter terminal connected to the third node.

11. The power factor correction circuit according to claim. 1, further comprising a control circuit that switches the operation mode to the first operation mode when the input voltage is lower than a first, threshold, and switches the operation mode to the second operation mode when the input voltage is higher than a second threshold.

12. A power supply device comprising:
the power factor correction circuit according to claim. 1; and
a DC-DC converter.

13. A power factor correction circuit comprising:
first and second input terminals;
first and second output terminals;
a coil;
a bidirectional switch that includes first and second transistors connected in anti-series, the bidirectional switch having one end connected to a first node, and the other end connected to a second node;
a first capacitor having one end connected to the first output terminal, and the other end connected to the second node;
a second capacitor having one end connected to the second node, and the other end connected to the second output terminal;
a first rectifier element connected between the first node and the one end of the first capacitor so as to allow a current to flow from a first node side; and
a second rectifier element connected between the first node and the other end of the second capacitor so as to allow a current to flow to the first node side, wherein
the power factor correction circuit has a current path between the first and second input terminals via the coil and the bidirectional switch, and
the coil is connected, at least one of between the first input terminal and the first node, and between the second node and the second, input terminal.

14. The power factor correction circuit according to claim 13, wherein
the first transistor is a MOSFET or a HEMT having a first conduction terminal, and a second conduction terminal connected to the second node,
the second transistor is a MOSFET or a HEMT having a first conduction terminal connected to the first conduction terminal of the first transistor, and a second conduction terminal connected to the first node,
the first conduction terminal is one of a drain terminal and a source terminal, and the second conduction terminal is the other of the drain terminal and the source terminal.

15. The power factor correction circuit according to claim 13, wherein the first transistor is an IGBT or a bipolar transistor having a first conduction terminal, and a second conduction terminal connected to the second node, the second transistor is an IGBT or a bipolar transistor having a first conduction terminal connected to the first conduction terminal of the first transistor, and a second conduction terminal connected to the first node, the first conduction terminal is one of a collector terminal and an emitter terminal, and the second conduction terminal is the other of the collector terminal and the emitter terminal.

16. The power factor correction circuit according to claim 13, wherein the first transistor is switched when a potential at the first input terminal is higher than a potential at the second input terminal, and the second transistor is switched when the potential at the first input terminal is lower than the potential at the second input terminal.

17. The power factor correction circuit according to claim 16, wherein the second transistor is controlled to an on-state when the potential at the first input terminal is higher than the potential at the second input terminal, and the first transistor is controlled to an on-state when the potential at the first input terminal is lower than the potential at the second input terminal.

18. The power factor correction circuit according to claim 13, wherein the bidirectional switch further includes rectifier elements connected in anti-parallel with the first and second transistors.

19. A power supply device comprising:

the power factor correction circuit according to claim 13; and a DC-DC converter.

20. A power factor correction circuit comprising:

first and second input terminals;

first and second output terminals;

a coil;

a first bidirectional switch that includes first and second transistors connected in anti-series, the first bidirectional switch having one end connected to a first node, and the other end connected to a second node;

a first capacitor having one end connected to the first output terminal, and the other end connected to a third node;

a second capacitor having one end connected to the third node, and the other end connected to the second output terminal;

a second bidirectional switch connected between the second node and the third node;

a first rectifier element connected between the first node and the one end of the first capacitor so as to allow a current to flow from, a first node side;

a second, rectifier element connected between, the first node and the other end of the second capacitor so as to allow a current to flow to the first node side;

a third rectifier element connected between the second node and the one end of the first capacitor so as to allow a current to flow from a second node side; and a fourth rectifier element connected between the second node and the other end of the second capacitor so as to allow a current to flow to the second node side, wherein the power factor correction circuit has a current path between the first and second input terminals via the coil and the first bidirectional switch, and the coil is connected at least one of between the first input terminal and the first node, and between, the second node and the second input terminal.

* * * * *